United States Patent [19]

Clark, Jr. et al.

[11] Patent Number: 5,699,244
[45] Date of Patent: Dec. 16, 1997

[54] HAND-HELD GUI PDA WITH GPS/DGPS RECEIVER FOR COLLECTING AGRONOMIC AND GPS POSITION DATA

[75] Inventors: Louis George Clark, Jr., St. Charles; Donald Romaine Gummow, Jr., O'Fallon; Marc Vanacht, St. Louis, all of Mo.

[73] Assignee: Monsanto Company, St. Louis, Mo.

[21] Appl. No.: 491,512

[22] Filed: Jun. 16, 1995

Related U.S. Application Data

[63] Continuation-in-part of Ser. No. 207,539, Mar. 7, 1994, Pat. No. 5,566,069.
[51] Int. Cl.$^6$ ................................................ G06F 19/00
[52] U.S. Cl. ............................................................ 364/420
[58] Field of Search ........................... 364/420, 449.1, 364/449.7, 449.2, 705.01, 705.06, 449.3, 449.4, 449.5; 395/924, 925, 928, 201, 202, 228, 229, 207, 449.8, 449.9, 449.95

[56] References Cited

U.S. PATENT DOCUMENTS

| | | |
|---|---|---|
| Re. 31,023 | 9/1982 | Hall, III . |
| 3,978,324 | 8/1976 | Rayner . |
| 4,015,366 | 4/1977 | Hall, III . |
| 4,176,395 | 11/1979 | Evelyn-Veere et al. . |
| 4,209,131 | 6/1980 | Barash et al. . |
| 4,244,022 | 1/1981 | Kendall . |
| 4,430,828 | 2/1984 | Oglevee et al. . |
| 4,463,706 | 8/1984 | Meister et al. . |
| 4,493,290 | 1/1985 | Gibbard . |
| 4,617,876 | 10/1986 | Hayes . |
| 4,626,984 | 12/1986 | Unruh et al. . |
| 4,698,781 | 10/1987 | Cockerell, Jr. . |
| 4,703,444 | 10/1987 | Storms, Jr. et al. . |
| 4,722,054 | 1/1988 | Yorozu et al. . |
| 4,745,550 | 5/1988 | Witkin et al. . |
| 4,751,512 | 6/1988 | Longaker . |
| 4,755,942 | 7/1988 | Gardner et al. . |
| 4,760,547 | 7/1988 | Duxbury . |
| 4,812,980 | 3/1989 | Yamada et al. . |
| 4,851,999 | 7/1989 | Moriyama . |
| 4,862,374 | 8/1989 | Ziemann . |
| 4,931,932 | 6/1990 | Dalnekoff et al. . |
| 4,949,248 | 8/1990 | Caro . |
| 4,977,509 | 12/1990 | Pitchford et al. . |
| 4,989,151 | 1/1991 | Nuimura . |
| 4,992,940 | 2/1991 | Dworkin . |
| 4,992,942 | 2/1991 | Bauerle et al. . |
| 4,994,974 | 2/1991 | Cummings . |
| 5,019,828 | 5/1991 | Schoolman . |
| 5,023,787 | 6/1991 | Evelyn-Veere . |
| 5,056,106 | 10/1991 | Wang et al. . |

(List continued on next page.)

OTHER PUBLICATIONS

ETE, Inc. information sheet for ETE Wireless for Newton® Communicator, 1994.

*Primary Examiner*—Donald E. McElheny, Jr.
*Attorney, Agent, or Firm*—Howell & Haferkamp, L.C.

[57] ABSTRACT

A handheld graphic user interface (GUI) personal digital assistant (PDA) computer is coupled to a GPS/dGPS receiver module which is also compact in size to provide for the collection of data associated with position information. Additional features provided by the stored program in the PDA include a nested set of menus for pre-organizing data collection, navigational functions to permit a user to navigate to a desired location with audio and visual feedback, mapping capability, overlay generation functions which further organize and display the collective data, etc. A full host of functionality provided by a geographical information system (GIS) software package are not provided due to the limited processor performance capability and memory space but only data collection data and mapping display and generation capabilities as selected for implementation of the desired functions.

27 Claims, 52 Drawing Sheets

Microfiche Appendix Included
(4 Microfiche, 165 Pages)

U.S. PATENT DOCUMENTS

| | | |
|---|---|---|
| 5,059,970 | 10/1991 | Raubenheimer et al. . |
| 5,063,505 | 11/1991 | Pate et al. . |
| 5,067,081 | 11/1991 | Person . |
| 5,089,826 | 2/1992 | Yano et al. . |
| 5,093,669 | 3/1992 | Kajiyama . |
| 5,113,178 | 5/1992 | Yasuda et al. . |
| 5,124,924 | 6/1992 | Fukushima et al. . |
| 5,148,179 | 9/1992 | Allison . |
| 5,159,556 | 10/1992 | Schorter . |
| 5,173,079 | 12/1992 | Gerrish . |
| 5,173,855 | 12/1992 | Nielsen et al. . |
| 5,214,757 | 5/1993 | Mauney et al. . |
| 5,243,528 | 9/1993 | Lefebvre . |
| 5,246,164 | 9/1993 | McCann et al. . |
| 5,289,195 | 2/1994 | Inoue . |
| 5,299,132 | 3/1994 | Wortham . |
| 5,317,321 | 5/1994 | Sass . |
| 5,323,152 | 6/1994 | Morita . |
| 5,327,708 | 7/1994 | Gerrish . |
| 5,334,974 | 8/1994 | Simms et al. . |
| 5,334,987 | 8/1994 | Teach . |
| 5,351,059 | 9/1994 | Tsuyuki . |
| 5,359,526 | 10/1994 | Whittington et al. . |
| 5,364,093 | 11/1994 | Huston et al. . |
| 5,365,449 | 11/1994 | Kashiwazaki . |
| 5,365,451 | 11/1994 | Wang et al. . |
| 5,379,057 | 1/1995 | Clough et al. . |
| 5,383,128 | 1/1995 | Nishida et al. . |
| 5,389,934 | 2/1995 | Kass . |
| 5,396,254 | 3/1995 | Toshiyuki . |
| 5,396,431 | 3/1995 | Shimizu et al. . |
| 5,406,491 | 4/1995 | Lima . |
| 5,422,363 | 6/1995 | Remondi . |
| 5,422,814 | 6/1995 | Sprague et al. . |
| 5,422,816 | 6/1995 | Sprague et al. . |
| 5,434,789 | 7/1995 | Fraker et al. . |
| 5,438,518 | 8/1995 | Bianco et al. . |
| 5,442,557 | 8/1995 | Kaneko . |
| 5,469,175 | 11/1995 | Boman . |

Project Infoline

Preliminary screen flow diagram

Conventions - Scrolling lists

Conventions - Multi list selections
Add selection
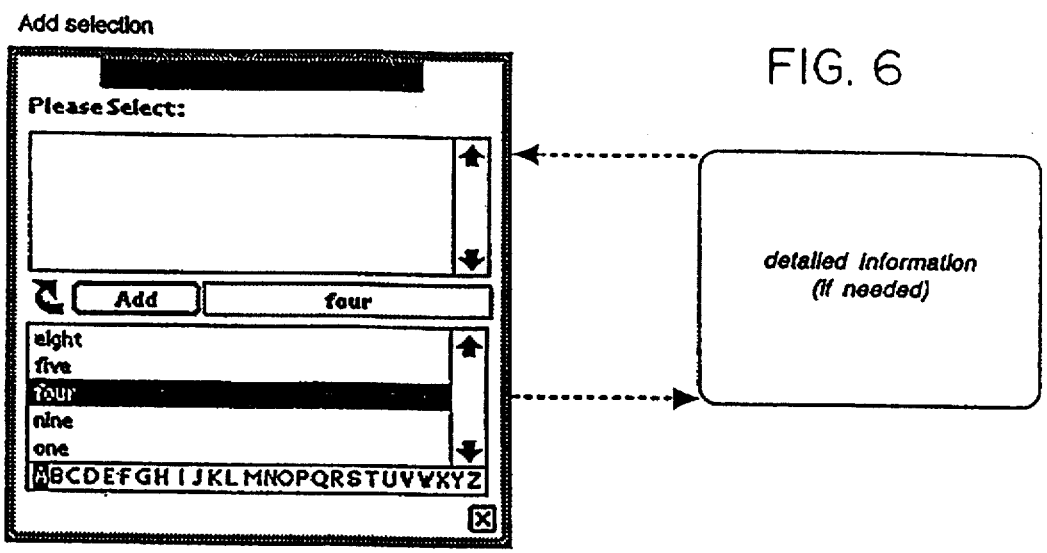
FIG. 6
detailed information
(if needed)
Remove selection
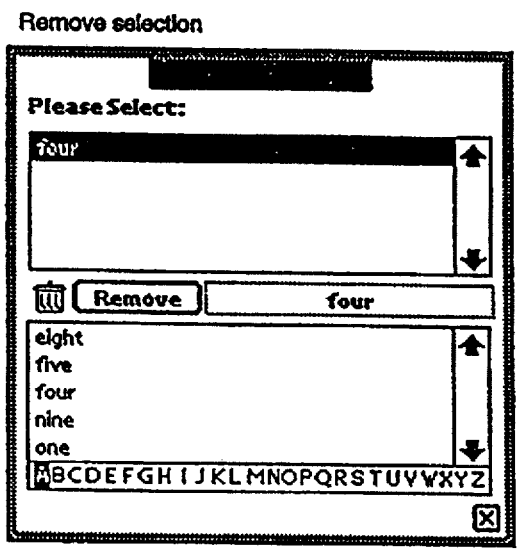
multipicker for compound items
multipicker for simple items

Conventions - Editing Field Operations
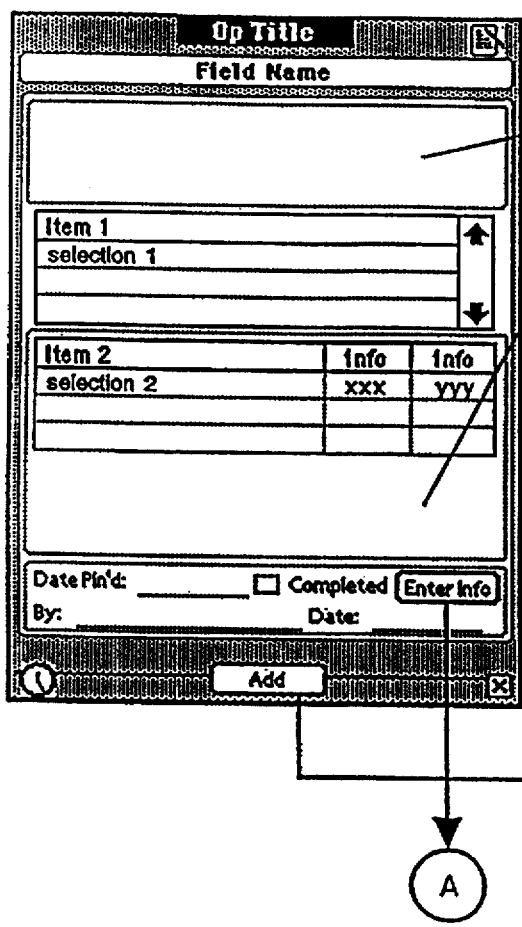
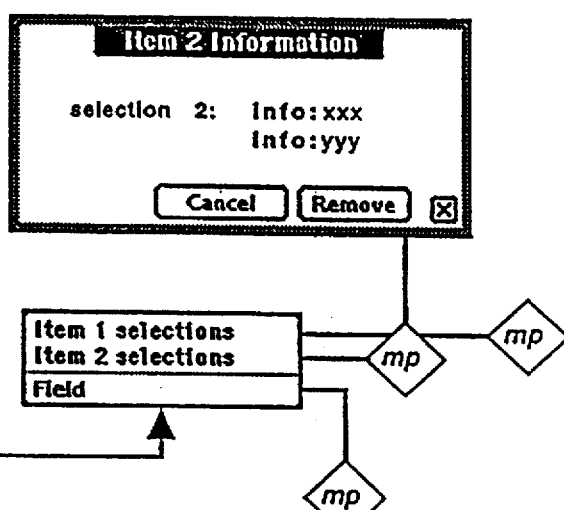
FIG. 7

Conventions - Miscellaneous

Crop Information

Selected Crop: Something

Field Name: _____ Year: ___

Total Area: _____ Acres

Timing/Crop Stage: _____

Area Planted: _____ Acres

Yield Goal: _____
◆ Item 1

[ Cancel ]  [ Remove ]  ☒

FIG. 19

FIG. 22

Disease Scouting Information
Selected Disease: four
# of affected plants per
nn ft. nn in.
(1/1000th Acre):
% Plant Injury:
◆ Severity: Severity 1
[ Cancel ] [ Remove ] [X]

Insect/Mite Scouting Information
Selected Insect/Mite: four
# of Insects:
nn ft. nn in.
(1/1000th Acre):
# of Affected Plants:
nn ft. nn in.
(1/1000th Acre):
# of Insects Per Plant:
nn ft. nn in.
(1/1000th Acre):
◆ Severity: Severity 1
[ Cancel ] [ Remove ] [X]

Nematode Injury Scouting
Selected Nematode:
# of affected plants per
nn ft. nn in.
(1/1000th Acre):
◆ Severity: Severity 1
[ Cancel ] [ Remove ] [X]

Nutrient Deficiency Scouting
Selected Symptom: four
Deficiencies:
_____
_____
_____
◆ Severity: Severity 1
[ Cancel ] [ Remove ] [X]

Injury Scouting
Selected Injury: nine
# of affected plants per
nn ft. nn in.
(1/1000th Acre):
% Plant Injury:
◆ Severity: Severity 1
[ Cancel ] [ Remove ] [X]

Weather Injury Scouting
Selected Weather Injury: four
# of affected plants per
nn ft. nn in.
(1/1000th Acre):
% Plant Injury:
◆ Severity: Severity 1
[ Cancel ] [ Remove ] [X]

Weed Injury Scouting
Selected Weed: four
# of weeds per
nn ft. nn in.
(1/1000th Acre):
◆ Severity: Severity 1
[ Cancel ] [ Remove ] [X]

FIG. 31

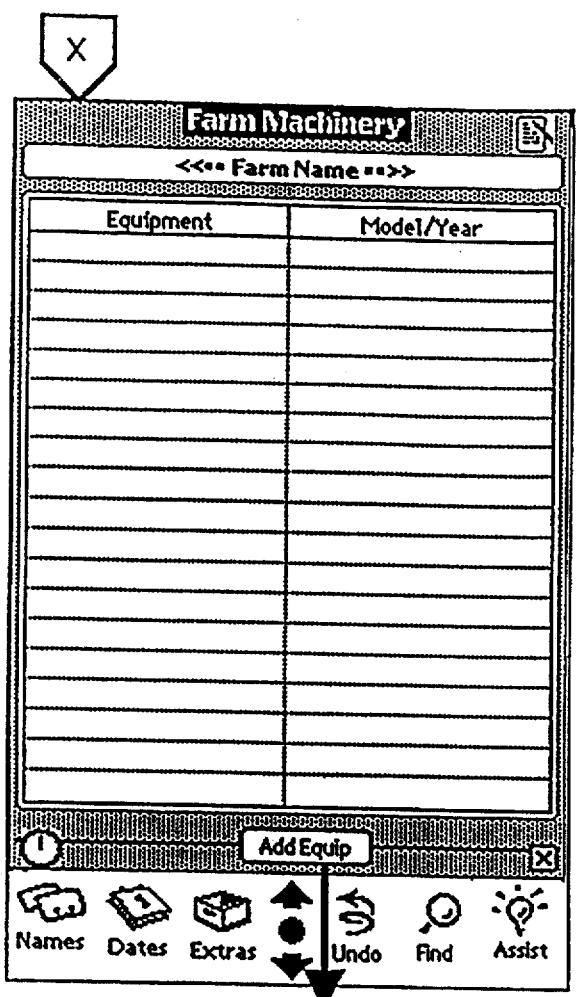
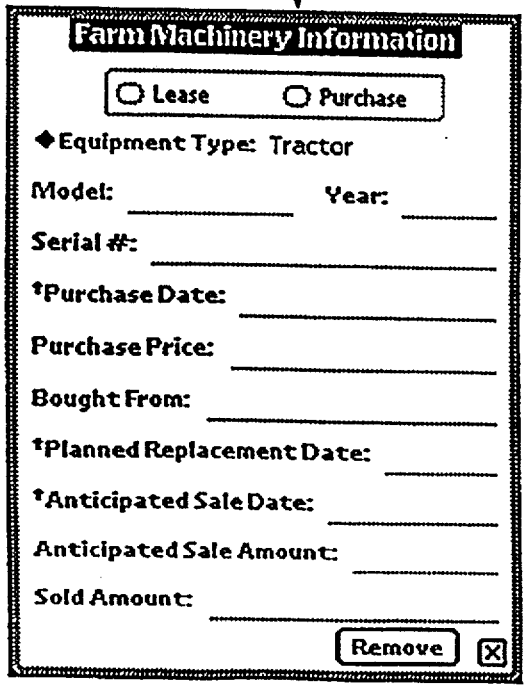
FIG. 32

INFIELDER NEWTON LIST BUILDER & LOADER
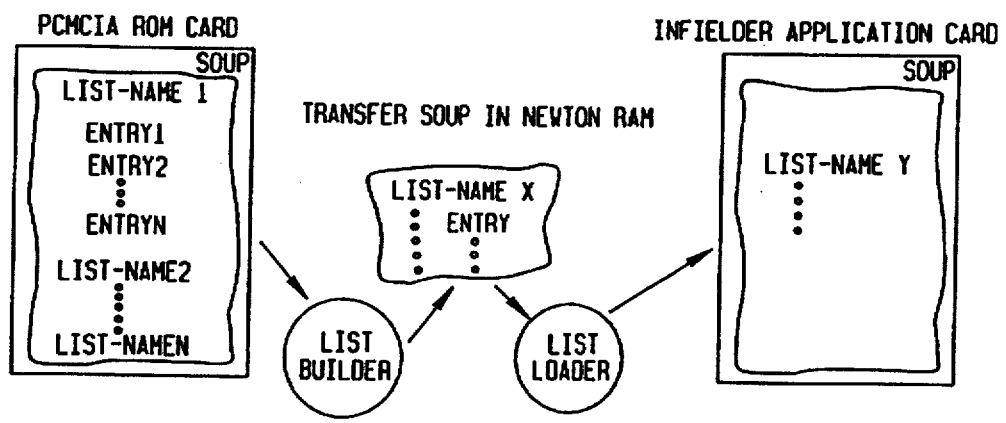
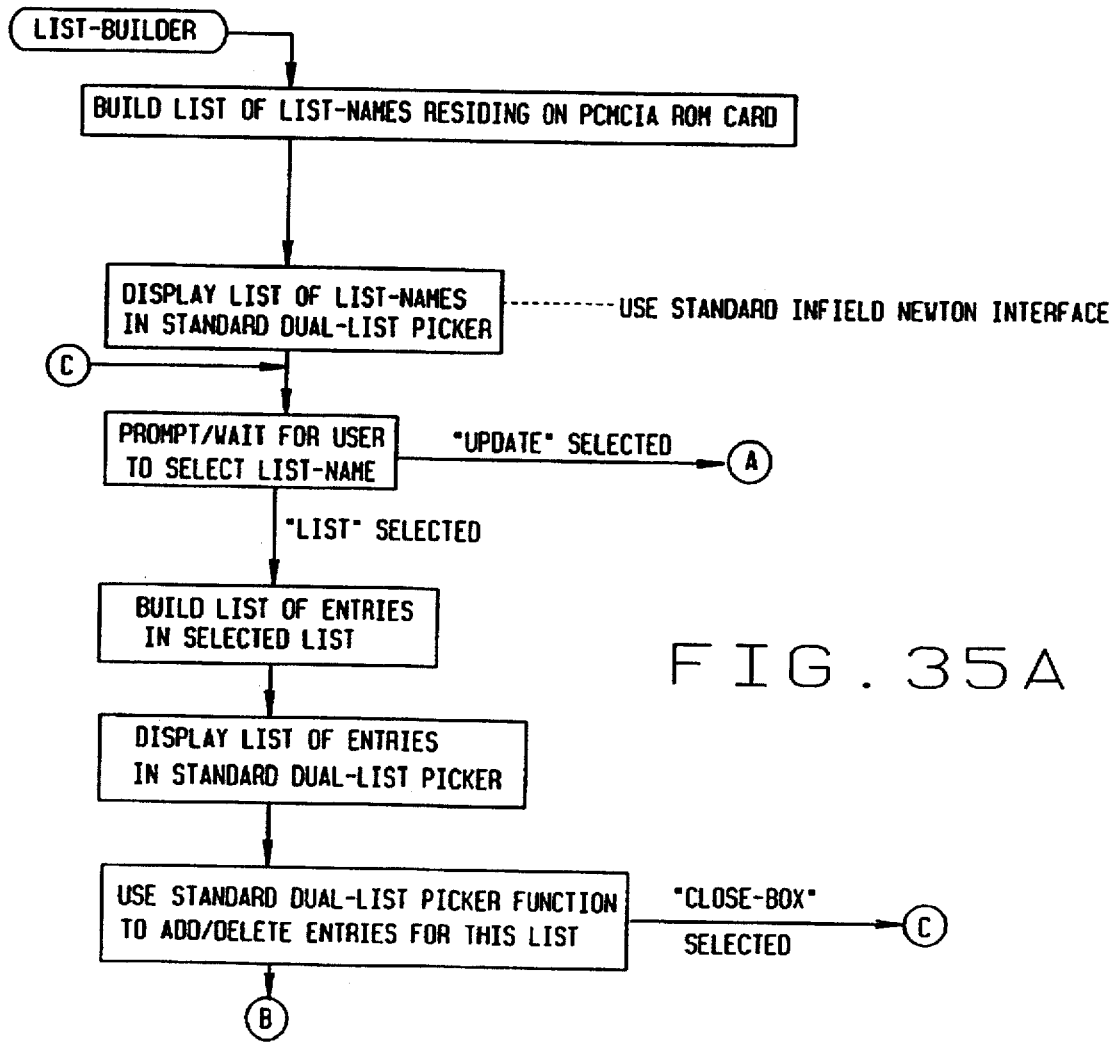
FIG. 35A

DATA PRIVACY

TO INSURE PRIVACY OF EACH GROWER'S OPERATIONAL DATA THE PUBLIC GROWER ID CAN ONLY BE USED TO LOOK UP GROWER PUBLIC INFO.

GROWERS

| GROWER ID | GROWER NAME | GROWER ADDRESS |
|---|---|---|
|  |  |  |
| ABC123X | JIM SMITH | P.O. BOX 12345 |
|  |  |  |

GROWER - REFS

| GROWER ID | REF |
|---|---|
| ABC123X | 123 |

OPERATIONS DATA

| REF |  |
|---|---|
|  |  |
| 123 |  |
| 123 |  |
|  |  |

OPERATIONS DATA IS STORED KEYED ON AN ANONYMOUS "REF" VALUE. MAPPING OF GROWER ID (PUBLIC) TO GROWER REF (PRIVATE) IS VIA A LEXICON TABLE CONSTRAINED BY SQL ACCESS CONTROL.

DATA SUBMITTED BY A FARMER IS PROCESSED BY A JOB WITH SUFFICIENT PRIVILEGE TO TRANSLATE GROWER ID TO PRIVATE REF - DATA IS THEN SPLIT FROM IDENTIFYING INFO. AND JOINS OF OP DATA TO ACTUAL GROWER BECOMES HIGHLY RESTRICTED.

FIG. 45

```
         PREFERENCES
FARM NAME:
JIM'S FARM
   ◇ AREA UNIT:        ACRES
   ◇ DEPTH/SPACING UNIT: IN
   ◇ TEMPERATURE UNIT:  °F
   ◇ WIND SPEED UNIT:   MPH
           TM
   INFIELDER   VERSION 1.0d27   ⊠
```

FIG. 47

Map Selection
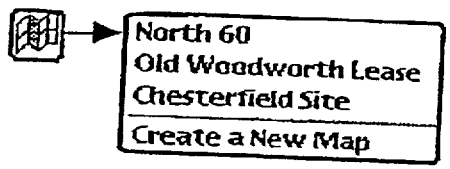
FIG. 51
Positioner Control Panel
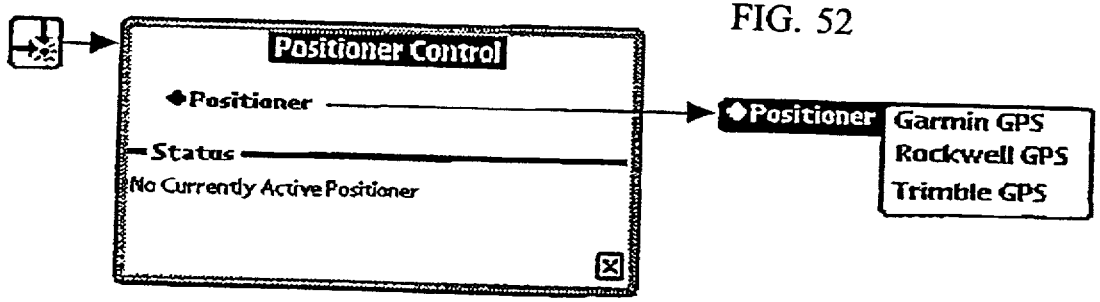
FIG. 52
Show/Hide Overlays
FIG. 53
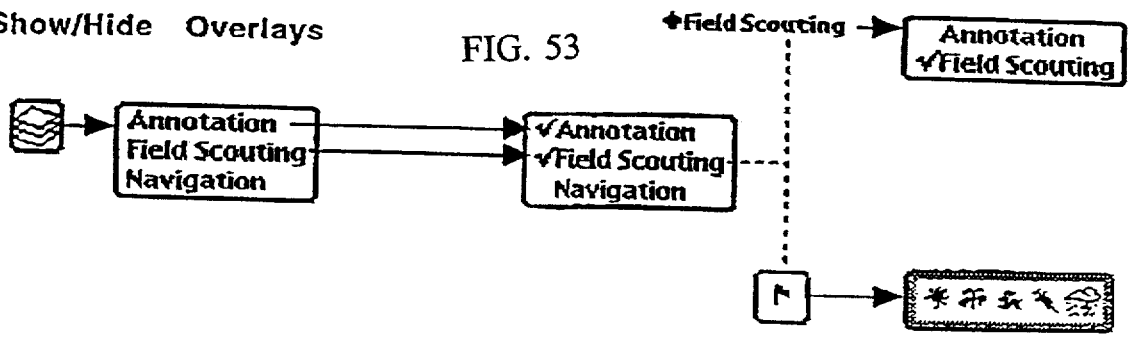

Map Zoom/Pan Controller

Tool Drawer

Sample "tool"

Annotation Overlay

Custom Overlay - "Field Scouting" example

Scouting observation palette

Observation entry form

User Preferences

HAND-HELD GUI PDA WITH GPS/DGPS RECEIVER FOR COLLECTING AGRONOMIC AND GPS POSITION DATA

CROSS-REFERENCE TO RELATED APPLICATION

This application is a continuation-in-part of Ser. No. 08/207,539, filed Mar. 7, 1994, U.S. Pat. No. 5,566,069 the disclosure of which is incorporated herein by reference.

MICROFICHE APPENDIX

This application includes a Microfiche Appendix comprising a total of four microfiche and a total of 165 frames.

BACKGROUND AND SUMMARY OF THE INVENTION

There is a wealth of information utilized by a farmer in the agricultural operation of a farm. This information includes data related to the various types of soil in his fields, the types of crops planted in the past and intended to be planted in the next growing season, the scheduled time and actual performance of various farm operations on each field such as tilling, cultivating, etc., the various types of chemicals applied to each field such as fertilizers and herbicides, the various kinds of diseases and infestations of insects which are encountered in the growing season, weather information relating to rainfall and temperatures, etc. In the prior art, a farmer generally records only some of this information, as much of it as he considers to be usable, manually in the field. Additionally, many farmers are computer literate and will manually record limited categories and amounts of this information in the field and bring it back to their home for entry into their home PC. Unfortunately, as a farmer has many responsibilities and worries other than data collection, most often the farmer does not have time or on-the-spot opportunity to record what may be very significant data. Furthermore, this data collection chore can be quite time-consuming as it is generally achieved with a clipboard or notebook, or most commonly a piece of paper, which is easy to forget, misplace, or even lose. Unfortunately for the farmer, there are increasing demands on his time to collect data such as for reporting to various governmental agencies, including the EPA. Data collection has thus become a major problem which is being forced on farmers who have little help from any prior art devices.

Another aspect to data collection involves the association of data with a particular geographic location. This is especially true for visual observations made by the farmer as he inspects his fields. Not only is it important for the farmer to make an observation about a particular part of his fields, but also to record that geographic location where that observation was made or to which it pertains. In order to correlate a large number of these observations, it is important to have a standard reference for these geographic locations and, for a farmer with more than just a few fields, this standard reference requires some calculation and determination on the farmer's part at the time that the data is collected. All of this makes data collection more difficult and, to the extent that error or miscalculation of a geographic location is involved, less accurate.

Because of the increasing competition and mechanization of farming, data collection has become even more important for the farmer so that he might keep better track of his costs to determine the profitability of various crops planted on various fields throughout his farm. Typically, a farmer works on a close margin such that accurate cost accounting can be critical in helping a farmer make a decision as to the various crops planted and grown. Unfortunately, for various reasons, computers have not been successfully applied to the farmer's data collection and analysis problem.

In order to solve these and other problems in the prior art, the inventors herein have succeeded in designing and developing a unique computer network which includes a portable computer with a user-friendly interface for on-the-spot data recording by the farmer having sufficient capabilities for satisfying virtually all of his information handling needs. This computer network is comprised of a client-client-server configuration. As envisioned, a typical farmer would have two computers, a "field" or portable computer as well as a fixed platform PC operating with a graphic user interface. The portable computer function may be satisfied by one of the several Personal Digital Assistant (PDA) computers recently marketed by a number of computer companies. One such example is the APPLE® NEWTON® MESSAGE PAD®. These personal digital assistants (PDA) provide a screen display covering a substantial portion of a larger side thereof, simple graphic user interface (GUI) with handwriting recognition capability, and touch screen data entry with a stylus to greatly simplify the entry of data. A PDA is compact and portable so that a farmer may readily carry it wherever he goes, in the field, on a tractor, etc. Also, the PDA is rugged enough to withstand the rigors of a farm environment. Coupled to the PDA, in the same hand-held configuration is a combined GPS and differential GPS receiver with antenna and packaged in a case approximately the same size as the PDA so that both may then be readily carried together in a rubber boot or the like. With this configuration, both the PDA and GPS/dGPS receivers provide a portable, hand-held, data collection device without the need for backpacks, cabling between a hand-held unit and a backpack, and other battery packs or the like which would hamper a farmer's activities and likely not be routinely carried by a farmer. This interference with a farmer's activities due to a device's bulk and size would likely lead to its not being utilized.

The inventors note that the prior art includes other portable GPS/dGPS receivers, generally of the size of a backpack, and even some GPS receivers, without the differential correction provided by a dGPS receiver, in hand-held units and adapted for data collection. However, these prior art devices are either bulky and require exterior cabling from a backpack unit to a hand-held device such as a notebook computer or the like, or do not provide a graphic user interface (GUI). As such, these prior art devices which are typically intended for applications outside of agriculture are implemented by trained individuals to achieve mapping and information gathering as a dedicated function of its use. Furthermore, these prior art systems all include geographical information systems (GIS) software to provide not only for the collection of data, but also and more importantly, the analysis and presentation of data analysis on maps for display and further manipulation by a user. These GIS software packages all require a significant amount of processor performance and memory space and, hence, in the prior art have been implemented and run on powerful notebook computers and the like. In the present invention, which utilizes a PDA having limited processor performance and memory space, a typical GIS software package could not be successfully run and much less provide the amounts of memory and processor performance needed for data collection and display. These problems have been overcome by the inventors herein by implementing only the data collection and navigation functions of a typical GIS software package which enables a PDA to successfully implement the mapping, navigational, and position location functions in a data collection environment without hampering the performance of the data collection which remains the principal focus of the application.

The inventors contemplate that other user-friendly interfaces will become available in portable computers, such as voice data entry, and that any computer with a "non-command line" or "non-typed" interface would be equally suitable for use herein. Of course, this simplified data entry feature lends itself uniquely to application for this problem in that farmers as a group are no different from others who have shied away from adapting to the computer age because of the perceived difficulty in communicating with a computer. This GUI and touch screen, or non-command line, data entry scheme significantly reduces a farmer's objection and increases the adaptability of the invention for that reason alone.

On this PDA, a custom stored program is loaded which includes a hierarchy of nested displays in each of five major areas. These five major areas are operations, weather, field use, equipment, and scouting. The information relating to a growing season and the geography of a farmer's fields may be conveniently pre-loaded into the PDA from a PC through a data link connecting the PDA with the fixed platform PC in the farmer's house. This PC includes an emulation of the GUI of the PDA and provides, through the windows mouse, the ability for the farmer to track through virtually the same operational program on his PC as is found in the PDA. This greatly enhances the system by reducing the amount of "computerese" that the farmer has to learn to a single, display-driven, program. In order to increase the usability of the system, the PC is provided with a program for manipulating the data base included in the PDA, and there is also a feature which permits the synchronization of the data base in the PDA with the data base in the PC, utilizing a paradigm of most recent data override. This helps eliminate errors which might otherwise creep into the data through use of two separate computers.

A farmer may conveniently carry his PDA with him as he farms to make data entries on the spot. This data is thusly "validated" by its time stamp and place of entry with GPS position data. This includes the completion of various farm operations such as tilling, the application of chemicals or herbicides to a field, the observed temperature or rainfall, a scouting observation of insect or disease infestation or virtually any other data as is explained more completely in the preferred embodiment which follows. Thus, with the present invention, the farmer for the first time may conveniently and readily enter data with minimal interference in his farming operations.

Utilizing the PDA and PC combination alone would, in itself, greatly enhance a farmer's operation of an individual farm. However, the present invention further envisions the implementation of a third step to provide a client-client-server network configuration. That entails the widespread adoption of the PDA/PC computer pair throughout various regions of the country and their connection through an offline, batched, data link with a central computer or server. With this third level, or server computer, data from many farmers and farms may be collected which can be used to assemble a master data base, in real time, to provide for the prompt feedback of "best practices" data and projections for a farmer particularized as to his most geographically significant surroundings. For example, if a farmer has fields in a valley along with several other farmers, he may find out through this master data base what these other farmers have used to solve a particular problem such as controlling a particular crop disease or infestation. He may also find out detail relating to the time and type of various farming operations performed on the same or similar crops, and their success or failure in past years. This kind of information has been generally unavailable in the prior art, and certainly unavailable on a real time basis to provide information about other farmers' practices during the same growing season. This information may be critical to a farmer's success or failure with a particular crop. The need for this invention is thus quite apparent.

In order to implement this third or server computer, the inventors have incorporated into their invention a commercial messaging service which provides for the offline, batched, collection of data from the significant number of client-client sub-networks. One such service which may be utilized is MCI MAIL®. With these services, individual farmers would call in and transmit data, and that data would then be batched and collected by the server or an intermediary computer for dispatch onto the server, as the collected data fills a "batch". As a way of encouraging farmers to utilize this messaging service, various reports and other analyses may be performed and made available to a farmer only after he has transmitted his data to the batch. A farmer's access to this commercial messaging service may be restricted by utilizing an encryption routine embedded in the PC software for translation of a farmer-entered code into a valid account number, along with a password. Through this methodology, a significant connectivity problem may be solved with safeguards included to prevent any abuse or undesired use by a farmer of the commercial service which would run up charges for non-system use.

In developing the stored program for the PDA, the inventors herein have succeeded in solving several problems related to handling the oversized amount of data required for the large variations of possible entries. For example, there are as many as about 16,000 different types of soils from which a farmer may select for each of his fields. Storing these sizes of data bases in the PDA itself would be impractical and would impede the smooth, efficient entry of data which is a highly desired feature of the present invention. This problem has been solved by providing a PC having a much greater memory size from which a farmer may choose to load data into his PDA. Still another solution to that problem is the use of a memory card which may be inserted into a PDA from which the same selections may be made. This allows the PDA data base to be conveniently customized for each farmer. Still another feature of implementation includes the ability of the PDA stored program to intelligently preselect only logical entries to populate a number of pop-up screens from which a farmer must choose during his data entry process. The pop-up screens are thusly "context sensitive". For example, during certain growing stages of a crop, only certain kinds of herbicides for killing a particular weed are usable without damage to the crop itself. A sub-routine in the stored program acts to limit these herbicide entries in a pop-up list so that a farmer need not scroll through an inordinate number of herbicides, many of which would damage the crop or not kill that particular weed. These details of implementation are important in utilizing the PDA for the task at hand in that the size of the PDA screen is limited and long pop-up lists would require scrolling for unacceptably long time periods.

Still other problems addressed by the inventors and which contributed to the feasibility of the present invention relate to the software techniques developed to handle the selection and display of map information on the PDA. Map and other geographic data is generally memory intensive and, while the ability to display portions of a map is highly desirable, this generally requires a significant amount of processor time to sort and process the map elements required to be displayed as the map portion is chosen. The inventors herein have minimized this processor time by utilizing an algorithm which calculates whether the vectors which form any particular map element intersect or lie within the map portion selected for display and, if so, displaying it. This algorithm also provides the functionality of scrolling a map display in a progressive fashion with infinite variability with minimal processor overhead. In the prior art, this capability was achieved at significant processor overhead or, for those applications where processor overhead was a limiting factor, preselected blocks of map only were available for display with scrolling achieved by toggling from one map portion to another and without an infinitely variable progression as is provided in the present invention.

There are still other features of implementation which are more fully explained in the preferred embodiment and which contribute to the success of the present invention. While the principal advantages and features of the invention have been explained herein, a fuller understanding and appreciation for the invention may be obtained by referring to the drawings and description of the preferred embodiment which follow which are not intended to be limiting.

BRIEF DESCRIPTION OF THE DRAWINGS

FIG. 6 is a portion of a sample NEWTON® screen detailing the multi-picker routine for filling the lists of FIG. 5;

FIG. 7 is a sample NEWTON® screen utilized in editing field operations;

FIG. 16 is a pop-up list for entering crop information for a particular field;

Figure 19:
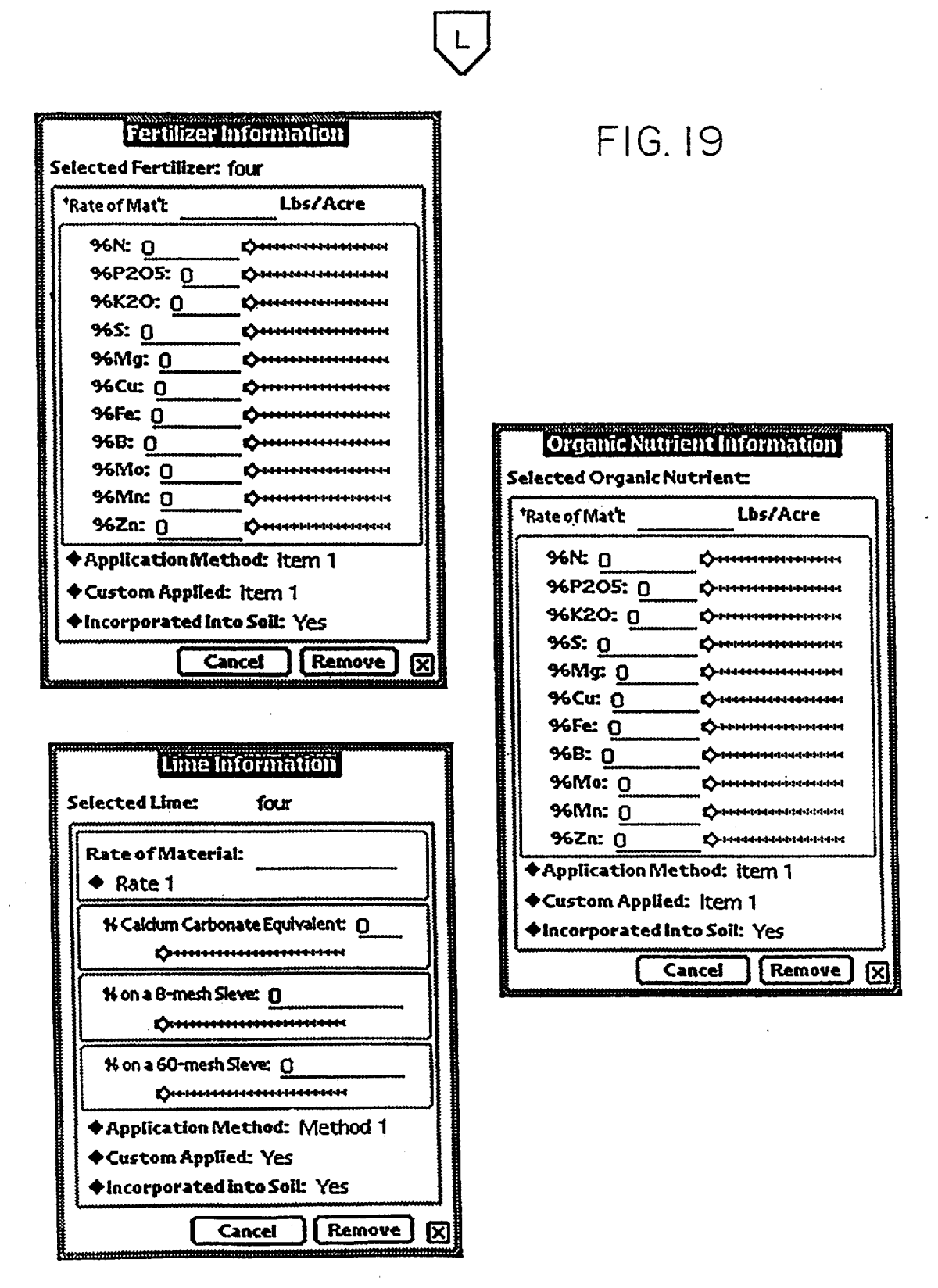

FIG. 19 are pop-up lists to implement the multi-picker function entry of data in FIG. 18;

FIG. 22 are pop-up lists as used for entering data as shown in FIG. 21;

FIG. 31 is a NEWTON® screen and pop-up list for entering crop information for the farm;

FIG. 32 is a NEWTON® screen and pop-up list for entering and displaying farm machinery information for the farm;

FIG. 45 is a diagram detailing the data base setup in the central computer which ensures data privacy;

FIG. 47 is a sample NEWTON® screen depicting the preferences screen;

FIG. 51 illustrates the pop-up menu available as an operator selects a map from the select map button;

FIG. 52 illustrates the pop-up menu available when a user selects the positioner controls button;

FIG. 53 illustrates the nested menus available when a user selects the overlays button;

DETAILED DESCRIPTION OF THE PREFERRED EMBODIMENT

Figure 1:
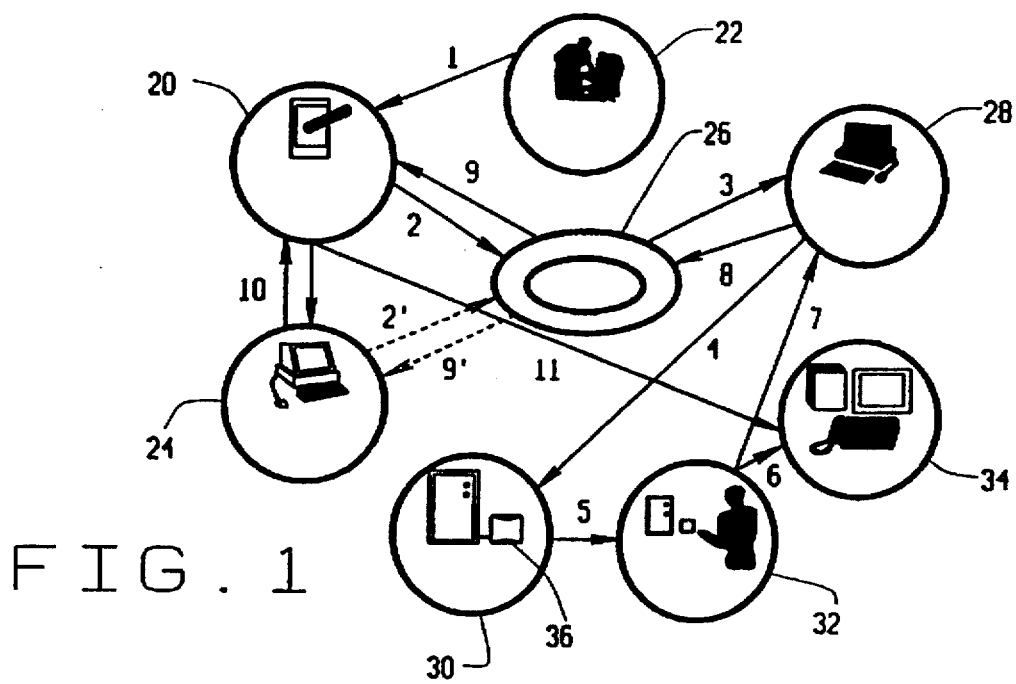
FIG. 1 is a block diagram of an information handling system utilizing the hand-held data collection device of the present invention.
Figure 2:
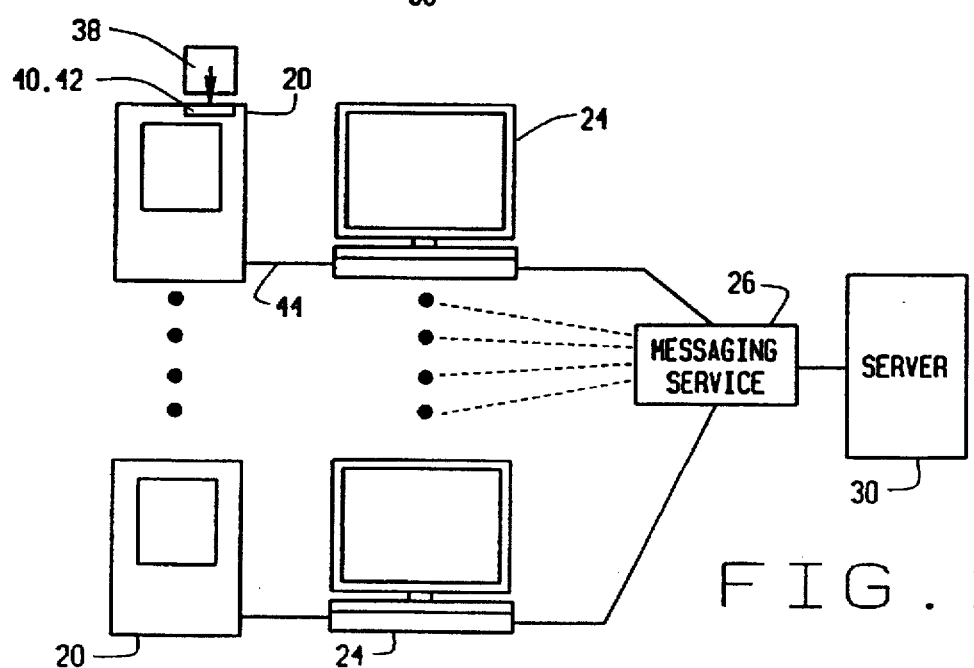
FIG. 2 is a schematic diagram detailing the client-client-server computer network utilizing the present invention.

The present invention is part of a sophisticated data collection, processing, and reporting system which may be best understood by referring to FIG. 1. As shown therein, a mobile computer 20, in the preferred embodiment an APPLE® NEWTON® MESSAGE PAD® PDA, is used to collect and compile farm data for transmission back to a host computer. As each farmer acquires his mobile computer 20, a customer service function 22 will be made available to aid the farmer in setting up the specific parameters for the display driven software used as an aid in collecting data and also to obtain profile information on the particular farmer who will utilize the mobile computer 20. This is indicated by an arrow labeled 1 in FIG. 1. After setup, information will be entered by the farmer on his mobile computer 20 and transmitted to a messaging company. This is indicated by an arrow labeled 2. For convenience, and as explained further herein, a desktop computer 24 will interact with the mobile computer 20 and, as initially implemented, will communicate with the messaging company 26 as shown by the dotted line arrow labeled 2'. There is added functionality to accommodate this arrangement, as will be explained below. A message gateway computer 28 periodically polls the messaging company 26 and downloads any messages waiting there. Although only a single farmer is depicted in FIG. 1, the inventors' intent is that many farmers be connected such that this portion of the system will in fact be configured more akin to that as depicted in FIG. 2. The downloading of messages from the messaging company 26 by the message gateway computer 28 is depicted by an arrow labeled 3. The message gateway computer 28 parses the messages for content, performs range checking and validation of the data, and then transmits the data to the host data base computer, or central computer 30 as depicted by the arrow labeled 4. Data from the central computer 30 may be periodically processed statistically and analyzed in many ways, including further computer analysis, and is shown representationally as an analysis function 32 with data being transmitted as shown by an arrow labeled 5. This analysis function 32 may then be used to generate finished reports 34 over an arrow labeled 6. These finished reports may be distributed to farmers through the message gateway computer 28 and messaging company 26 back to the farmer if the analysis was performed as a result of a query from the farmer. This data path is represented by arrows labeled 7–9. (As initially configured, the transmission from the messaging company would go to the desktop computer 24 over the dotted line arrow labeled 9'.) Additionally, the finished reports may be distributed via postal mail, facsimile, and online bulletin boards such as COMPUSERVE™ (arrow 11) for selective access by any farmer connected to the system. As alluded to above, the desktop computer 24 forms part of the initial configuration and provides additional functionality to the farmer. For example, the farmer may backup and restore the data on the mobile computer 20 from a data base maintained at the desktop computer 24. Additionally, desktop computer 24 may be utilized to perform its own statistical analysis and generate reports which are farmer specific and which do not require access to the master data base maintained at the central computer 30.

As is apparent from the overview provided, the present invention provides a modular approach in a client-client-server network configuration for "computerizing" the farming or agricultural process from a micro level up to a macro level. The client-client-server network corresponds to the NEWTON®, desktop computer, and host server, with data links between those components for the free flow of information therebetween. This overall system provides ready scalability which is enhanced by the use of a messaging company 26 as the hub between the large number of farmers and the central computer 30. This messaging company 26 provides an offline batching data link as a hub or interface with a gateway computer 28 for coordinating the transfer of data in batches to the central computer 30. This provides unique advantages over any online modem or call-up configuration which would require the central computer 30 to be capable of simultaneously handling many thousands of calls. An alternative to online modem connection would be a polling function wherein the central computer 30 would regularly poll each farmer to download his data. Again, this requires a significant overhead for the central computer 30, or even a message gateway computer 28, and would require a farmer to be "online". These problems are avoided through the use of the messaging company 26.

The master data base 36 at the central computer 30 provides storage and retrieval of collected farm data, customer/farm profiles, and agronomic information. The farm data consists of recorded field operations and daily weather data. The collection frequency of the field operations will vary according to season, weather, crop type, and farmer preference. The field operations and weather data will be formatted, validated, and loaded nightly by the data pre-processing provided by the message gateway computer 28. Customer information will also be provided to the master data base and will consist of a grower profile, field descriptions, farm equipment information, farm assets, and report order information. This information will be provided initially and updated regularly through the customer service function 22. The specifics relating to the collection of these data will be further explained below in connection with the display driven software of mobile computer 20 and desktop computer 24.

PORTABLE COMPUTER SOFTWARE

Figure 3:
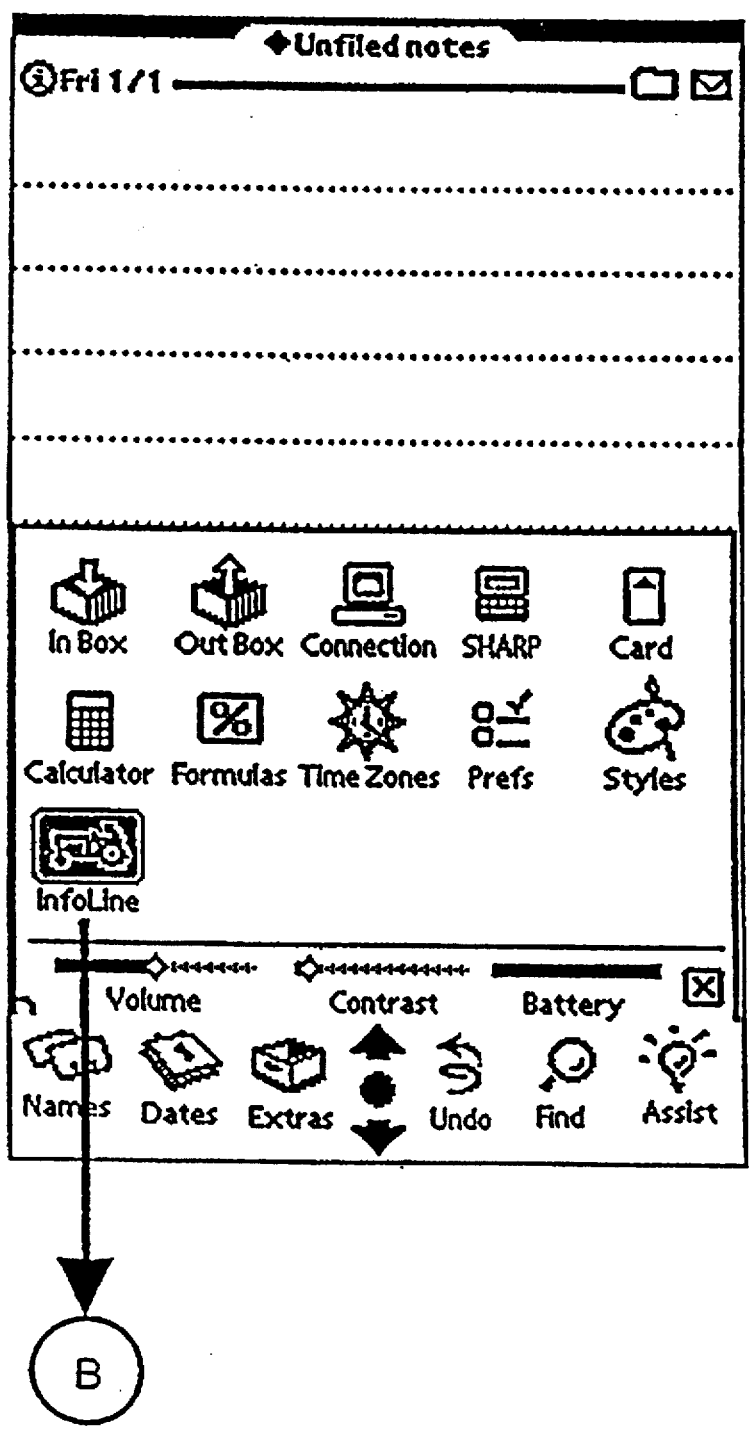
FIG. 3 is a NEWTON® display for its Extras File.
Figure 61:
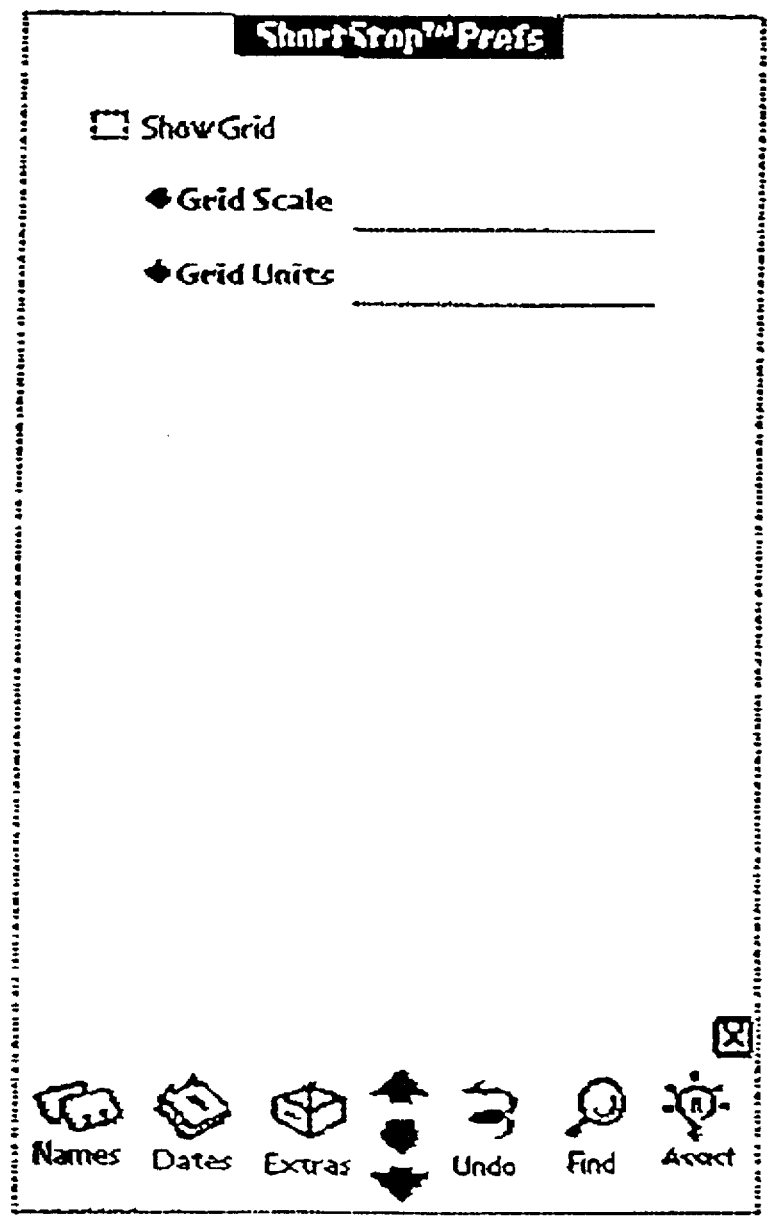
FIG. 61 illustrates a pop-up menu for a user to customize his map display.

The display driven software provided by the inventors herein for the portable computer which, preferably, utilizes a graphic user interface, may be best understood by referring to the series of drawings identified as FIGS. 3 through 61. Generally, the portable computer software is laid out as a series of nested displays of different levels with each level indicating the hierarchy of screens accessed by the user, the screens thus being grouped and organized according to the way they can be accessed. The layout is a relatively simple structure and is organized according to the logical sequence of features and functionality from the user's perspective. By maintaining a simple and consistent system layout, the user may feel comfortable in using the system by sensing their control and knowledge of their location in the system. This leads to a perception that the user can freely and intuitively navigate through the system to get where he wants to go without repeated trial and error.

Figure 4:
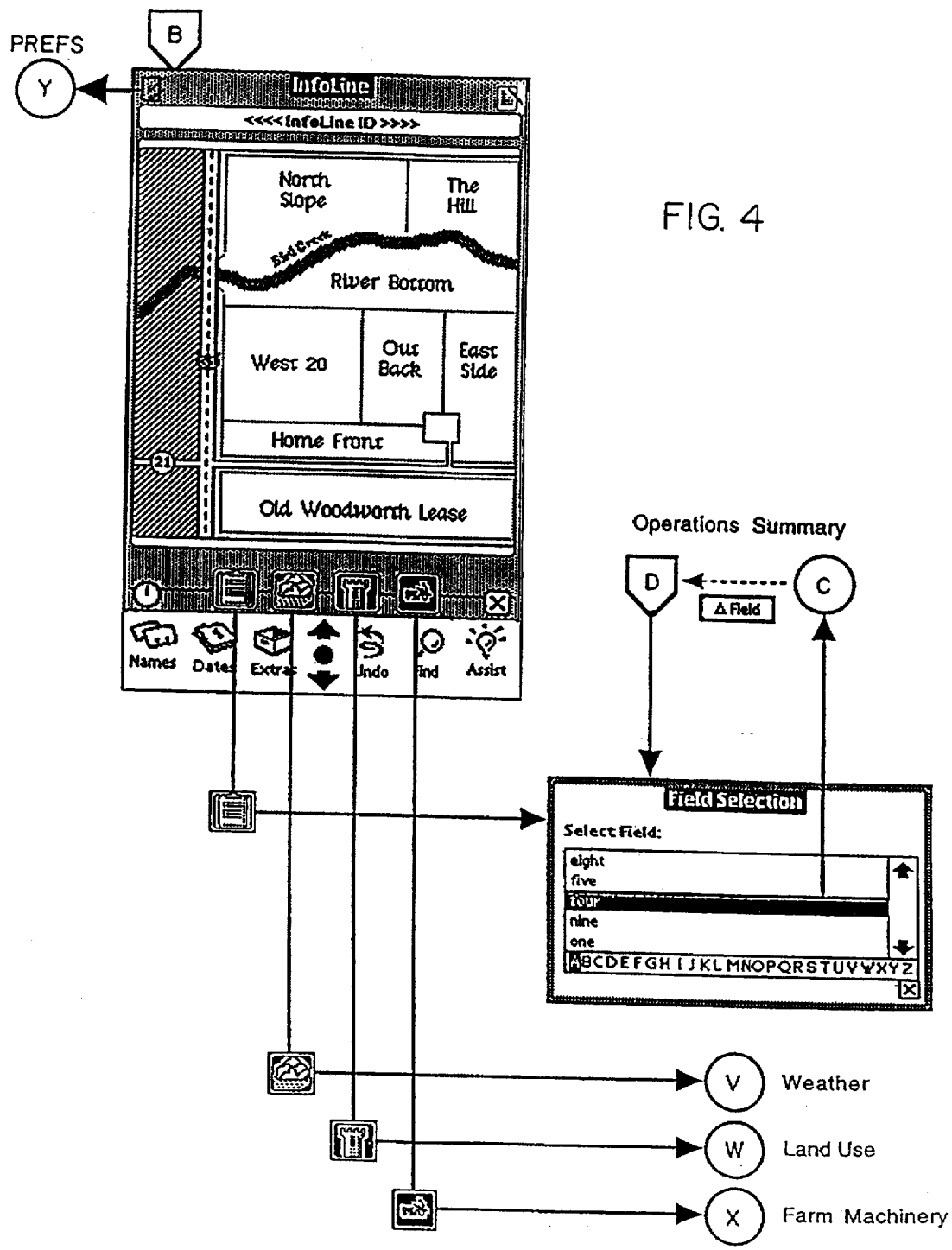
FIG. 4 is the "splash" screen or initial screen of the NEWTON® program.

FIG. 3 represents the NEWTON® Extras Drawer Screen from which the user accesses the Infoline application, or portable computer application, by tapping on the indicated picture button. By doing so, the display of FIG. 4 will appear which represents the main Infoline screen. This screen is the home base that allows the user to access the many features of the application. From this screen, the user can access or gain access to all of the Infoline application features by tapping the picture buttons shown at the bottom of the screen. As indicated in FIG. 4, and going from left to right, the "CHART" picture button selects the field selection set of nested displays. The "RAIN CLOUD" button selects the weather set of nested displays. The "SILO" button selects the land use nested displays. The "TRACTOR" button selects the farm machinery set of displays. At the upper left corner of the screen is a "preferences" button which, when selected, will display the screen of FIG. 47, permitting the user to select units of measure and enter the farm name.

Figure 5:
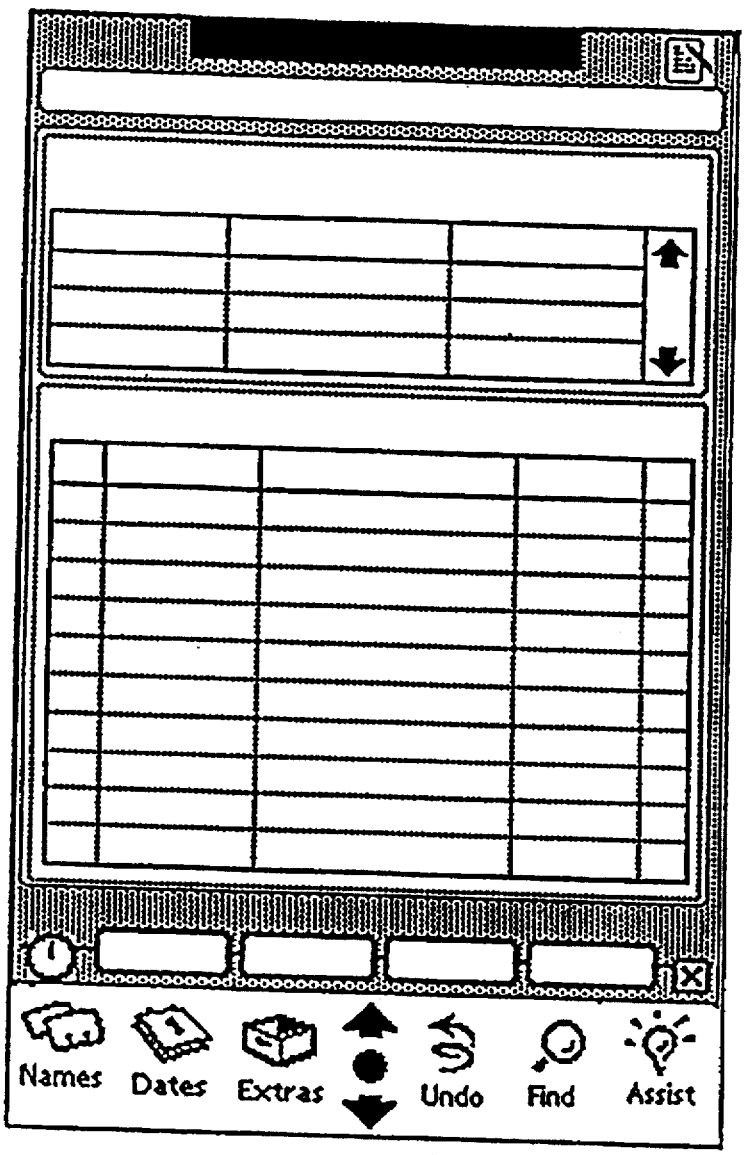
FIG. 5 is a sample NEWTON® screen depicting scrolling lists.
Figure 8:
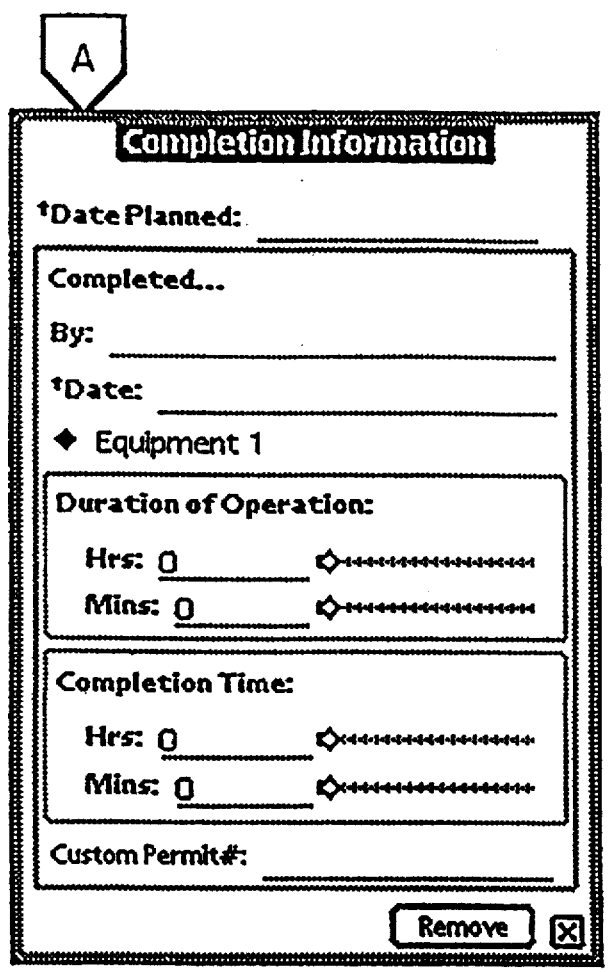
FIG. 8 is a sample NEWTON® pop-up list for the entry of completion data.
Figure 9:
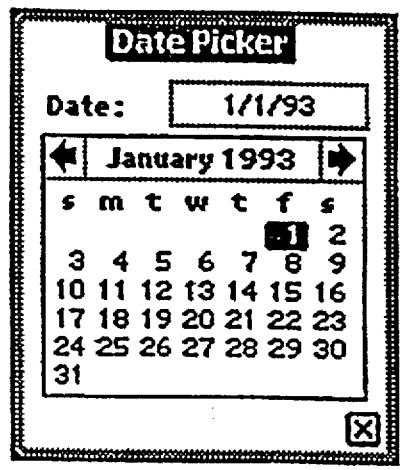
FIG. 9 is a sample NEWTON® pop-up list for picking dates to be entered.
Figure 10:
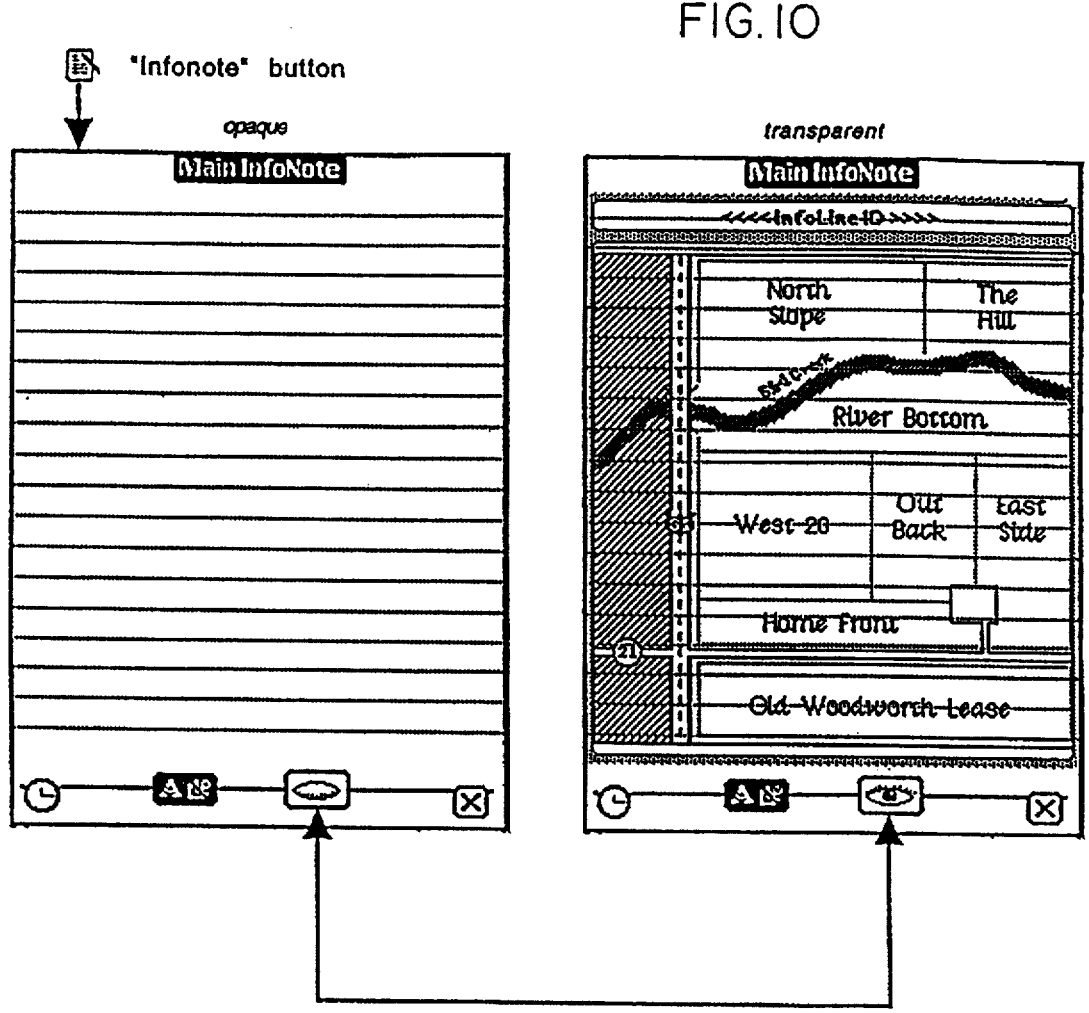
FIG. 10 depicts the NEWTON® screen for entering detail notes.

Before explaining the more detailed operation of the software, it will be helpful to first understand several conventions which are utilized throughout the software. As shown in FIG. 5, a scrolling list display provides a set of arrows which, when depressed, scroll the corresponding display. As shown in FIG. 6, multilist selections may be made utilizing scrolling displays in a "multi-picker" arrangement. As depicted in the figure, an upper scrolling list may be assembled by selecting any one of the entries in the lower scrolling list and depressing the "ADD" button, or by selecting any one of the entries in the upper scrolling display and depressing the "REMOVE" button. Access to more detailed information is available by double selecting any entry. Where multi-picking is utilized in the program, an "MP" symbol is used as indicated. Field operations may be edited as shown in FIG. 7, with the multi-picking methodology as just explained. The "ENTER INFO" button displays a completion screen as shown in FIG. 8 wherein "slide bars" are used for entering numerical data such as hours and minutes. By depressing and moving any one of the "slide bars", the number in the hours or minutes display may be moved up or down to match the desired time to be entered. A date picker is shown in FIG. 9 wherein a calendar is displayed and months may be scrolled or days of any months selected by tapping a different date in the month in order to change the displayed date which will then be entered. At various points in the program, additional note-taking information is made available through an auxiliary screen for that purpose as shown in FIG. 10 entitled "INFO NOTES". This note-taking page is accessed by tapping on the "INFO NOTE" button.

Figure 11:
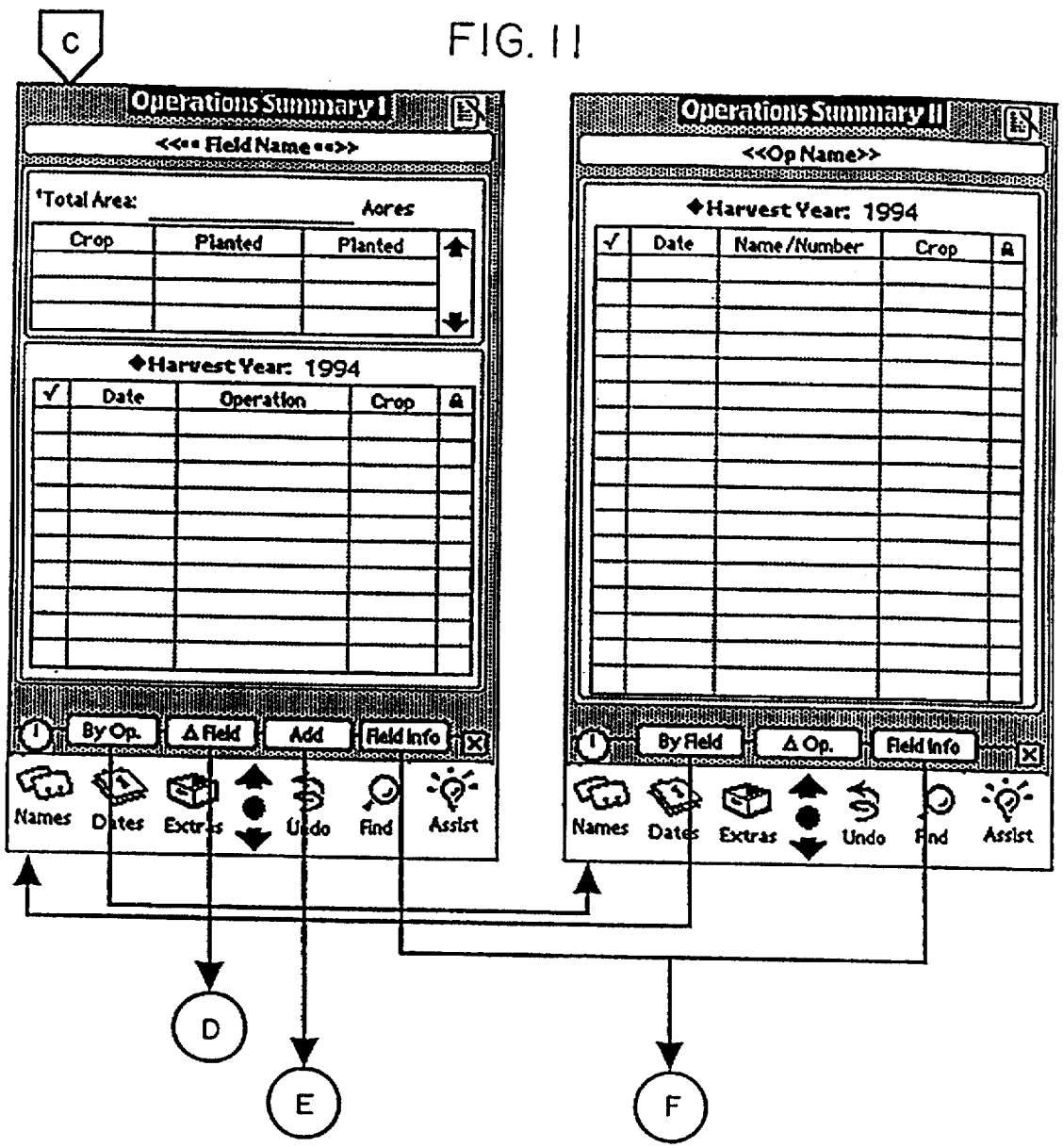
FIG. 11 is the NEWTON® screen wherein field operations may be displayed by either field or operation.
Figure 12:
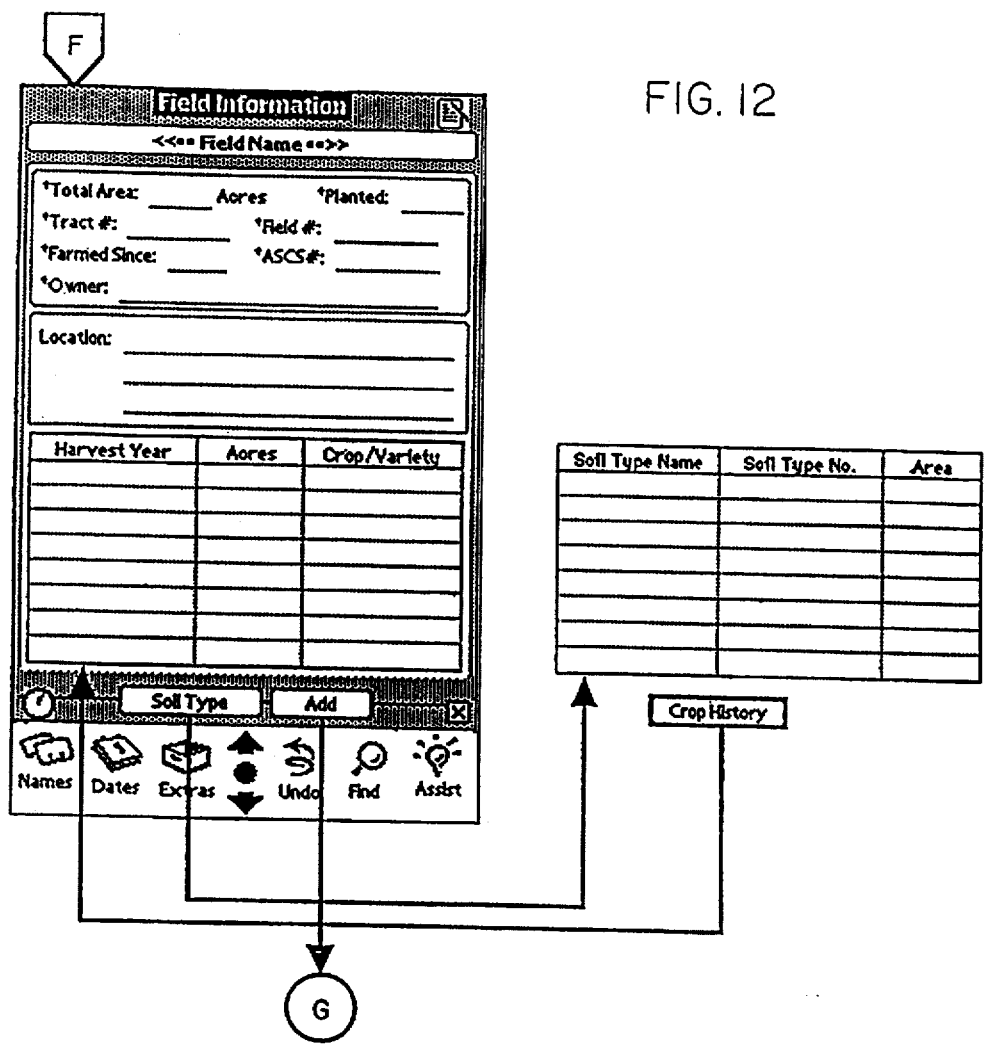
FIG. 12 is a NEWTON® screen depicting the pop-up list for adding soil type to a particular field.
Figure 13:
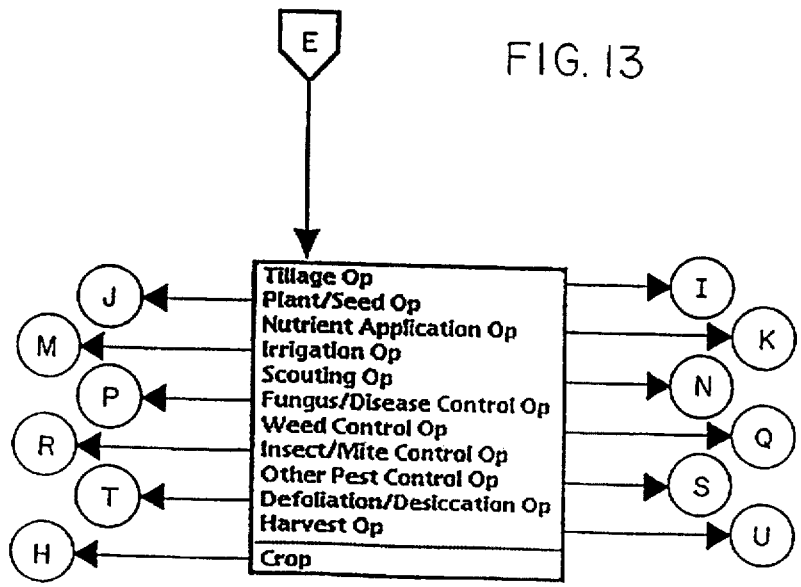
FIG. 13 is a NEWTON® pop-up list for adding field operations.
Figure 14:
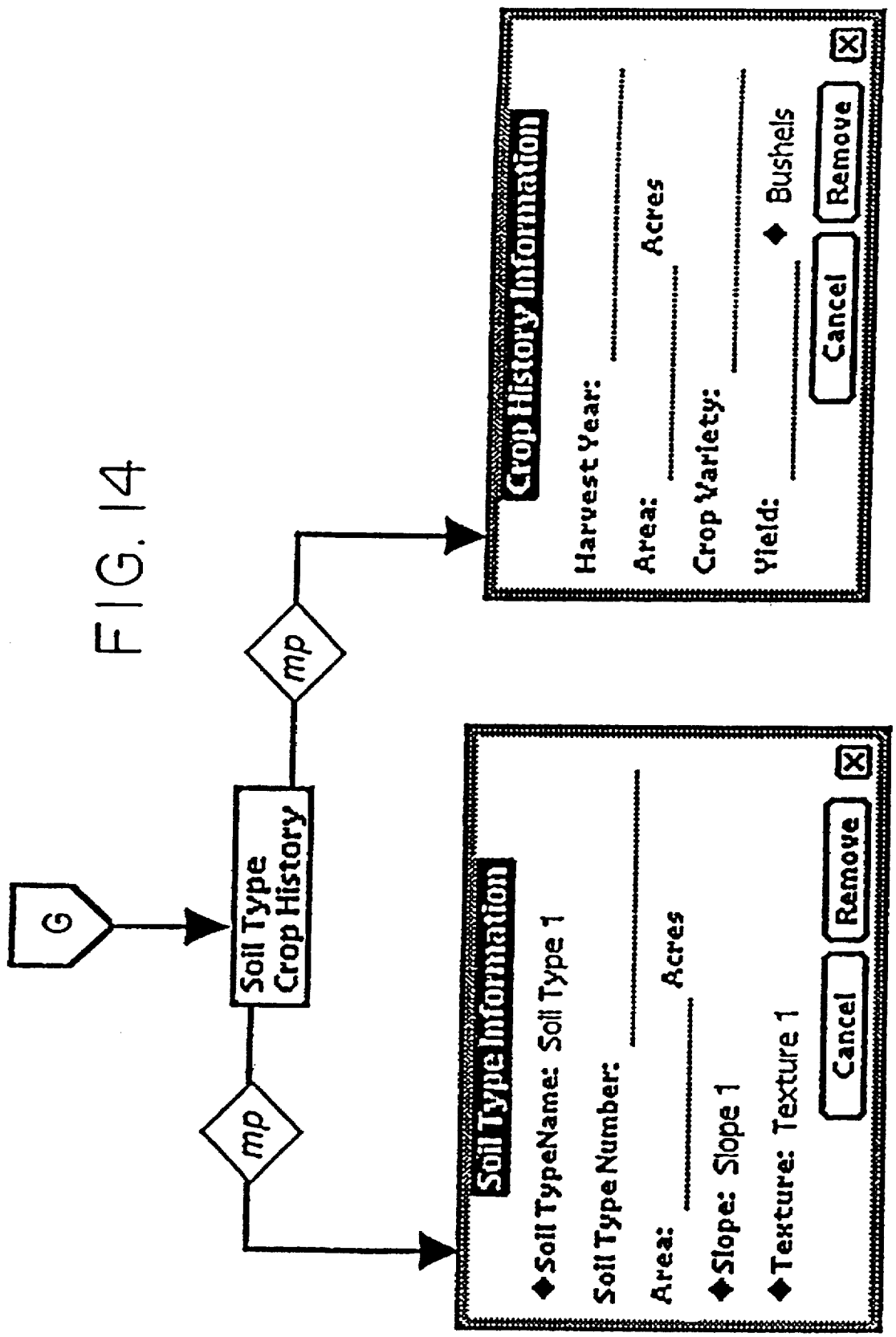
FIG. 14 are a pair of NEWTON® pop-up lists for entering soil type and crop history information for a particular field.
Figure 15:
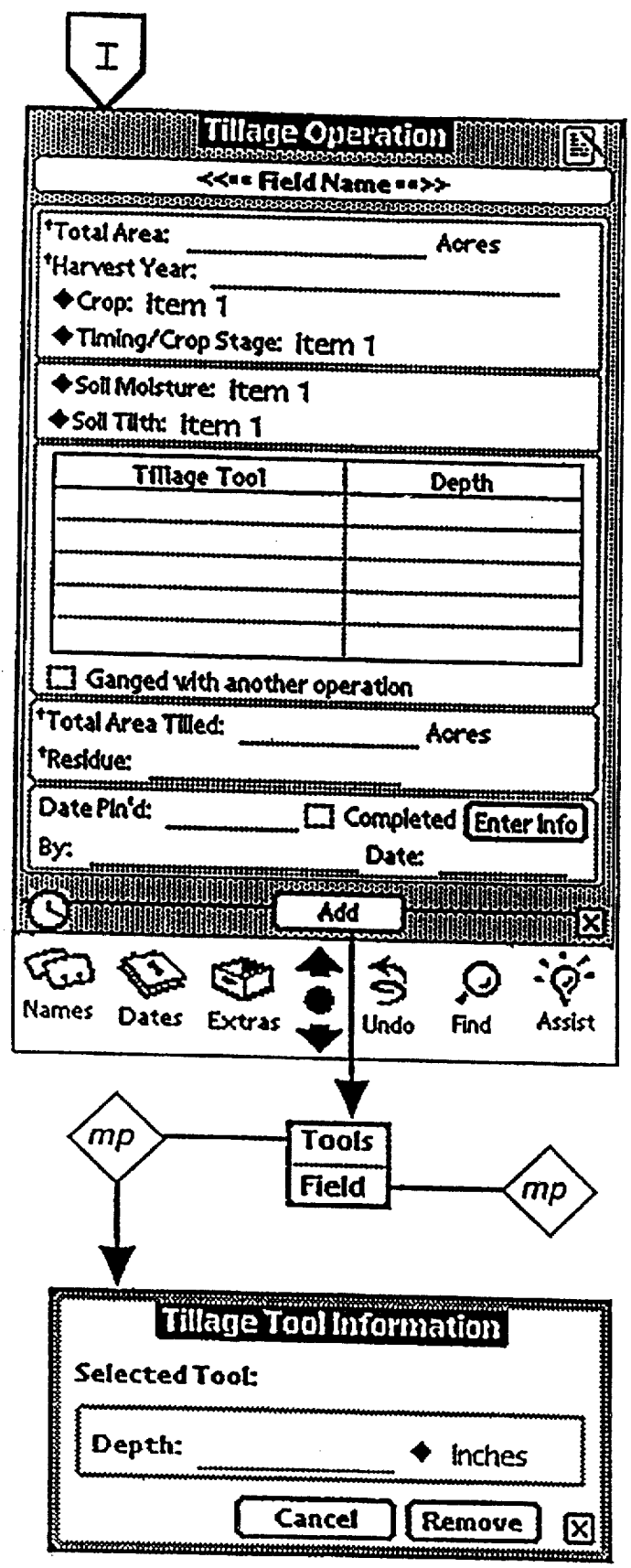
FIG. 15 is a NEWTON® screen with pop-up list for entering tillage operation information.
Figure 17:
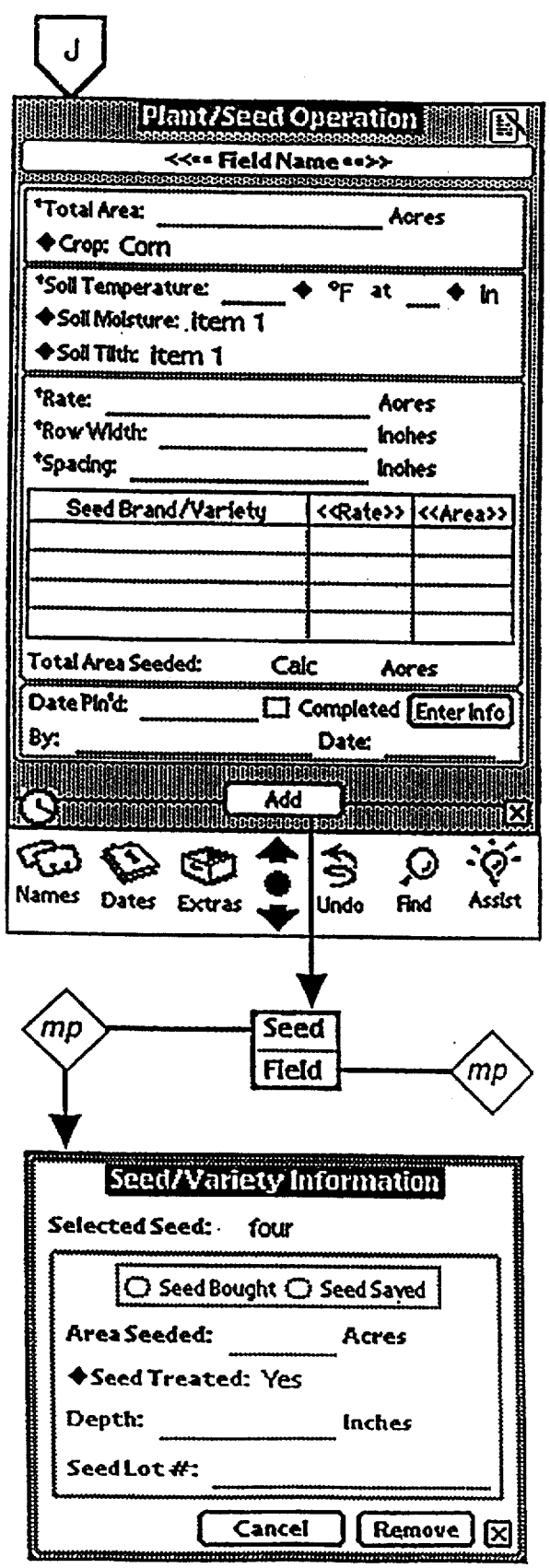
FIG. 17 is a NEWTON® screen with pop-up list for entering plant/seed operation data for a particular field.
Figure 18:
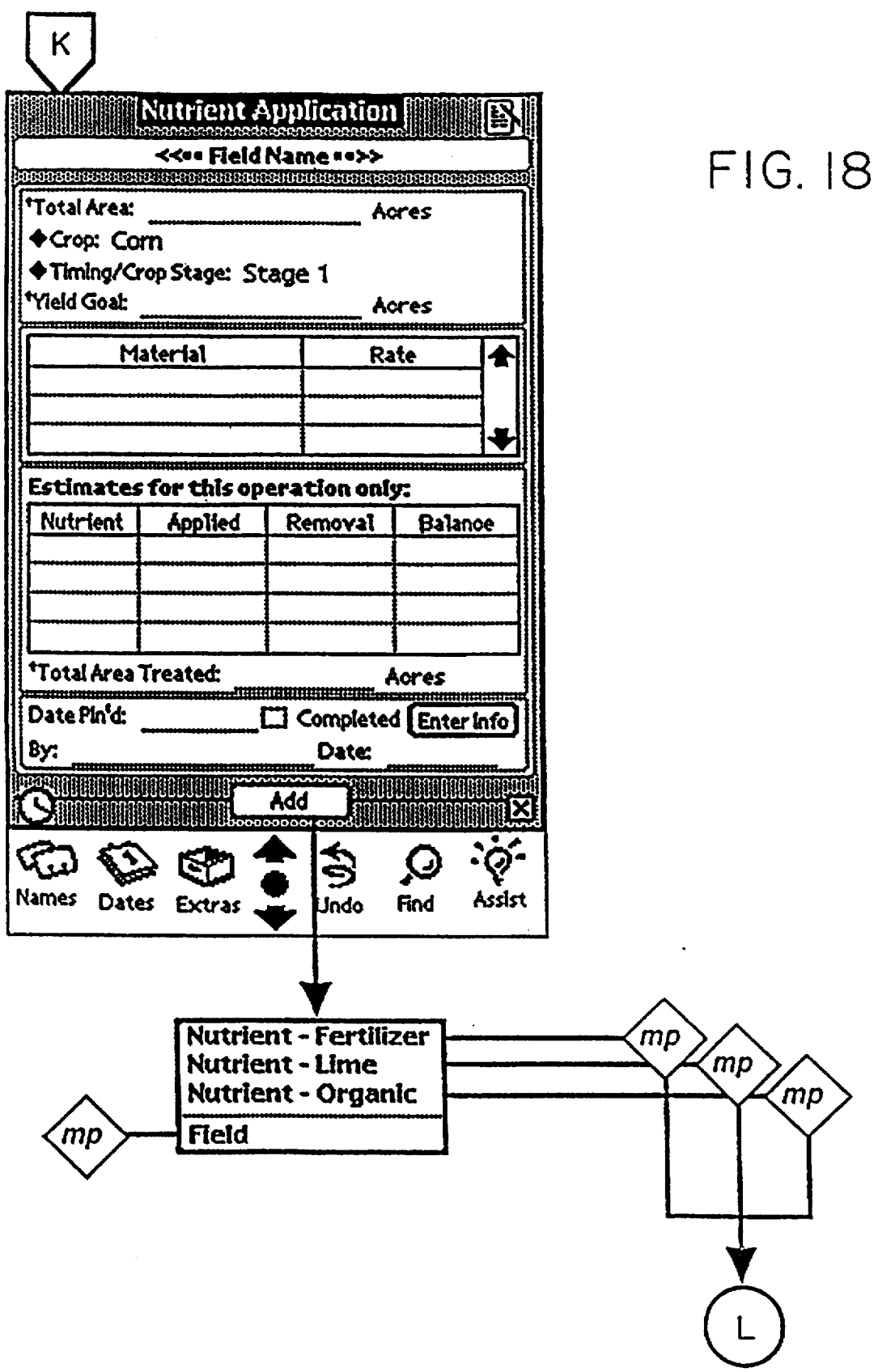
FIG. 18 is a NEWTON® screen with multi-picker function as shown in FIG. 19 for entering nutrient information for a particular field.
Figure 20:
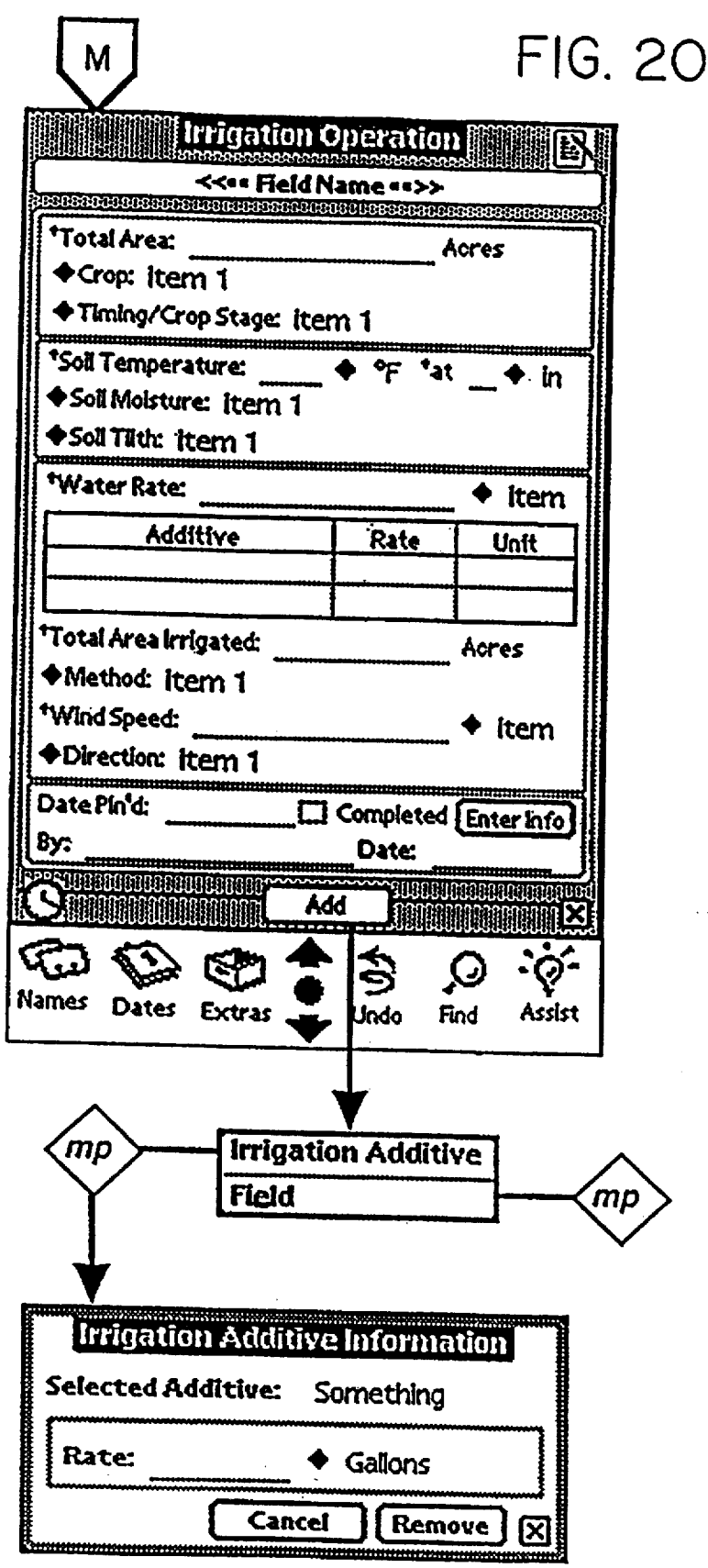
FIG. 20 is a NEWTON® screen with pop-up list for entering irrigation data with a multi-picker function.
Figure 21:
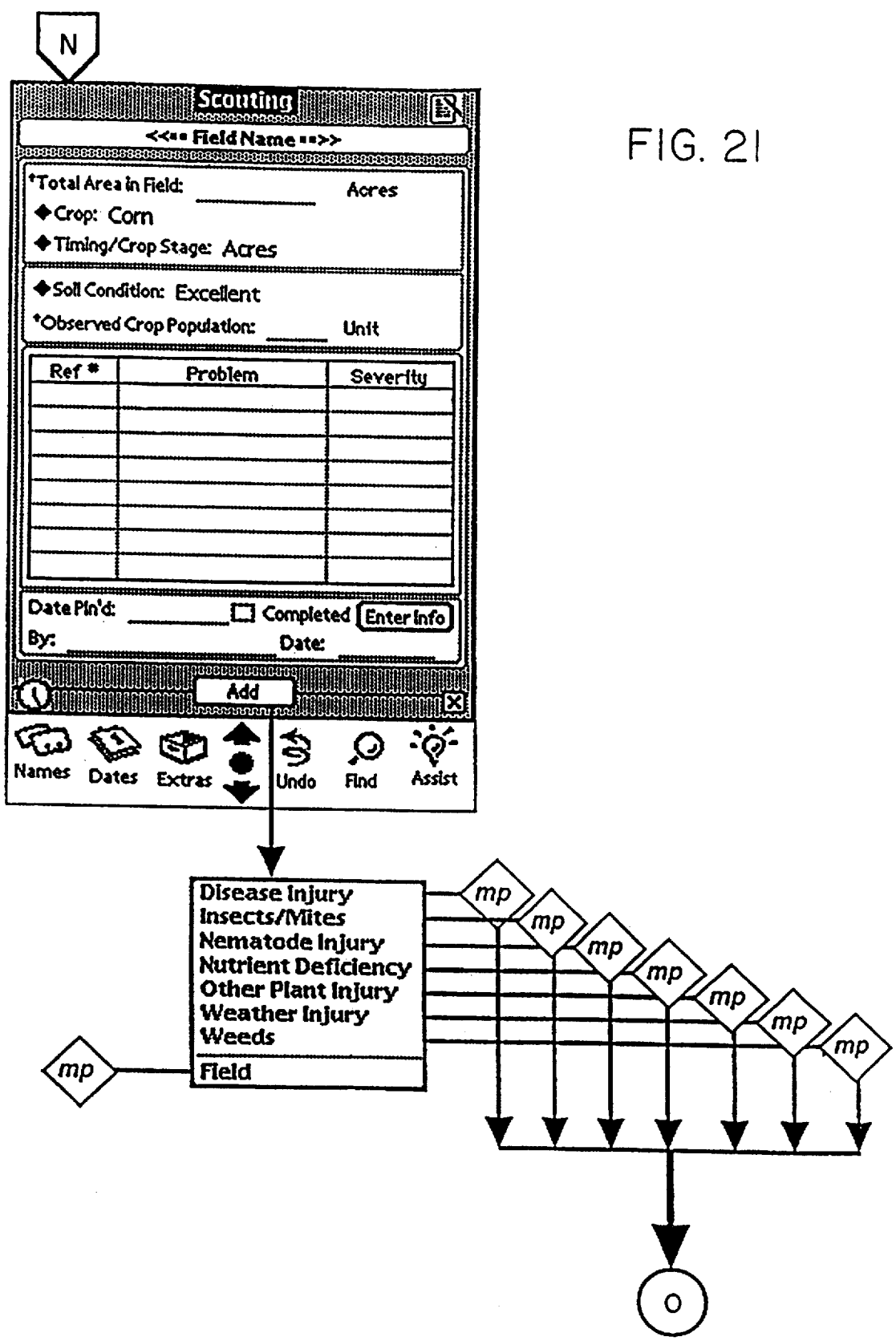
FIG. 21 is a NEWTON® screen for entering scouting information relating to various diseases, insect, plant injury, or weed information with multi-picker pop-ups as shown in FIG. 22 for a particular field.
Figure 23:
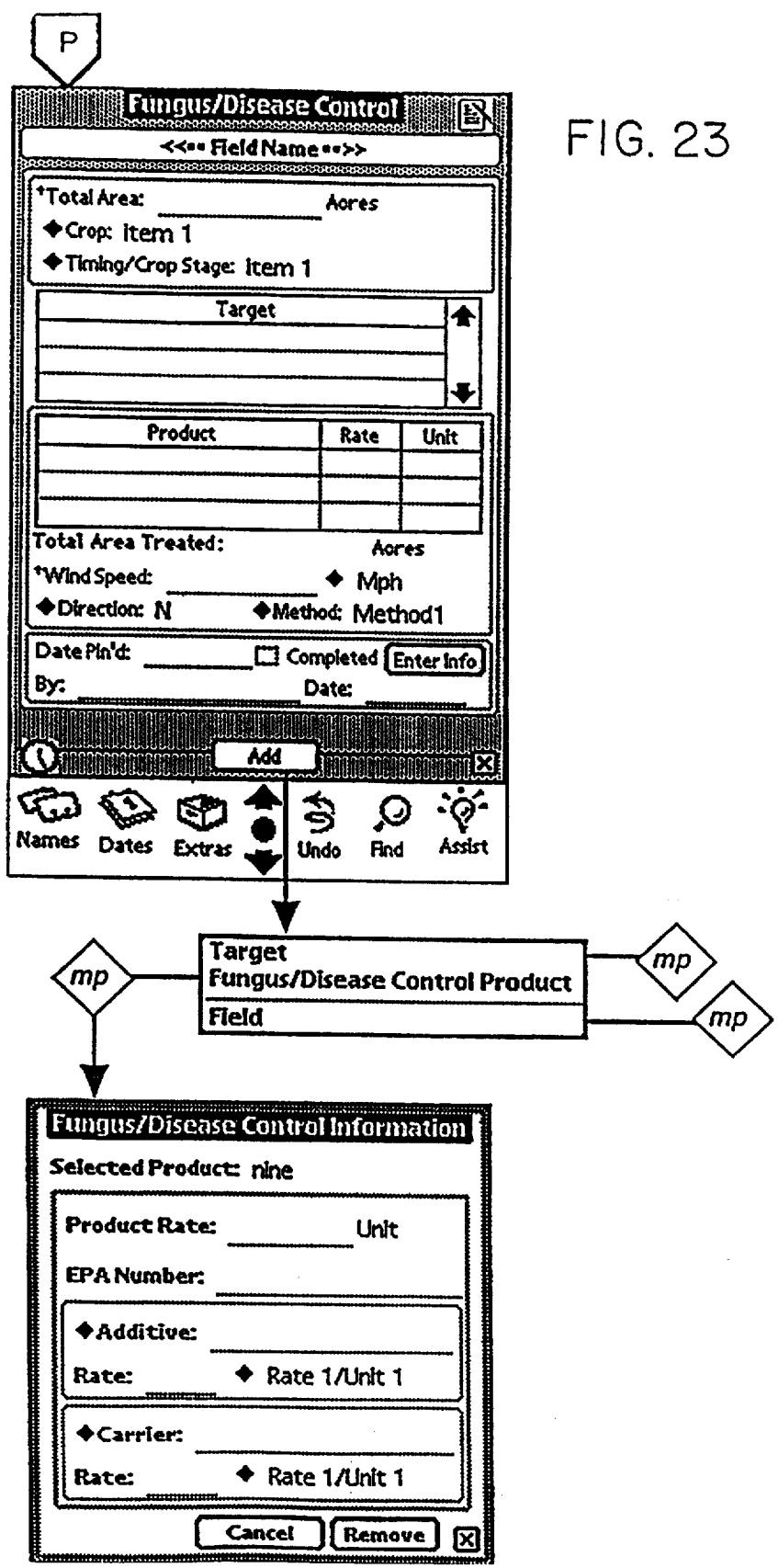
FIG. 23 is a NEWTON® screen with pop-up lists and multi-picker function for entering fungus/disease control information for a particular field.
Figure 24:
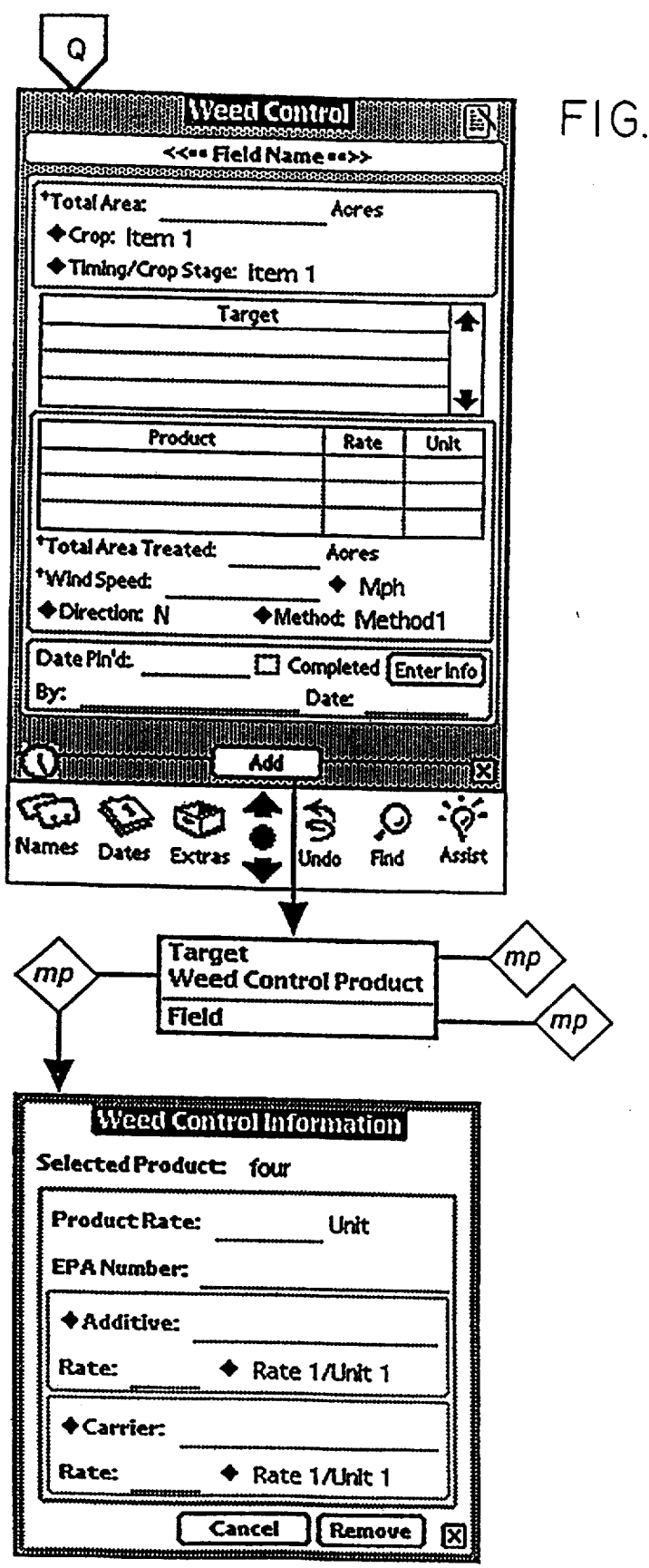
FIG. 24 is a NEWTON® screen with pop-up list and multi-picker function for entering weed control data for a particular field.
Figure 25:
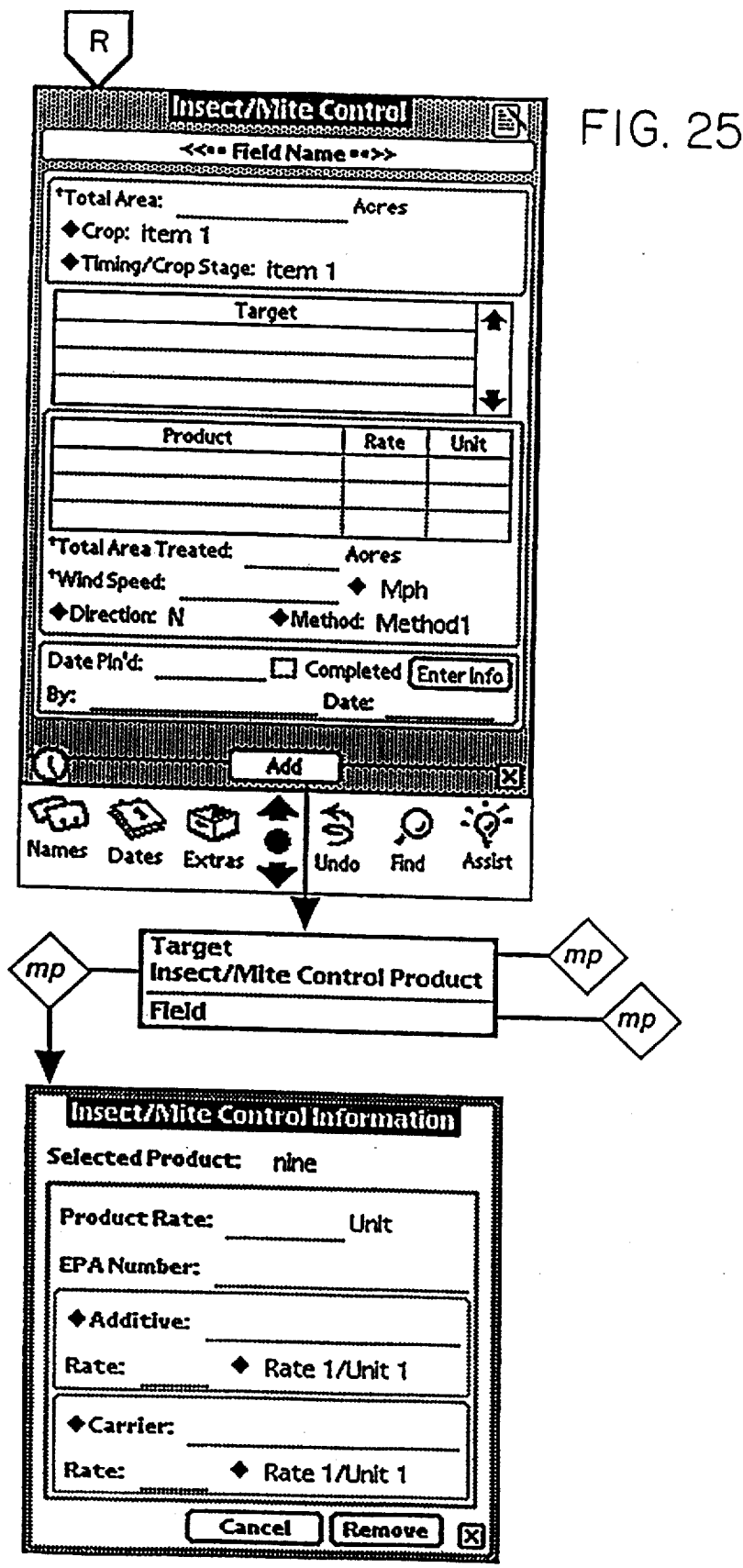
FIG. 25 is a NEWTON® screen and pop-up list with multi-picker function for entering insect/mite control data for a particular field.
Figure 26:
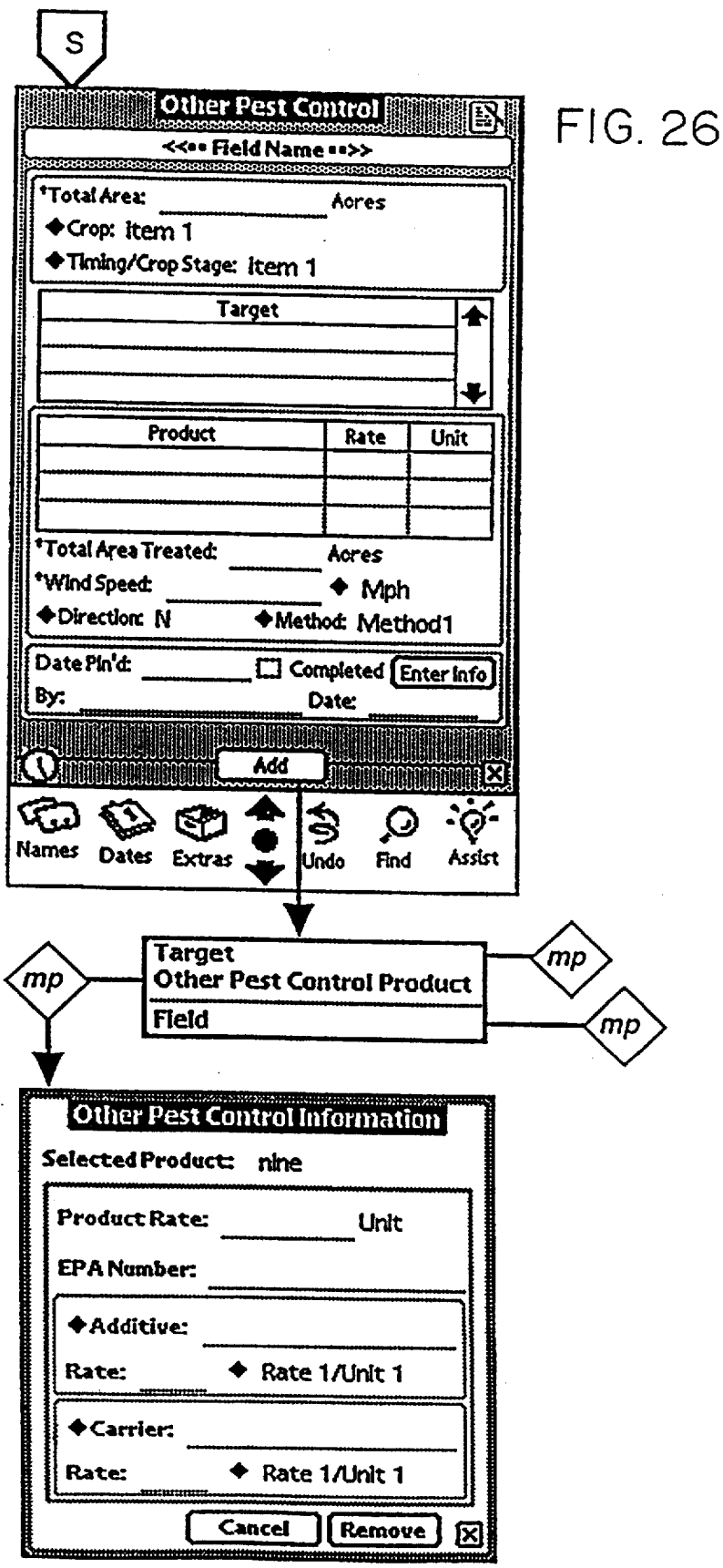
FIG. 26 is a NEWTON® screen and pop-up list with multi-picker function for entering pest control data for a particular field.
Figure 27:
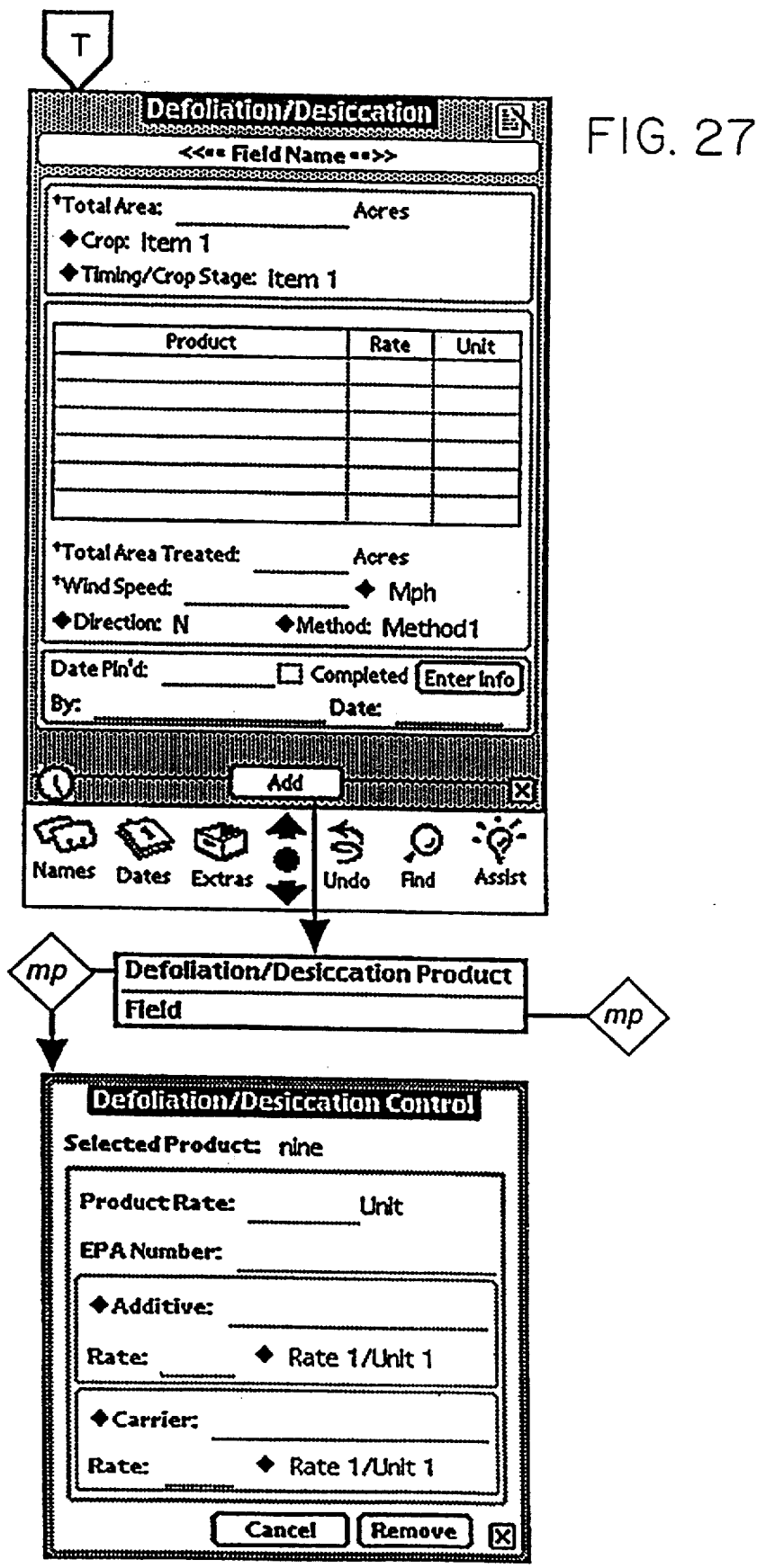
FIG. 27 is a NEWTON® screen with pop-up list and multi-picker function for entering defoliation/desiccation data for a particular field.
Figure 28:
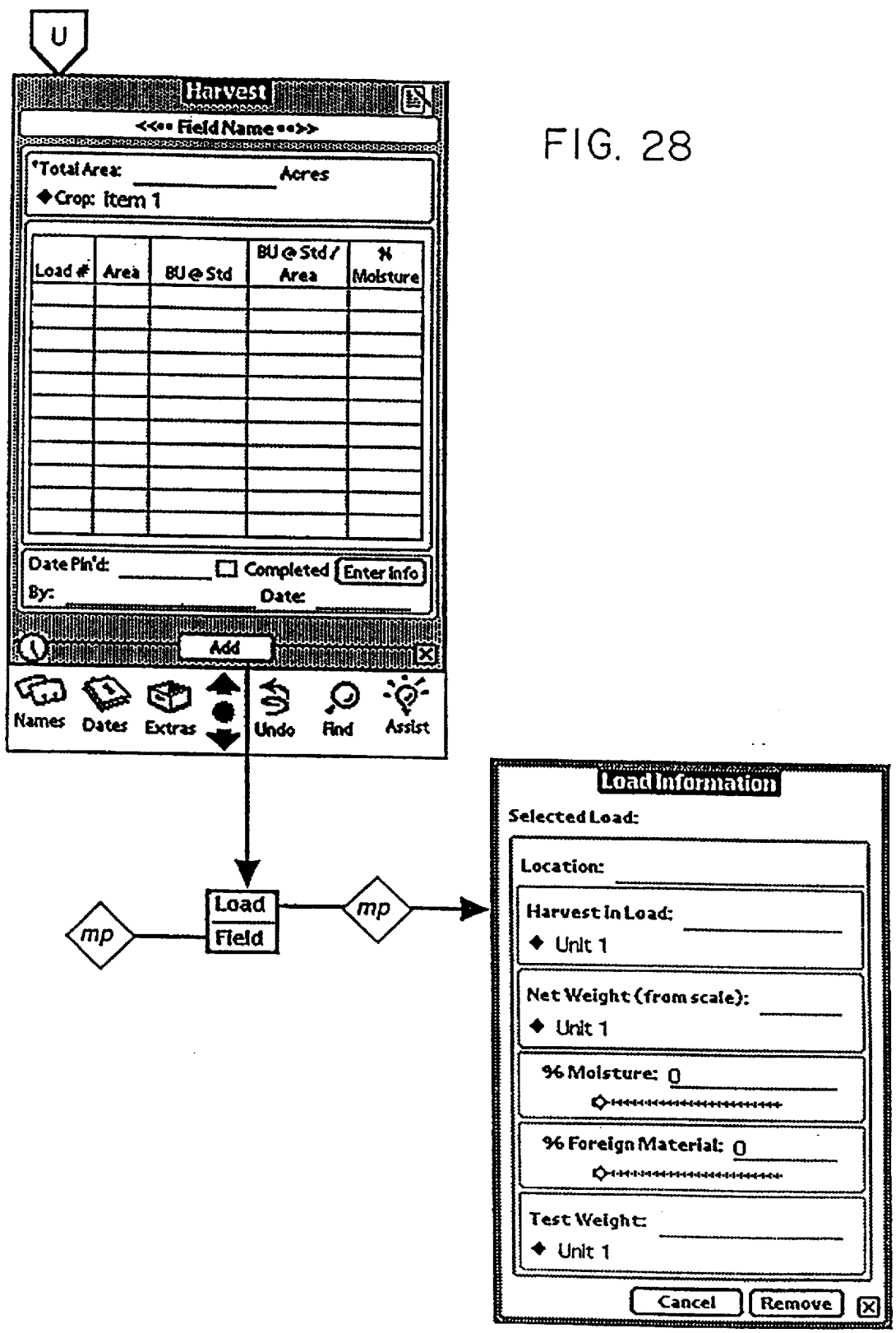
FIG. 28 is a NEWTON® screen with pop-up list and multi-picker function for entering data relating to harvest information for a particular field.

Having explained these program conventions, movement by a user through the nested display program may be more readily understood. As shown in FIG. 4, a field selection may be selected which initially changes the display to the operations summary by field. These operations may also be displayed by the kind of operation as also shown in FIG. 11, and more detailed information about the field itself may be obtained by tapping the indicated button which moves the display to FIG. 12. As indicated in FIG. 13, various operations may be readily added to the displayed page when accessed through the "ADD" button. Furthermore, soil type and crop history information may be added as shown in FIG. 14 by tapping the "ADD" button in the field information display as shown in FIG. 12. In adding the operations, additional detailed information may be added as shown in FIG. 13 which produces one of a number of pop-up displays wherein, for example, the type of tool may be selected with a multi-pick step (FIG. 15) and the field may be selected with a multi-pick step as well, or the crop may be selected (FIG. 16). For plant/seed operations as shown in FIG. 17, the type of seed and other detailed information may be entered through a pop-up screen with a multi-picking step. The other operations may also provide further detailed information as is readily understood by referring to FIGS. 15-28.

Figure 29:
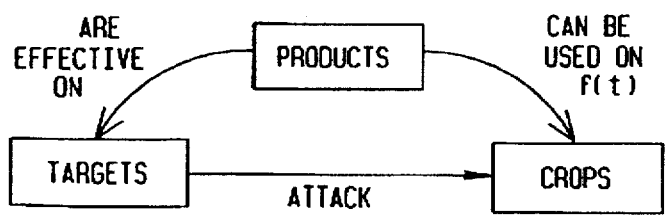
FIG. 29 is a flow chart depicting the logic used in constructing context sensitive lists.

As is apparent from the foregoing, a good many of the displays in this software are utilized to collect data entered by the farmer which relate to agricultural operations on selected fields of his farm. This data are entered through a graphic user interface and without the use of a keyboard through the multi-picking convention as previously explained. The tables which are generated for the multi-picking selections are preloaded into the portable computer memory. However, in order to minimize the available choices in various lists, the software includes a subroutine for generating what are called "context sensitive" pop-up lists which eliminate irrelevant or impossible choices through which a farmer must scroll in order to select an appropriate choice. This greatly simplifies the farmer's choices in many instances and is an effective tool for minimizing the amount of time required by a farmer to scroll through lists of available choices and make data entry. A "flowchart" of the logic used in eliminating choices for these "context sensitive" scrollable lists is shown in FIG. 29. One such set of data involves products, such as herbicides which a farmer would typically use in all the various farming operations on his crops. This corresponds to the "products" as shown in the figure. Targets are those diseases or infestations which attack the particular crop. Thus, for any particular kind of disease, there are certain products which would be effective thereon and would be selected for display. Also, certain kinds of products are suitable for use during certain growing stages and not others. Thus, depending upon the growing stage, other products would be selected or eliminated. Using this logic, a pop-up list of herbicides could be paired down based on the crop, point in time of its growing season, and the particular disease or infestation identified by the farmer.

Figure 30:
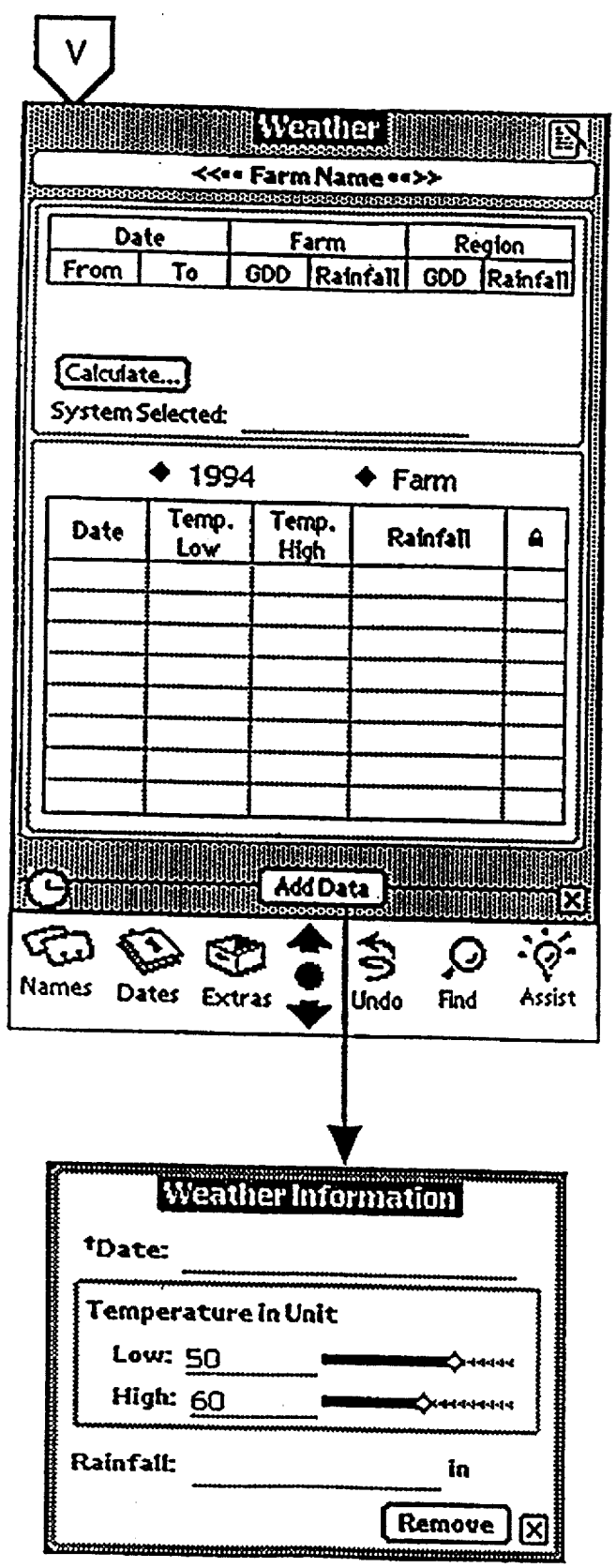
FIG. 30 is a NEWTON® screen and pop-up list for entering data relating to weather for the farm.
Figure 31:
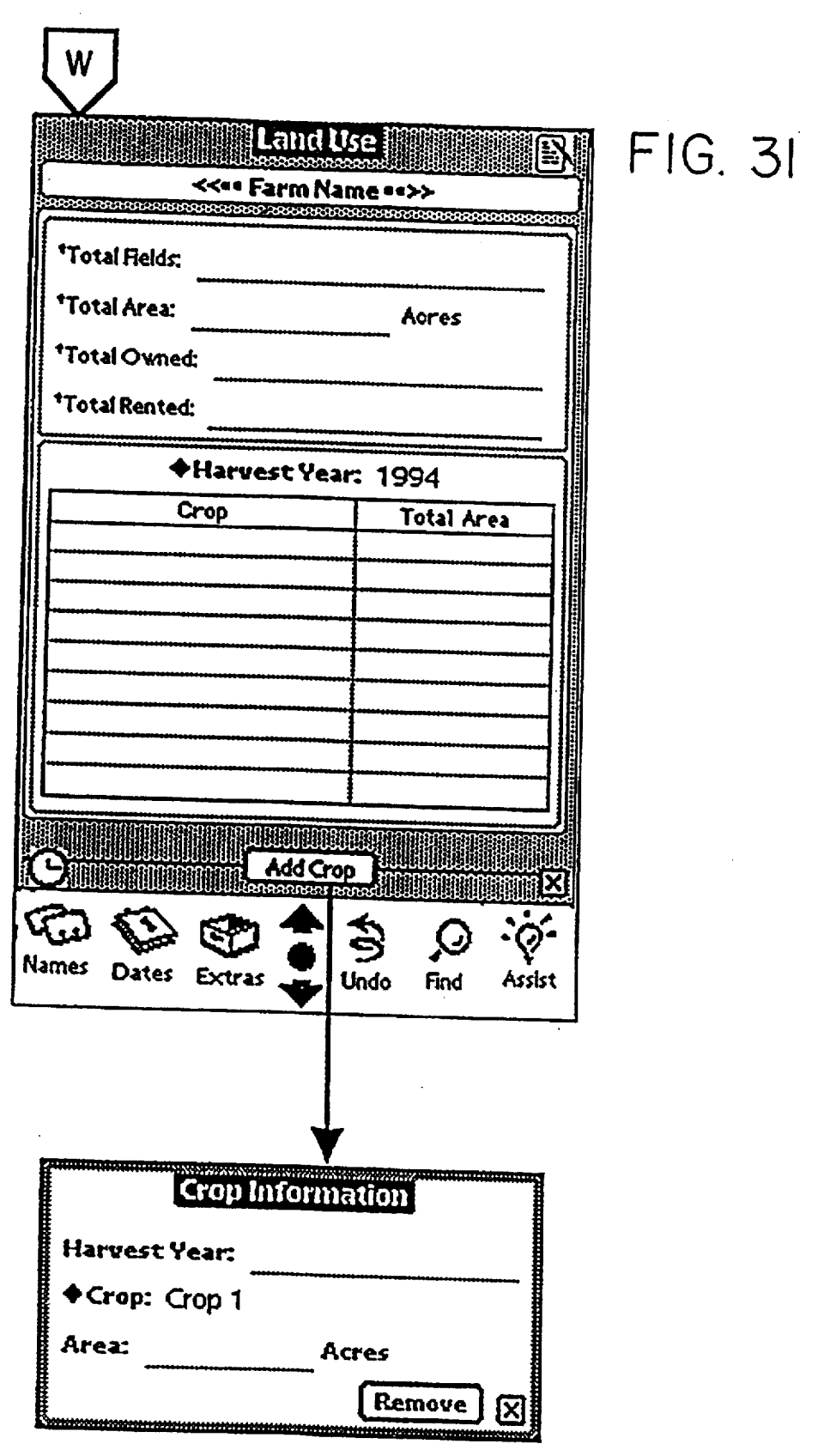

In addition to the operations data which may be conveniently input through the nested display arrangement as previously explained, weather information may also be input by a farmer using the display as depicted in FIG. 30. This weather information includes high and low temperature as well as any rainfall. Additionally, a calculation may be made to determine growing degree days, as indicated. The display shown in FIG. 31 permits entry by a farmer of the various kinds of fields comprising the farm, as well as crop information for each field. Lastly, as shown in the FIG. 32, a summary list may be conveniently assembled of all of the farmer's equipment, with further detail for each piece of equipment as depicted in the pop-up list accessible through the "ADD EQUIP" button. Once added, selection of any line item of equipment will display the same data for reference by the farmer.

The foregoing functional explanation of the nested display program for use on a graphic user interface portable computer has been explained. As a further explanation of the nested display logic, a logic diagram showing the display hierarchy with word descriptors was included as Exhibit B in the parent application. This information will help further explain the nested display hierarchy in order to further ensure a complete understanding of the present invention. Furthermore, the detailed data which is to be used to populate the various pop-up lists, such as soil type, is detailed in Exhibit C of the parent application. However, these data would be well known to those of ordinary skill in the art, readily accessible in well known reference materials, and a matter of design choice. It is anticipated that this information will be customized with respect to the particular growing area for which the invention will be provided. Not only is this data well known to those of ordinary skill in the art, but it continues to evolve as new herbicides are developed, new soil typing is determined, new equipment is developed, new seed types are developed, etc. such that the lists which are provided herein are subject to change over time.

In order to enter this information into the mobile computer 20, one of several alternatives maybe utilized. As explained above, this information may be entered by a customer service function 22 who may provide a data link connecting the mobile computer 20 with a lap top or other computer brought on site by the representative. Alternately, the information may be downloaded to the farmer's desktop computer 24 through the messaging company 26, or over a data service, and then transferred to the PDA over a data link, such as an RS232 connection. As still another alternative, a PCM card 38 (see FIG. 2) may contain this data and may be inserted into a card slot 40 for a card reader 42 on the mobile computer 20. This is considered to be a matter of design choice for entering base data into the mobile computer 20.

GPS POSITION HARDWARE AND SOFTWARE

Figure 48:
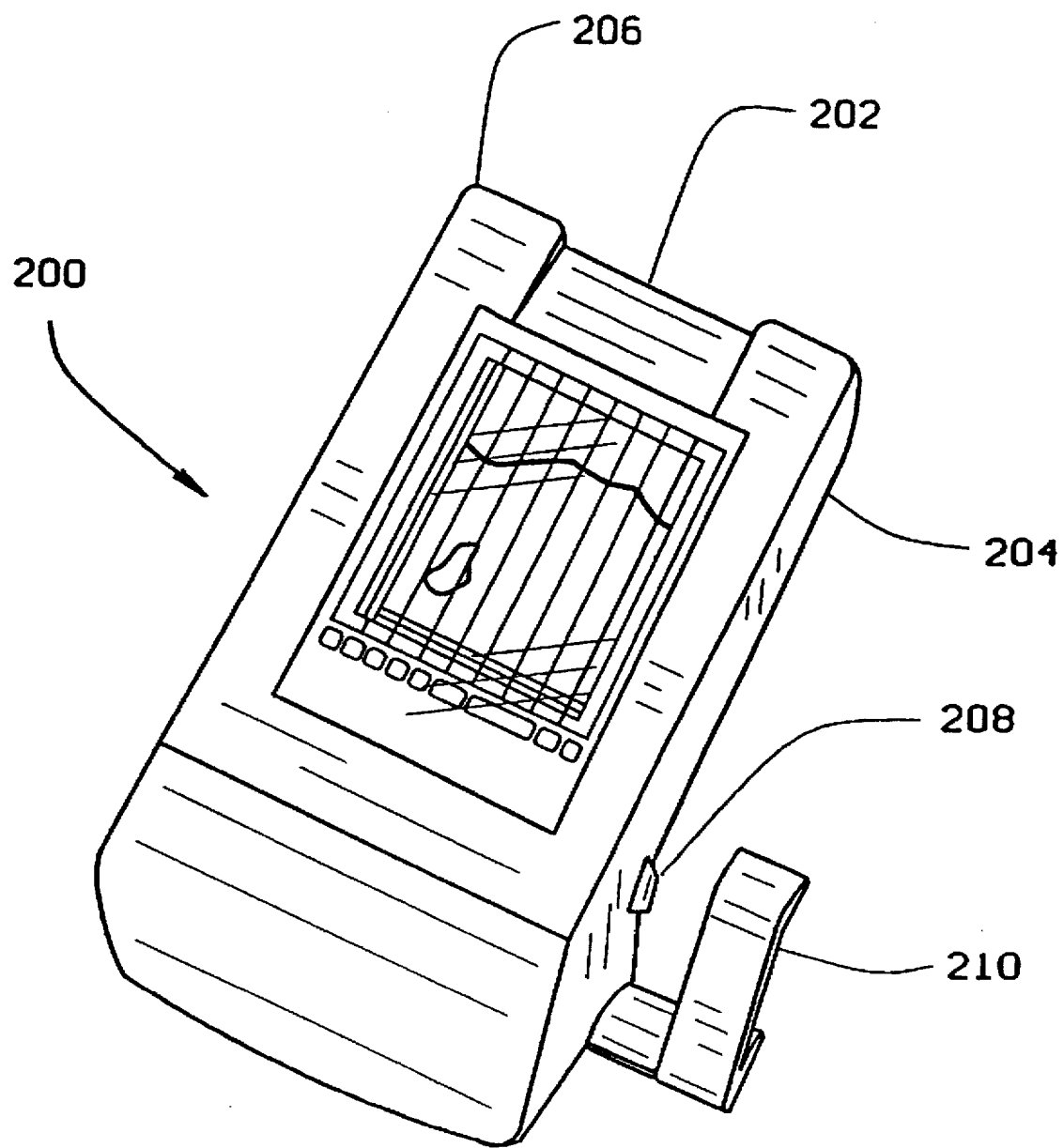
FIG. 48 is a perspective view of the handheld data collection device of the present invention.

As shown in FIG. 48, the hand-held data collection device 200 of the present invention is comprised of a PDA such as a NEWTON® 202 programmed with the stored program of the Microfiche Appendix along with a combined GPS/dGPS receiver 204, both of which are conveniently held by a boot 206 in a single hand-held configuration. The receiver 204 is connected by cable 208 to the standard input of the PDA 202, and an antenna 210 is mounted to the receiver 204 to receive the appropriate satellite and broadcast signals, as is well known in the art.

Figure 49:
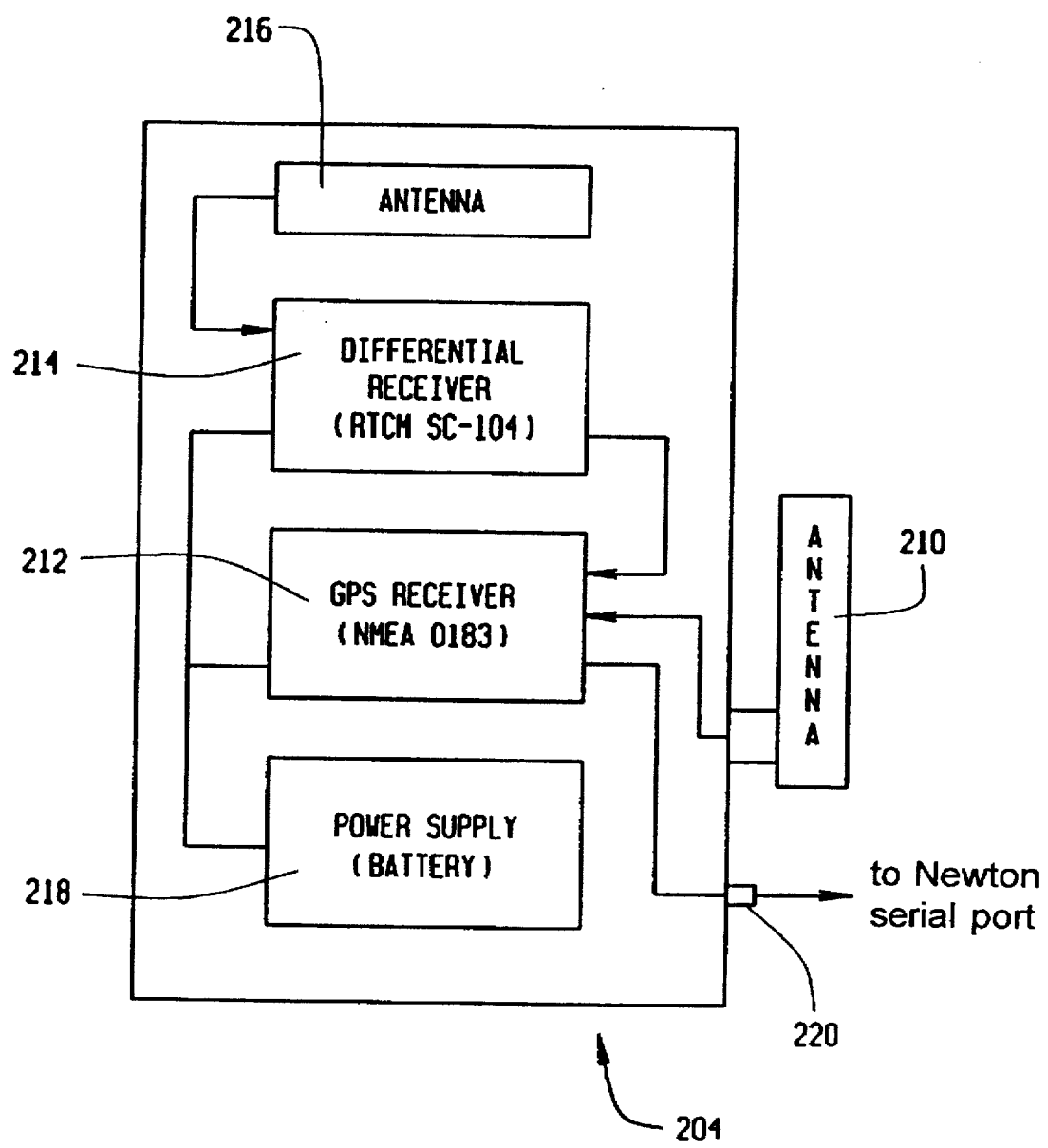
FIG. 49 is a block diagram of the GPS/dGPS receiver module.

The combined GPS/dGPS receiver is shown in block diagram in FIG. 49 and includes the antenna 210 which connects to GPS receiver 212. Differential receiver 214 has its internal antenna 216 and the output which is connected to GPS receiver 212 to provide a correction signal, as known in the art. A power supply (battery) 218 powers both the GPS receiver 212 and dGPS receiver 214. The corrected GPS position data is then output to the serial port of the PDA through a serial connection 220. The inventors consider that any commercially available GPS and dGPS receiver cards may be readily used to implement the receiver 204 as shown in FIG. 49. For example, Rockwell's Microtracker OEM cards, or similar cards provided by Garmin or Trimble, may also be used for the GPS receiver while DCI's "pager" receiver or AccQ Point dGPS receiver cards may be used for the dGPS receiver. All of these offerings are commercially available and have a sufficiently miniaturized footprint and low power requirement to satisfy the requirements of the present invention.

Figure 50:
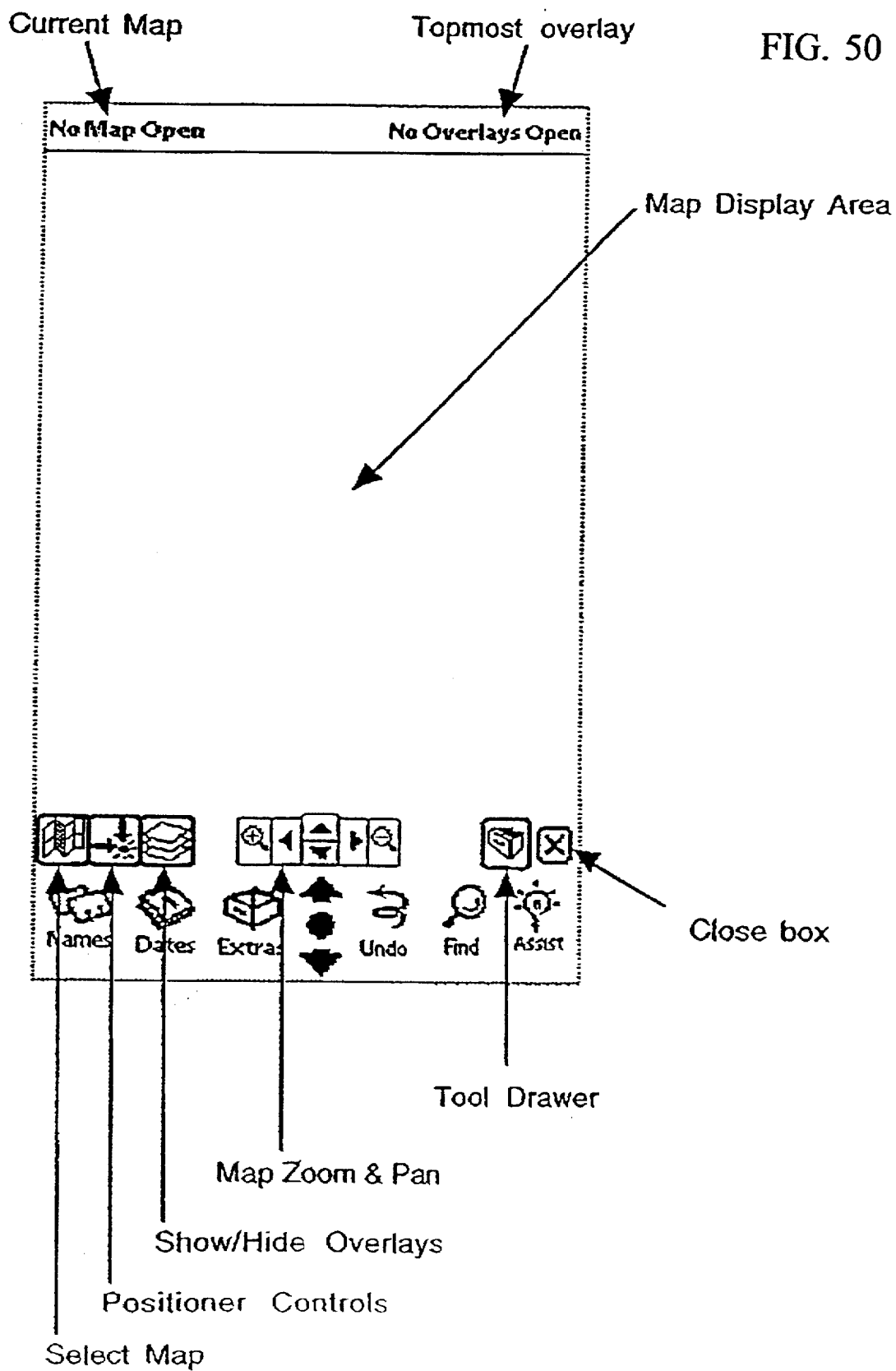
FIG. 50 is a sample display of the PDA detailing the operable button controls.

As shown in FIG. 50, the PDA receiver screen has a map display area where the currently selected map and any enabled data layers are shown. The name of the current map is shown in the upper left corner of the screen, with the topmost data layer being displayed as indicated in the upper right corner. At the upper left, the identifier of the map presently open is also displayed. As indicated in FIG. 50, no overlays are displayed and no map is indicated as being open. The operating buttons across the bottom area of the screen provide access to the various features of the data collection device of the present invention. These include a select map button, a positioner control button, a show/hide overlay button, a number of map zoom and pan control buttons, and a tool drawer.

As shown in FIG. 51, the map selection button, when tapped, displays a list of available maps for user selection. The software also gives the user the option of creating a new map by, for example, walking the perimeter of an area with the GPS/dGPS receiver enabled and recording the vertices that define the map's boundary. The list of available maps includes stored maps which may be vector boundary maps that the user has created, or vector or raster (bit map) maps that the user has uploaded from another source, such as a desktop GIS package running on the desktop computer. Vector maps are uniformly scalable using the map zoom control buttons while raster maps are displayed only at the scale at which they are stored. Both map types may be panned (scrolled) if they are larger than the display screen of the PDA.

As shown in FIG. 52, the positioner control button, when activated by tapping, brings up a panel allowing a user to control the operation of any attached geographic positioning device, such as the GPS/dGPS receiver 204. The software interface to the positioning device is implemented as a "drop-in" driver, allowing the data collection device core software to work with any positioning device for which a driver has been developed, and easily extended to support any positioner device or positioner service which may become available in the future. As shown in the drawing, a list of installed drivers appears in a pop-up list of positioners. Once selected, the positioning device is enabled and the status of the service is displayed at the bottom of the control panel. As shown in the drawing, no currently active positioner has been enabled. The control panel may be closed when the service is available and reopened at a later time to disable the service or verify its current operational status.

As shown in FIG. 53, the show/hide overlay button is illustrated and indicates that tapping on the "overlay" button brings up a list of transparent data overlays that have been installed in the data collection device, allowing the user to select which layers should be presently shown or hidden. Multiple overlays may be visible at the same time, but only the uppermost or topmost overlay can receive data input and interact with the user. The last overlay selected for display becomes the topmost, but each visible layer is added to a pop-up list in the upper right corner of the map display area, which always shows the name of the current topmost layer. Tapping on this list displays the list and allows the user to bring a different layer to the top for data entry or manipulation thereof. The topmost layer also has the option of displaying its own subviews, as long as the user may drag them out of the way or close them, and is given a space in the button area in which it may install its own button or control (the "dynamic" button area).

Each overlay is implemented as a "drop-in" extension, allowing the mapping and positioning services of the core software to be easily extended to serve a variety of industry specific functions. The example in FIG. 53 shows an Annotation layer, allowing the user to mark-up and annotate the map, a Navigation layer, which allows the user to input a target location on the map and locate it relative to their current position, and a "Field Scouting" layer, which is a crop-scouting layer specific to agriculture. Replacing the "Field Scouting" layer with a "Tree Scouting" layer (for example) would allow the core software to serve the forestry industry as well. Other examples include the utility industry, energy, disaster, oil and gas, mineral, traffic, roads and highway, etc.

Figure 54:
FIG. 54 illustrates the map zoom/pan buttons.

As shown in FIG. 54, the zoom/pan controller is intrinsic to the core software, providing the user the ability to scroll the visible map area around the full map, and to zoom-in or zoom-out the map scale to an appropriate level of detail.

Figure 55:
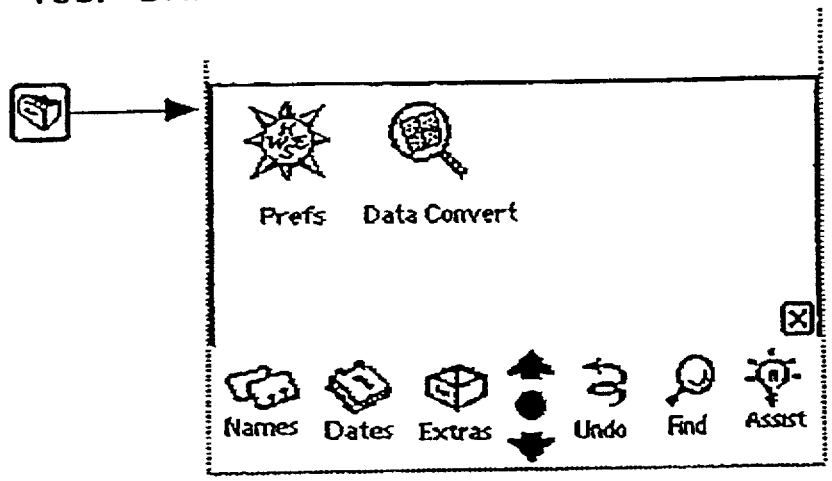
FIG. 55 illustrates the tool drawer display.

As shown in FIG. 55, tapping on "Tool Drawer" button allows the user to access selectable options (preferences) of the core software, plus any additional services or utilities that have been installed.

Figure 56:
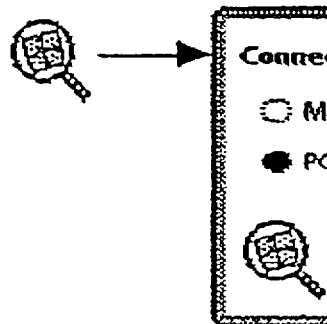
FIG. 56 illustrates a sample tool display.

"Tools" can be added to the core software as drop-in extensions allowing the base application to be extended as needed for industry specific requirements. The example in FIG. 55 shows the addition of a data conversion utility allowing the PDA to exchange data with a desktop based GIS produce "ArcView2™", via a direct serial connection. Additional services could be provided to allow printing of reports, remote connection to host databases through a PC serial connector (see FIG. 56), or access to commercial electronic mail providers to "mail enable" the core software for store and forward delivery of collected observations.

Tools selected from the Tool Drawer are given access to the entire PDA screen (any topmost layer is asked to close all of its subviews while the Tool Drawer is open), and can make whatever use of the core software services or PDA/OS services needed.

Figure 57:
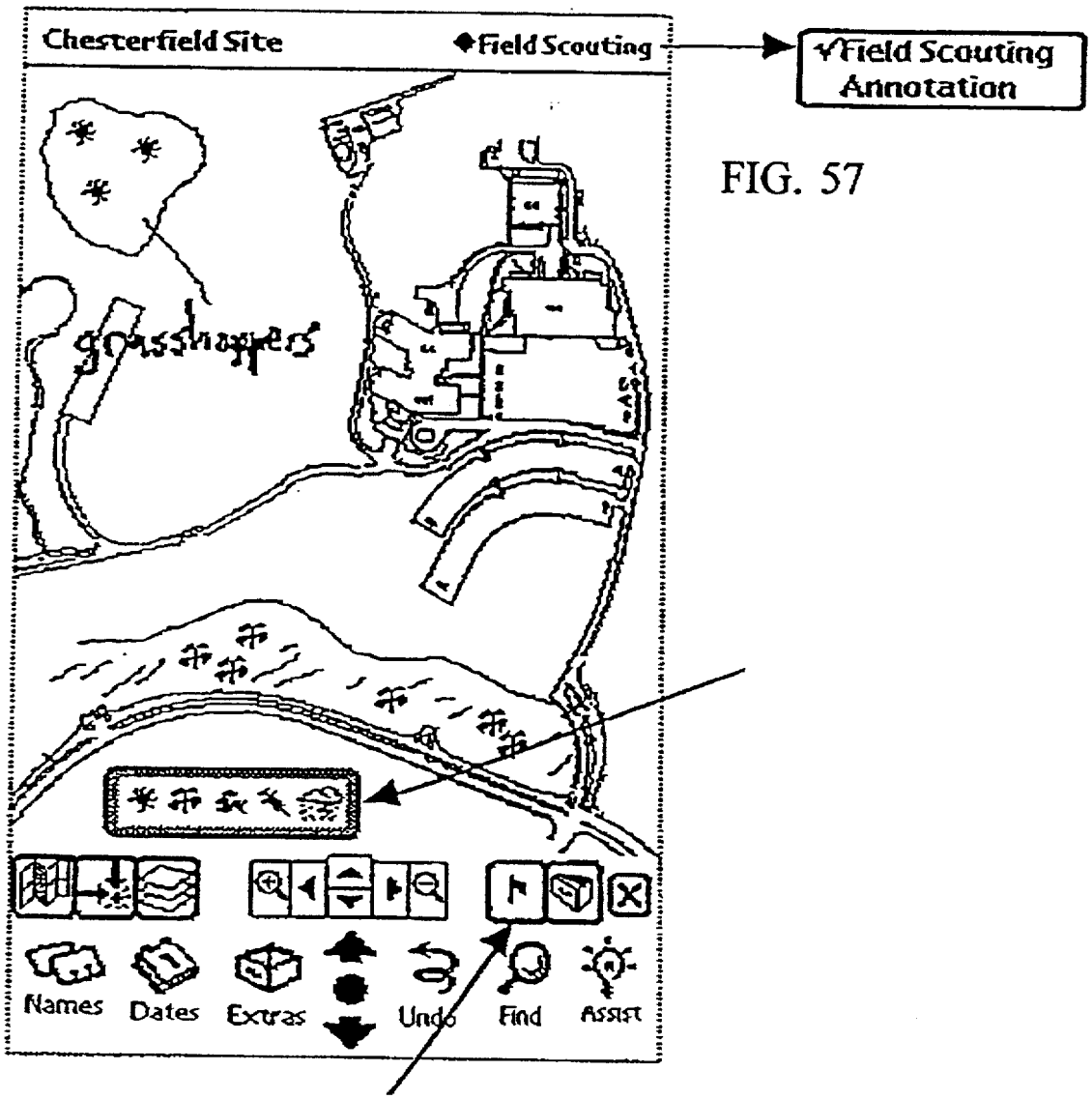
FIG. 57 illustrates an example of an annotation overlay.

As shown in FIG. 57, the core software may be tailored as a field scouting tool for agriculture, with the "Chesterfield Site" map open, and the "Field Scouting" and "Annotation" layers visible. The "Field Scouting" layer is topmost, meaning it gets to display its tools, has control of the "dynamic" button, and receives all pen taps provided by the user.

A subview belonging to the topmost layer is illustrated—in this example, a palette of data entry tools for the "Field Scouting" layer, allowing rapid entry of insect, weed, etc. observations.

Each overlay may have as many movable subviews as it needs, but may only display them when that layer is the topmost overlay. A "dynamic button" (illustrated as a flag on pole icon) is shared by all the data overlays, its icon and current function dictated by the topmost layer. In this example it is used to toggle the palette of data entry icons for the "Field Scouting" layer.

The core software provides basic map display and manipulation capabilities, and the framework for integrating real-time positioning services such as dGPS—features which are useful for virtually any spatially related data collection task to be done.

It is the drop-in overlay extensions (and any related tools) that make the present invention ultimately useful to the end user. These are the components that provide the specific capabilities that the user needs.

Overlays may be industry specific solutions customer designed for a particular purpose, such as the agricultural field scouting tool illustrated here, or they may be generalized tools which may find use in many different applications, such as the navigation and annotation tools discussed, or a general use forms entry system that would allow the end user to create their own task specific solutions.

Figure 58:
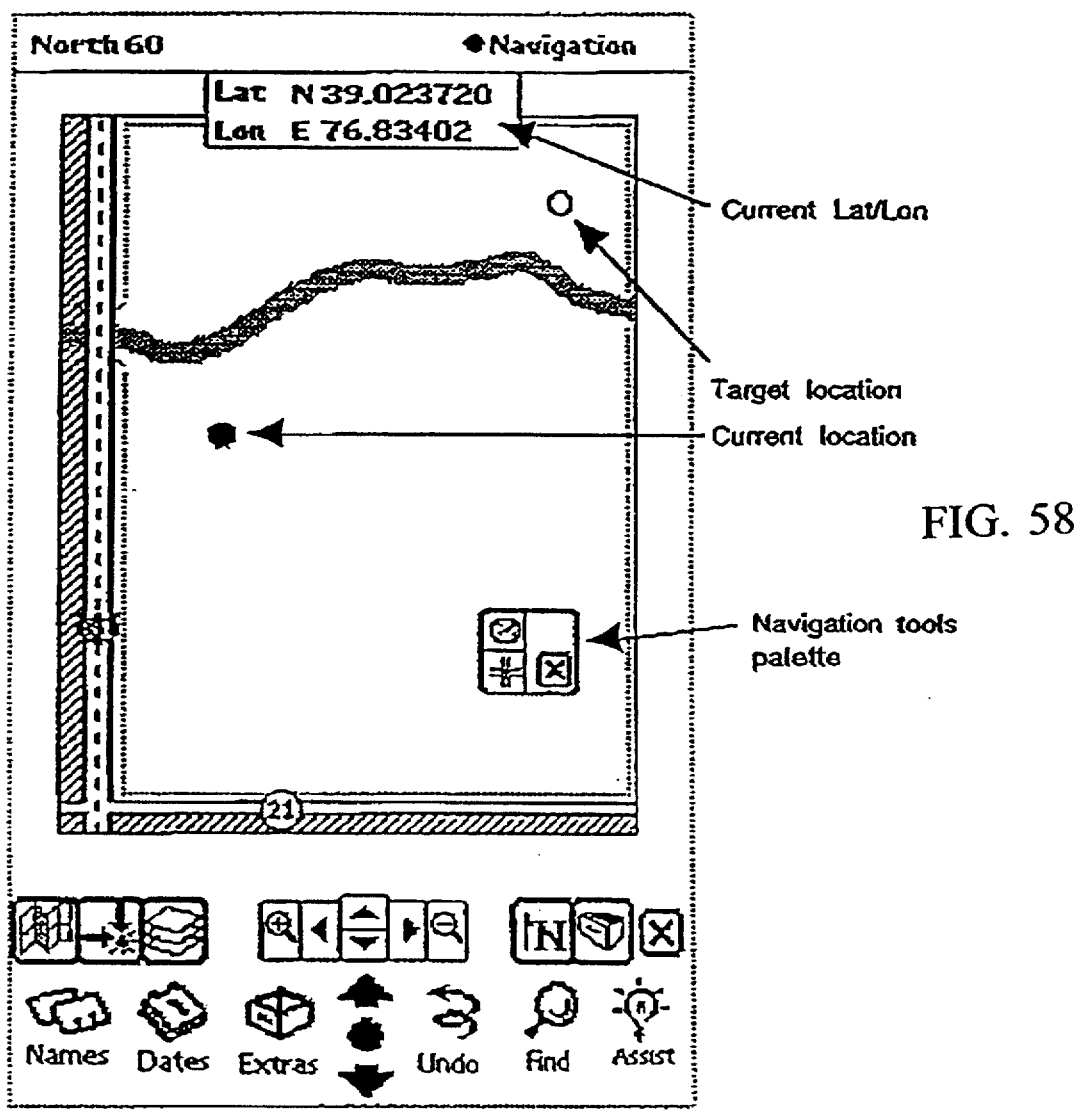
FIG. 58 illustrates a sample navigation overlay.

The Navigation Overlay as shown in FIG. 58 is a toll that allows the user to visualize a point on the map they wish to travel to, along with their own current position on the map, thus facilitating navigation to the target location. Navigation status is in the form of a range and bearing indication, providing the user a direction to travel and a distance to target, or as audio feedback (allowing heads-up navigation by sound) where an audible tone changes frequency or repetition rate as one nears (or gets further from) the target location.

The target location may be specified by tapping on the map at a position of interest, by manually entering a known lat/lon coordinate, or the coordinates may be provided by another layer which wishes to make use of the navigation services (for example, a scouting layer might provide the next observation point based on a statistical analysis of prior observations, or a sampling tool might navigate the sampler to specific locations where previous samples had been taken based on a historical database).

Figure 59:
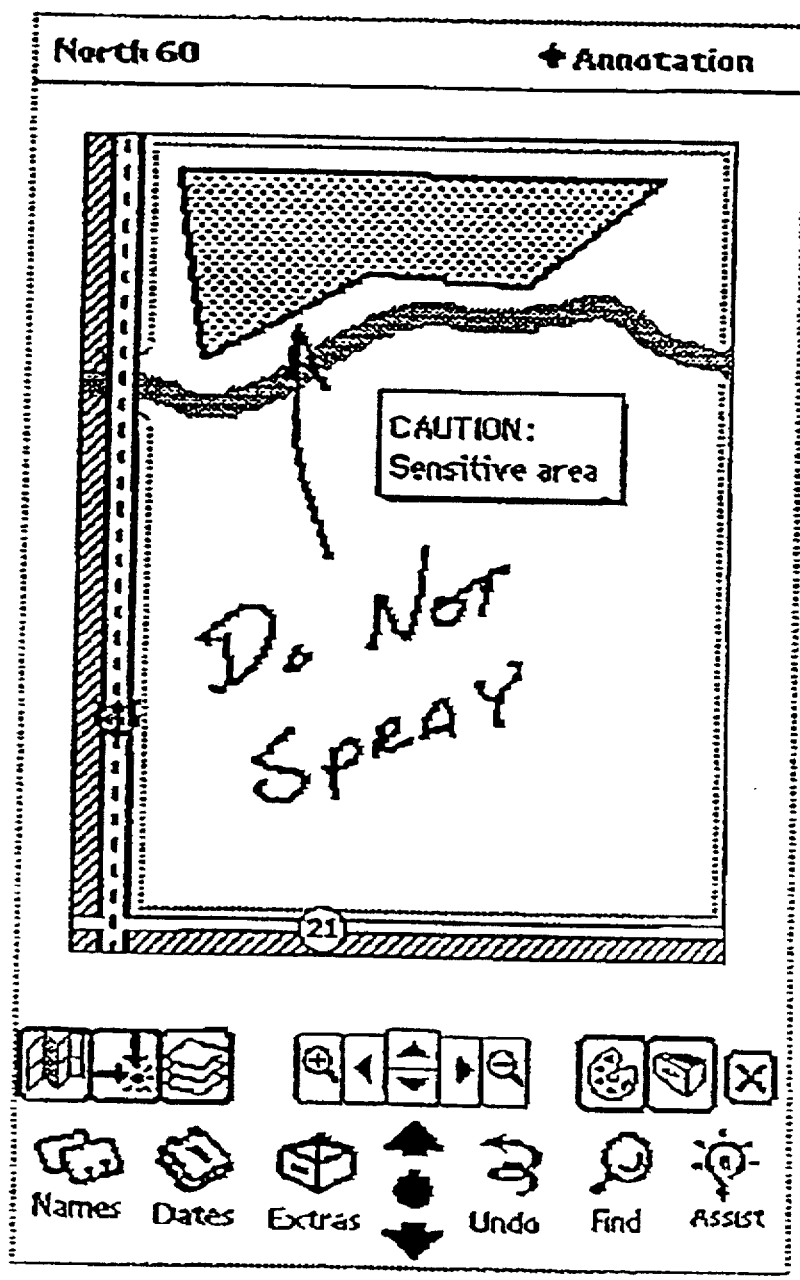
FIG. 59 illustrates another sample annotation overlay.

The Annotation Overlay as shown in FIG. 59 gives the user a means of entering free-form (unstructured) data and associating it with a position or region on the map.

Data may be entered as text (using hand-writing recognition or the tap-up keyboard), or may be entered as digital ink or geometric shapes.

The annotation layer, like the navigation overlay, should be generally useful for a lot of applications, giving the end-user the ability to capture information that might not otherwise be accommodated by a specific form, list of pre-loaded selectable data, or application.

Figures 60A, 60B:
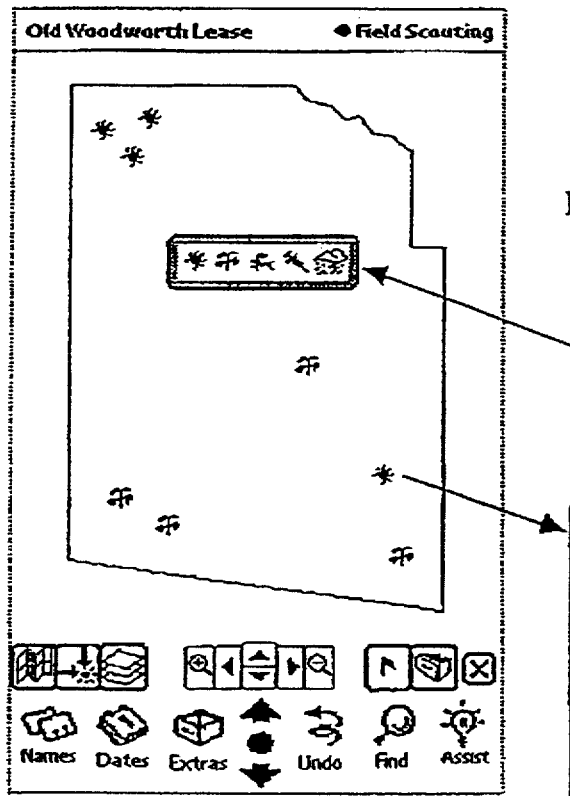
FIGS. 60a and 60b illustrate a pop-up menu for collecting data with the menu tailored to an agricultural application.

"Field Scouting" as shown in FIG. 60 is an example of an industry specific overlay built on top of the core software.

It provides a set of icons which represent specific types of point observations. Associated with each icon is a data entry form for collecting the attributes for that type of observation.

A number of software features are "tailorable" by the end user to suit their application needs or tastes.

For example, the core feature of overlaying a grid over the base map for user reference as shown in FIG. 61 (for sampling, etc.) is adjustable by the user to provide the proper size grid.

DESKTOP COMPUTER SOFTWARE

This software closely emulates the nested display arrangement explained above for the portable computer portion of the network. This program is written for operation on a windows platform which provides a graphic user interface, with a mouse instead of a stylus, to provide the same "look and feel" to a farmer for ease in learning and operating the system from either computer. Although the display may be configurable at will under the Windows Operating System, it is anticipated that it will be loaded and recommended for use by a farmer with a representation of the display being used as an image for approximately half the screen. This representation gives the same "look and feel" of an APPLE® NEWTON® display. Also, a series of buttons along the bottom of the initial display will replicate the same functions as explained above for the portable computer, except that two additional buttons will be provided. The first of these will be labeled "SYNC" and shall provide the added functionality of synchronizing the data in the desktop computer with that in the portable computer. Although any of several paradigms may be utilized, the inventors contemplate giving priority to most recent data over older data when comparisons between data entries demonstrate dissimilarities. Typically, it is anticipated that a farmer will take his portable computer in the field and make various entries indicating completed operations, etc. A farmer may then return to his home or base of operations and connect his portable computer through a data link 44, such as an RS232 connection, to his desktop computer 24, and synchronize the data by actuating the "SYNC" button on the desktop computer 24. This synchronization is not only a preliminary step to transmitting data to the central computer 30, but also serves as a backup for the data contained in the portable computer. Of course, this data may then be further backed up by downloading the data base on diskettes, hard disks, etc.

Still another feature of the software for the desktop computer is the ability of the desktop computer to actually manipulate the data contained in the memory of the portable computer. This may be contrasted with other remote access software and data base programs which copy the other computer's data base into the desktop computer for manipulation. With these other prior art software packages, the manipulated data base must then be restored or recopied into the portable computer. This extra step may not only be forgotten, but is also subject to translational error which could result in incorrect entries or differences between the two data bases. This, of course, is very undesirable and especially so as this invention may well be used by operators who do not routinely utilize computers in farming. Additionally, these other prior art packages are written for, and intend to permit, a smaller capacity computer to access a larger capacity computer, which is the opposite of the implementation herein.

The second extra button is labeled "NET" and actuating it leads the user through a simplified routine for transmitting data from the desktop computer to the messaging service. In the preferred embodiment, data is communicated to the system server from the desktop computer in order to implement the invention utilizing existing hardware having commercially available capabilities. However, it is contemplated by the inventors, as is explained above, that communication of data may very well be achieved directly from the portable computer, or either computer, without departing from the scope of this invention.

SYSTEM SERVER SOFTWARE

The inventors contemplate that any commercially available data base software may be utilized for the system server software. One such example is ORACLE™. As is routinely implamented with any typical data base, client specific information, such as farmers' names, may be suppressed and/or deleted from reports such that anonymity of data may be preserved. This may be an important feature in implementing the present invention as farmers Generally are reluctant to provide data concerning the operation of their farm unless they can be assured that such data will remain confidential and anonymous. Implementing the client server software appropriately may conveniently ensure this anonymity. Statistical analysis and report generation may be achieved through commercially available software as would be well known to those of ordinary skill in the art. In developing the present invention, the inventors have focused on the user input portion of their invention and do not anticipate that custom software is needed for implementation as presently conceived.

SOFTWARE DESIGN

Figure 33:
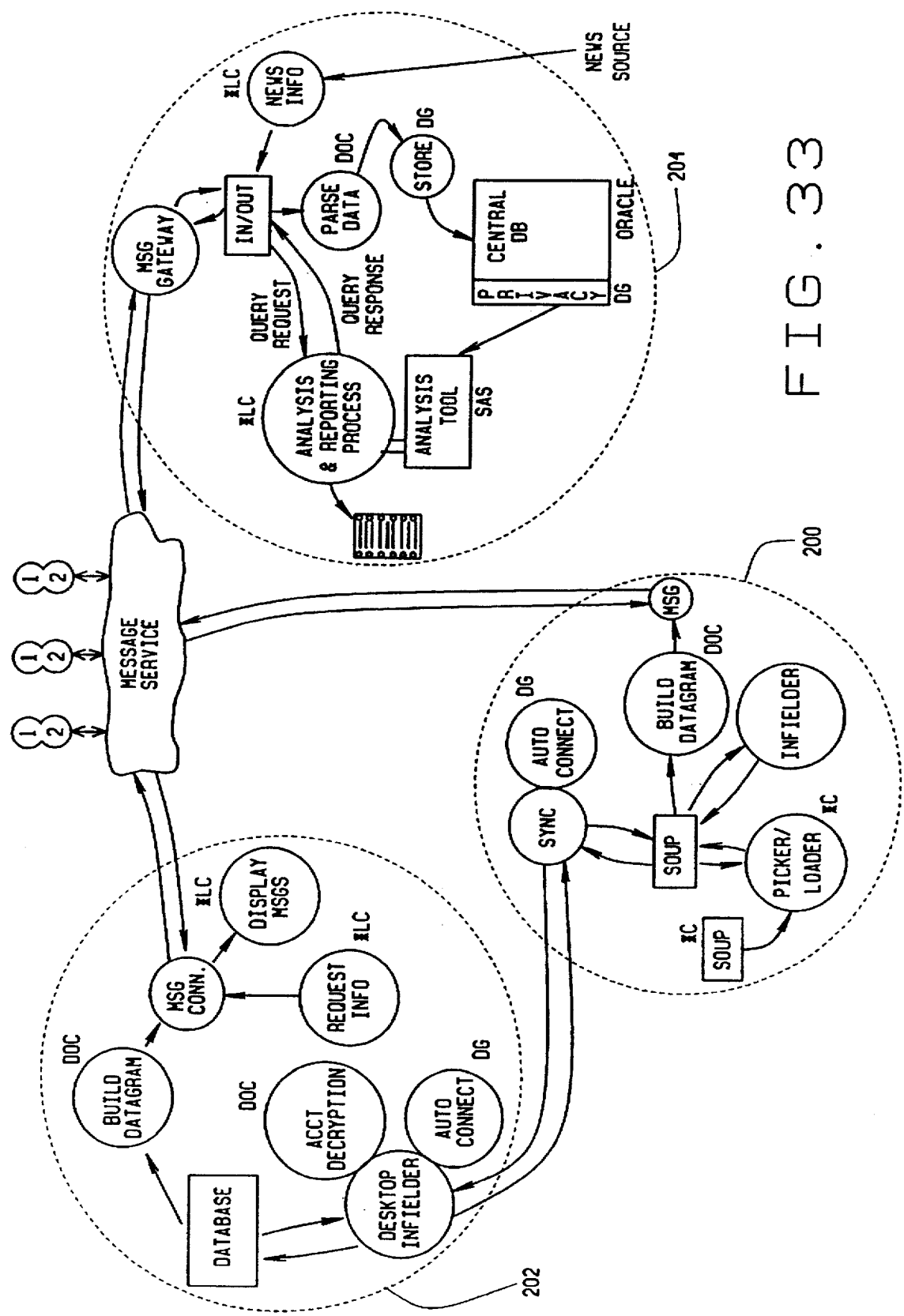
FIG. 33 is a schematic overview detailing the software disclosure and discriminating between source code disclosure and flow chart disclosure.

As shown in FIG. 33, the software design for the present invention is detailed as an aid to one of ordinary skill in the art in implementing the present invention. As shown therein, a dotted line circle 200 represents the software for the mobile computer, a second dotted line circle 202 represents the software for the fixed platform PC, and a third dotted line circle 204 represents the software implemented in the central computer, it being understood that the central computer may itself be comprised of a Gateway computer in combination with a central computer, or multiple central computers which provide additional capacity for serving increased numbers of users.

Figure 34:
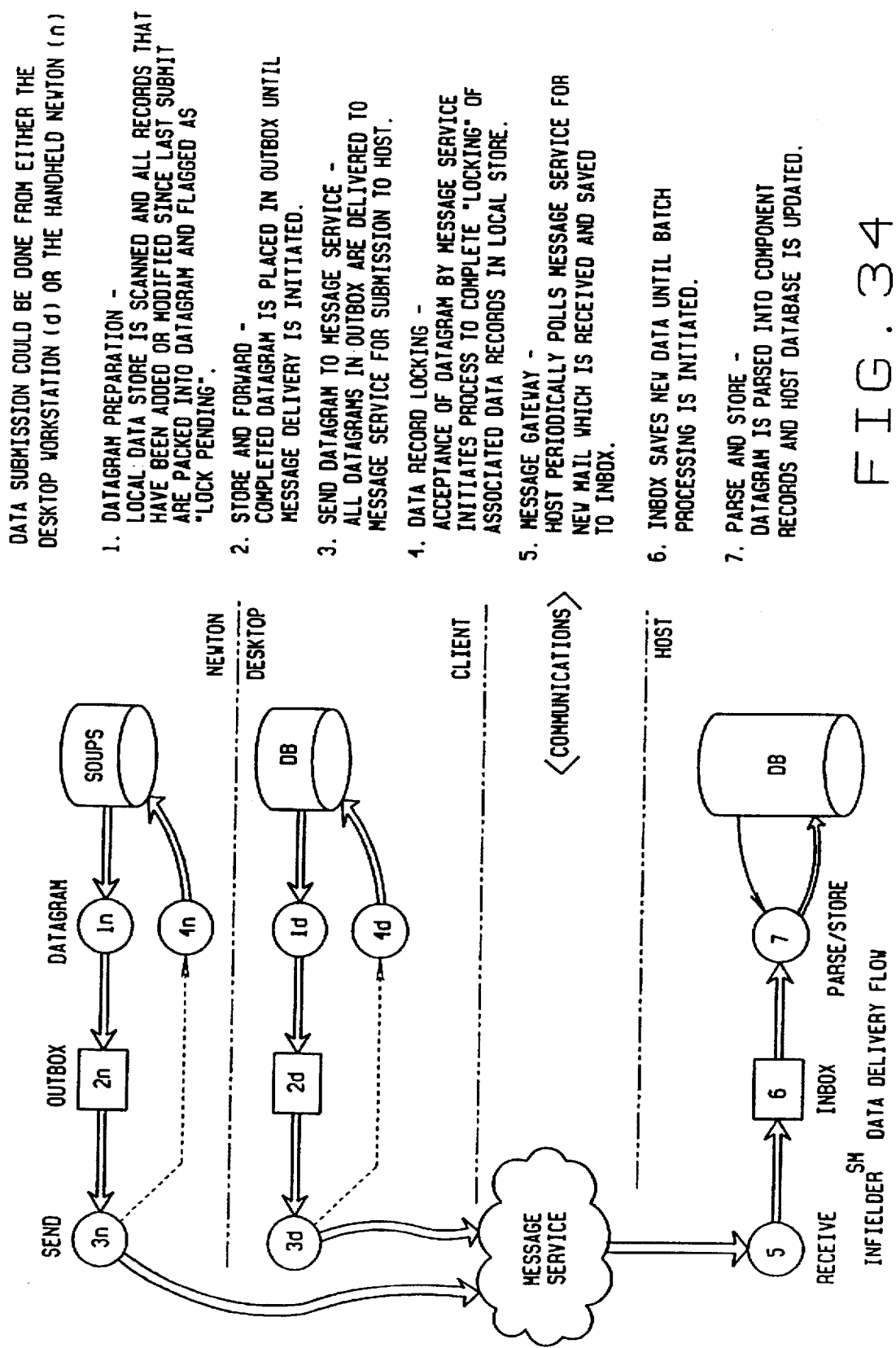
FIG. 34 is an annotated flow chart detailing the overall data delivery flow between the mobile computer, the fixed platform PC, and on to the central computer through a messaging service.
Figure 35B:
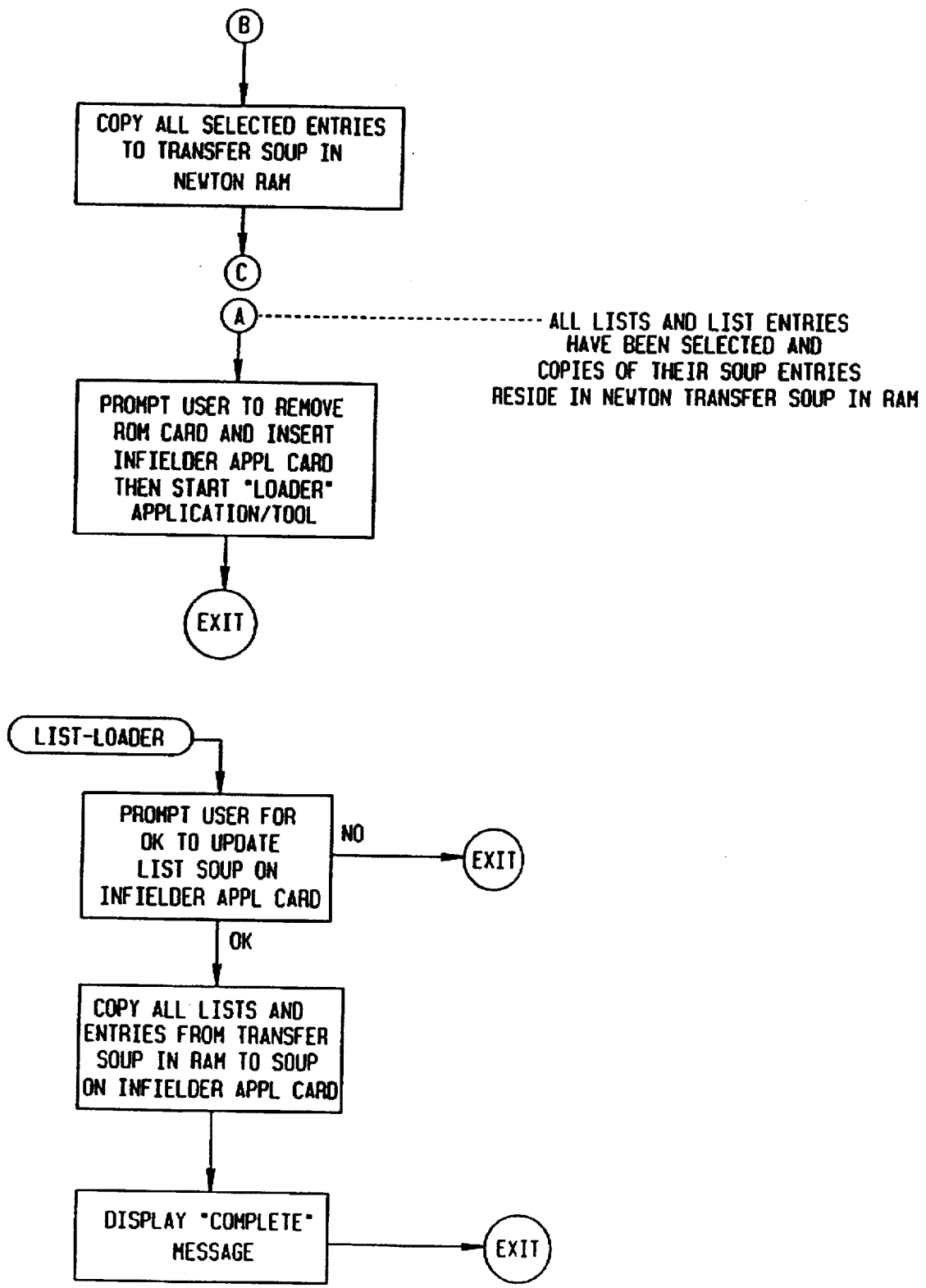
FIG. 35 is a flow chart for a portable computer stored program module which enables selection and storage of data entries for populating pop-up lists in the portable computer.
Figure 36:
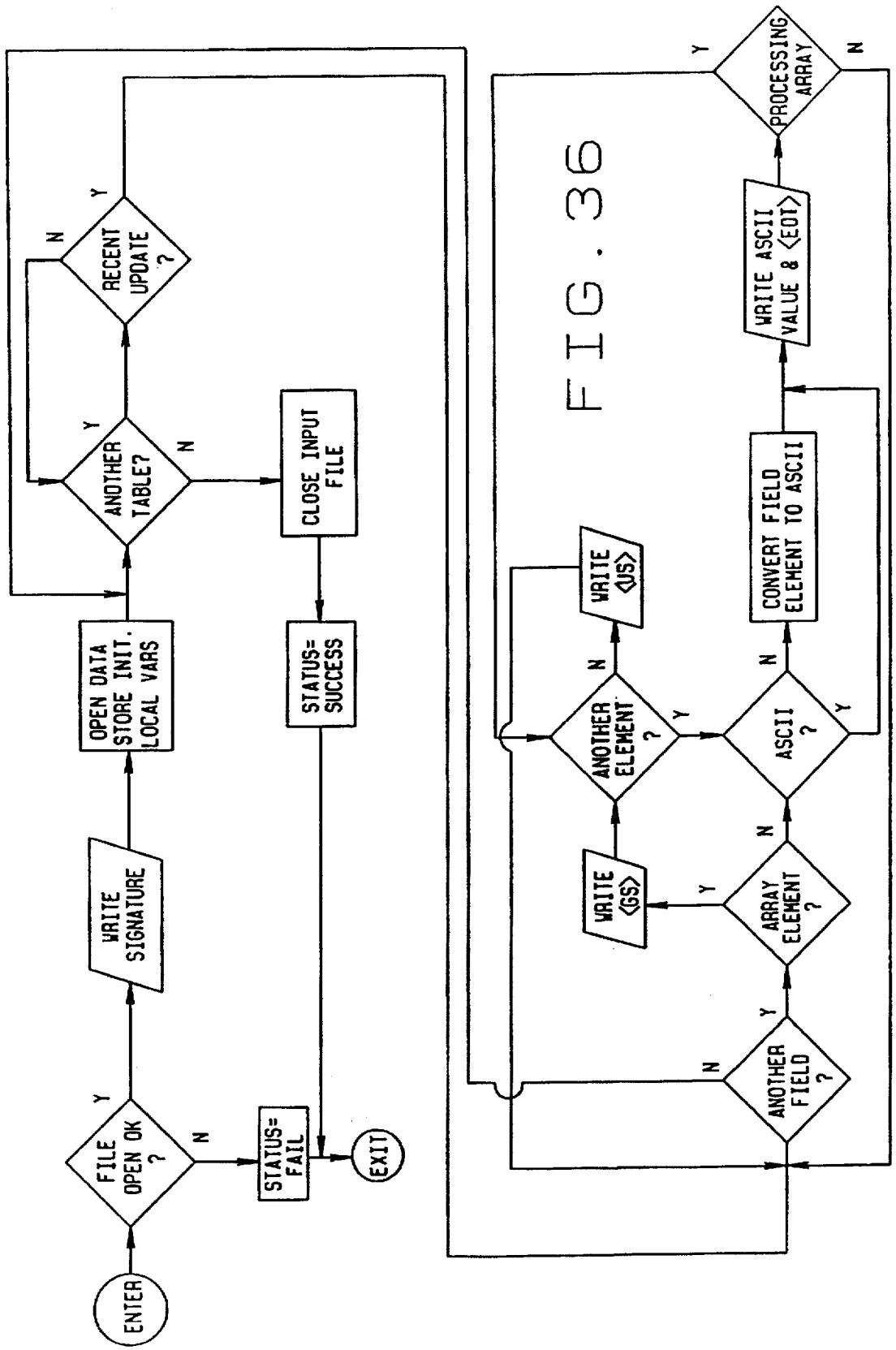
FIG. 36 is a flow chart for a stored program module used in both the portable computer and fixed platform PC for building a datagram from data stored in a data base in stored memory.
Figure 46:
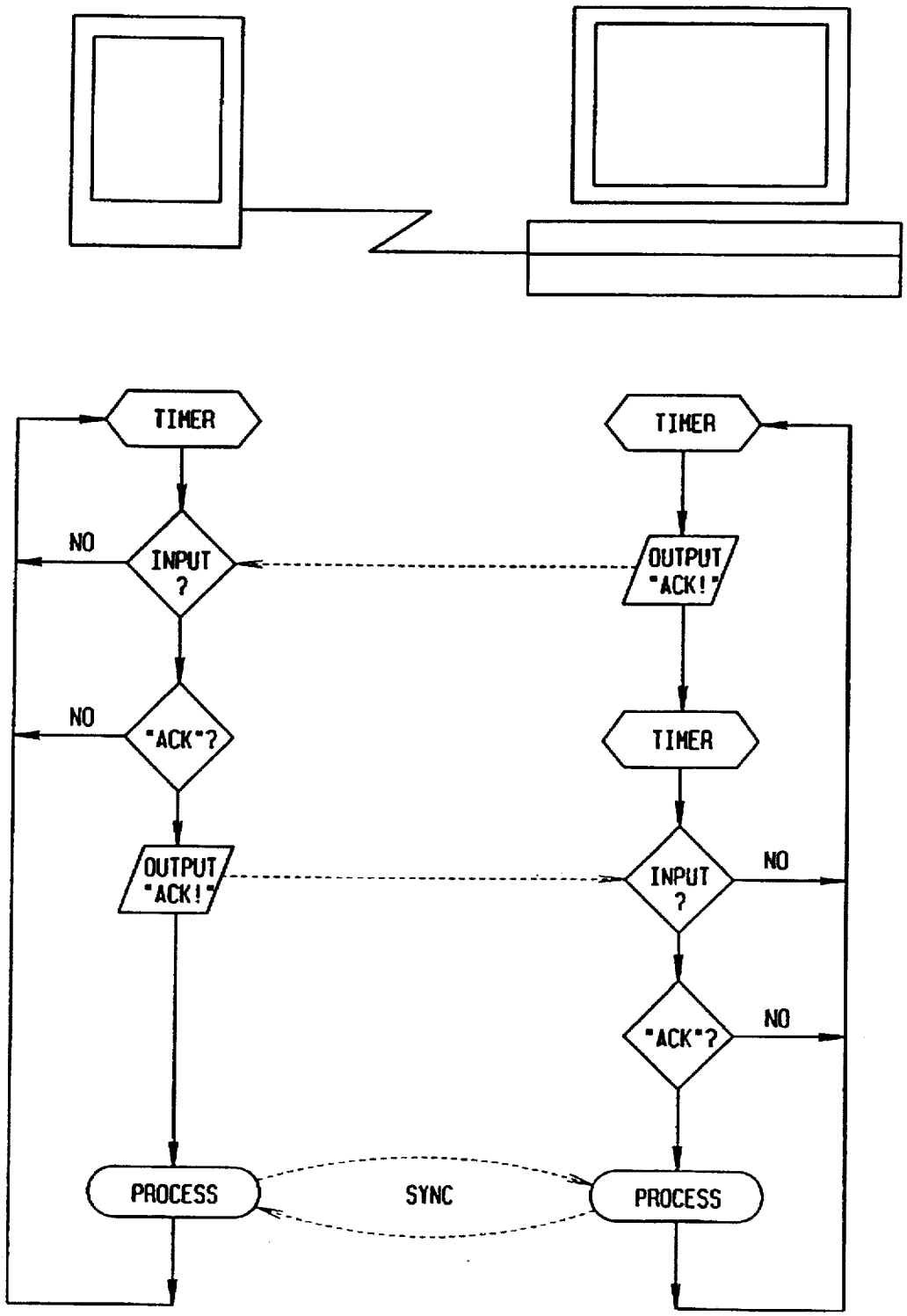
FIG. 46 is a flow chart for a stored program module in both the portable computer and the fixed platform PC for synchronizing data bases upon connection of a data link.

As shown in FIG. 33, many of the functions performed by the software are explained herein with a functional description so that an ordinary programmer using ordinary programming skills could readily write the code required to implement these features. Alternatively, the source code submitted with the parent application gives a complete operational software package for these functions. Furthermore, there are several functions which have been implemented through flow charts which are included herein as separate figures of the drawings. These are as follows. As shown in FIG. 34, an overview of the data delivery from the data bases in the mobile computer and fixed platform PC to the central computer data base is detailed. The mobile computer includes program modules which are flow charted as follows. As shown in FIG. 35, the pop-up lists in the mobile computer are populated through a PCMCIA ROM card into an application or RAM card. Datagrams are constructed using the stored program module flow charted in FIG. 36. This program is used both in the mobile computer software 200 as well as the fixed platform PC software 202. As shown in FIG. 46, data synchronization between the mobile computer and the fixed platform PC may be achieved by merely interconnecting the two with a data link.

Figure 38:
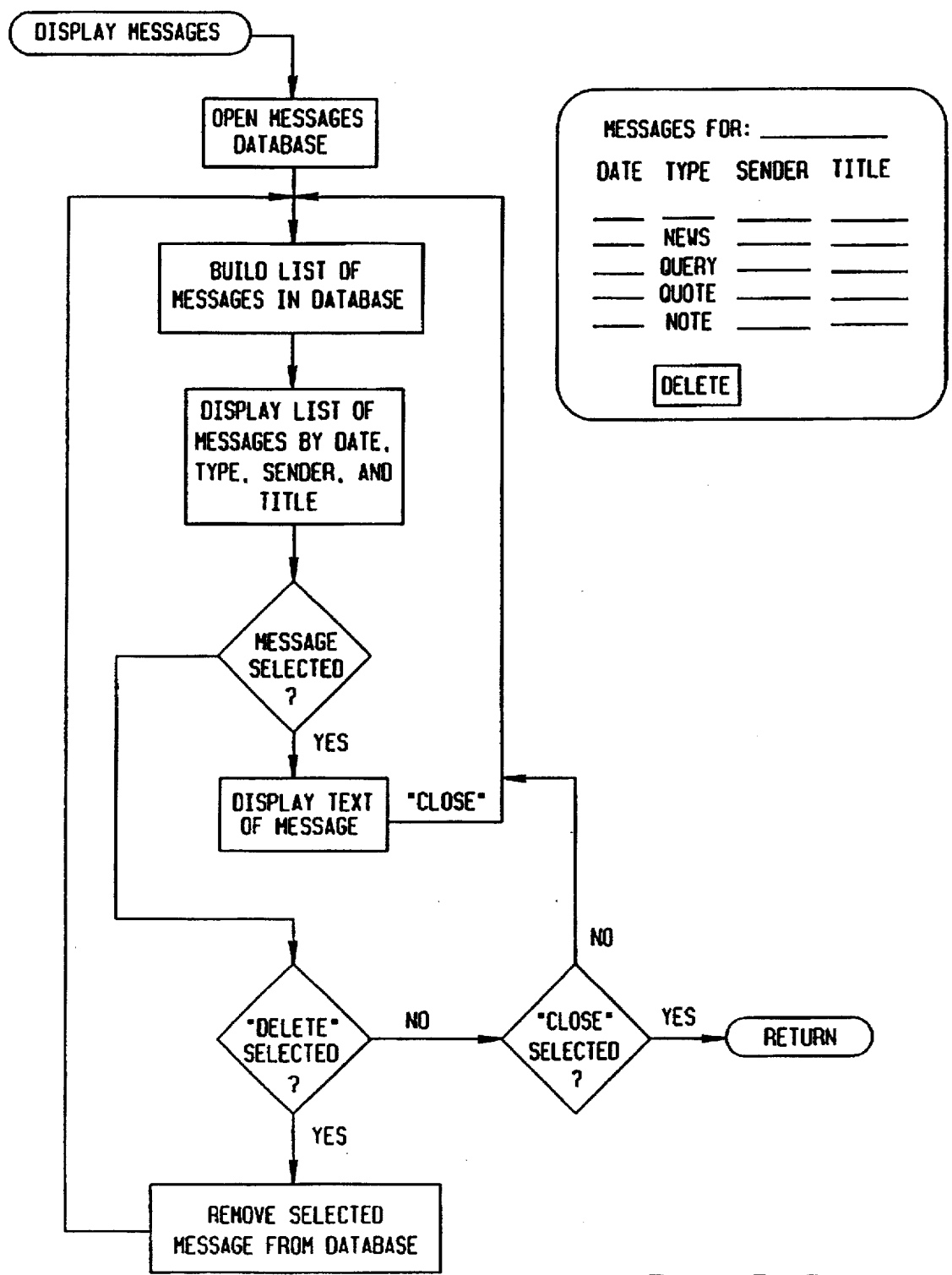
FIG. 38 is a flow chart for a stored program module in the fixed platform PC which enables a user to display messages being communicated through the data link between the fixed platform PC and the central computer.
Figure 39:
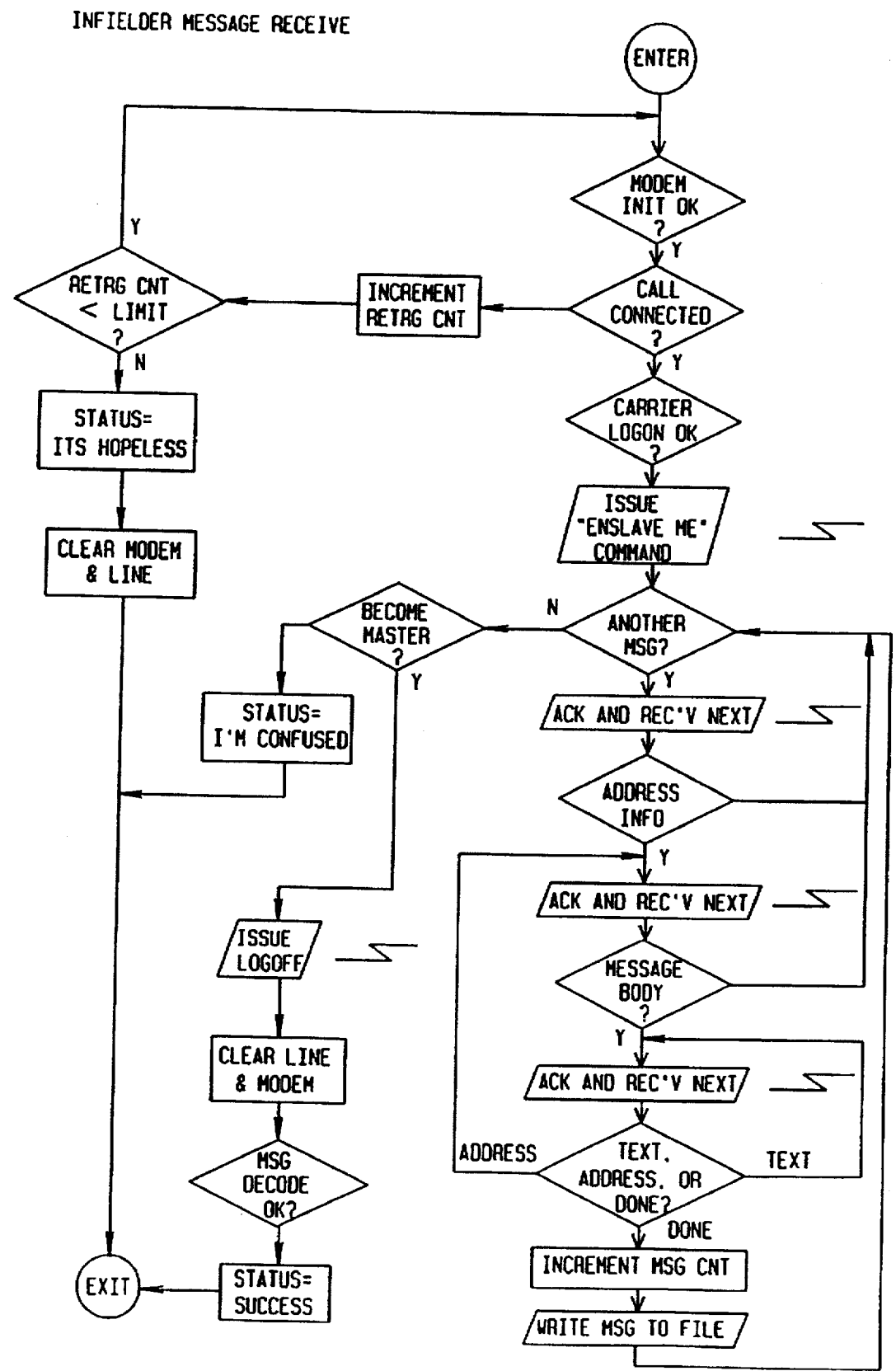
FIG. 39 is a flow chart for a stored program module in the fixed platform PC which facilitates the receiving of messages from the messaging service by the fixed platform PC.
Figure 40:
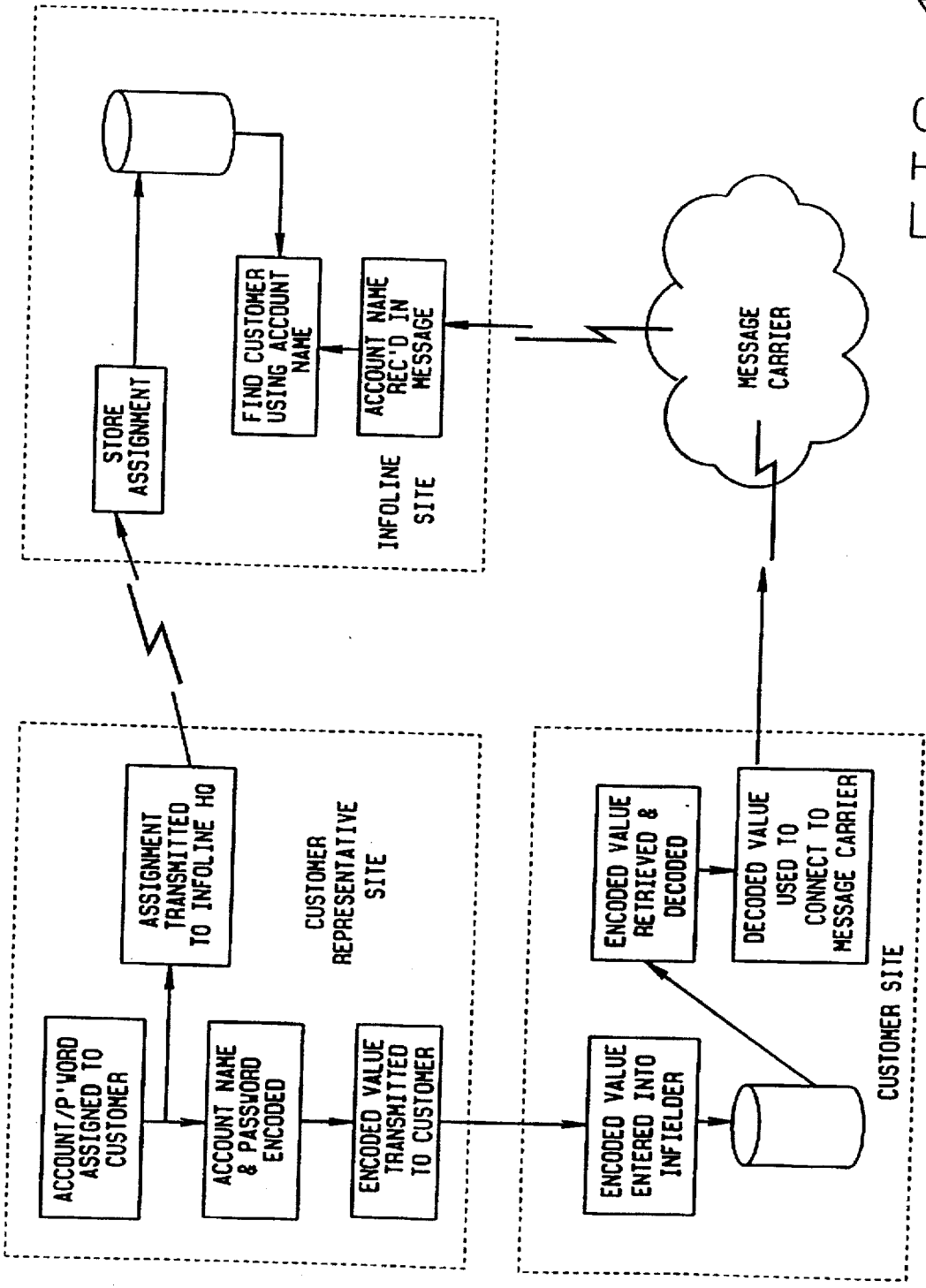
FIG. 40 is a flow chart for a stored program module for the fixed platform PC which provides the coding and decoding of the account number for communication through the messaging service.

The fixed platform PC software 202 includes the "display messages" flow chart of FIG. 38 which permits messages communicated to and from the central computer to be displayed on the fixed platform PC. The capability for the fixed platform PC to receive messages through the messaging service is flow charted in FIG. 39. The coding and decoding of account numbers to prevent misuse of the messaging service by a user is achieved through the stored program module flow charted in FIG. 40.

Figure 37:
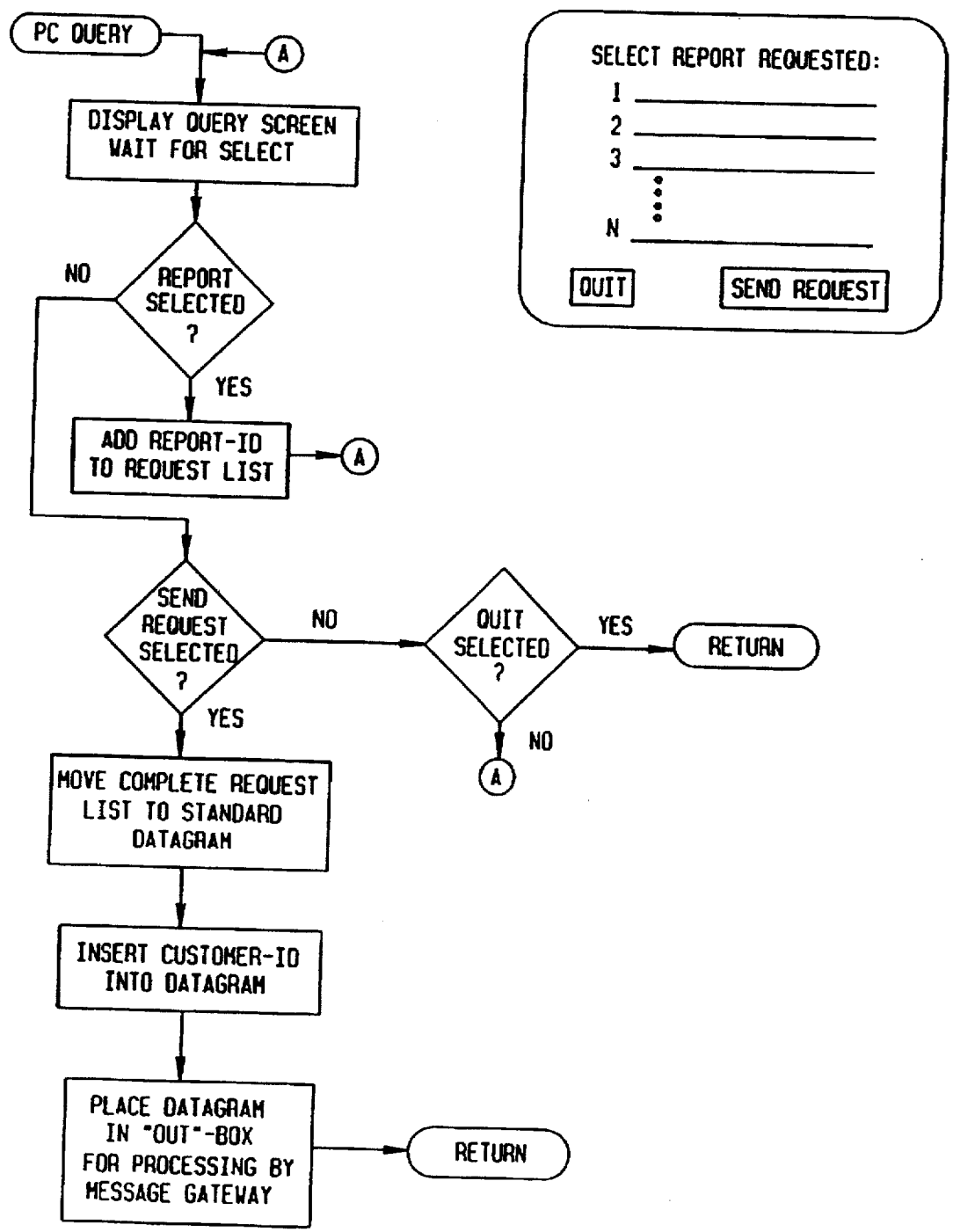
FIG. 37 is a flow chart for a stored program module in the fixed platform PC which facilitates user inquiry for specified reports from the central computer.
Figure 41:
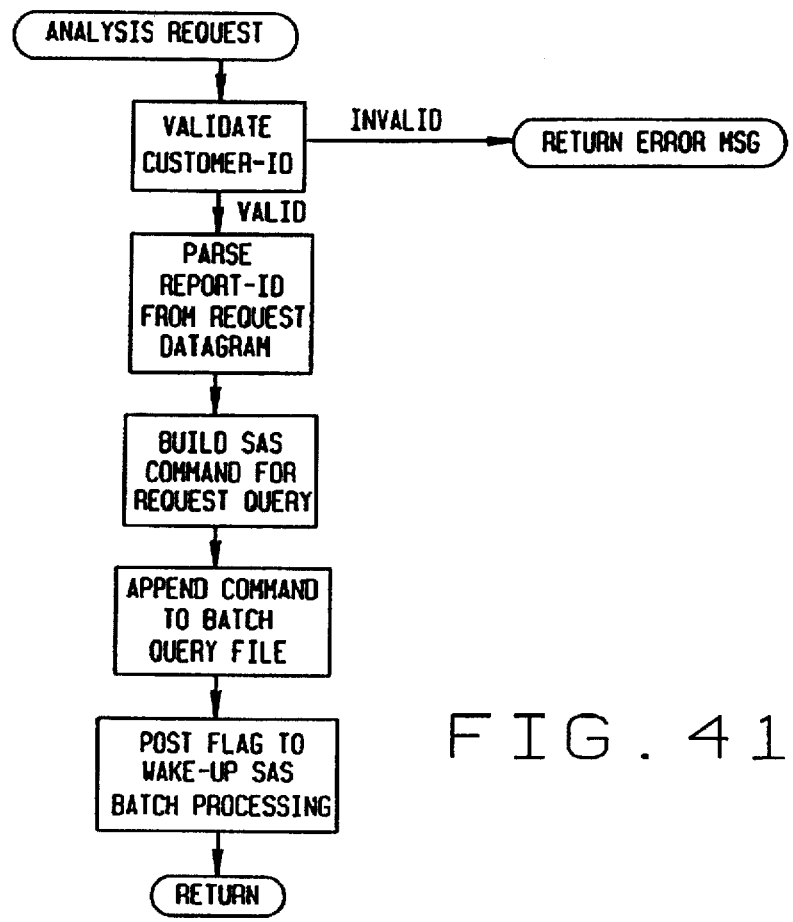
FIG. 41 is a flow chart of a stored program module for the central computer which processes an analysis request from a user for a report or other data.
Figure 42:
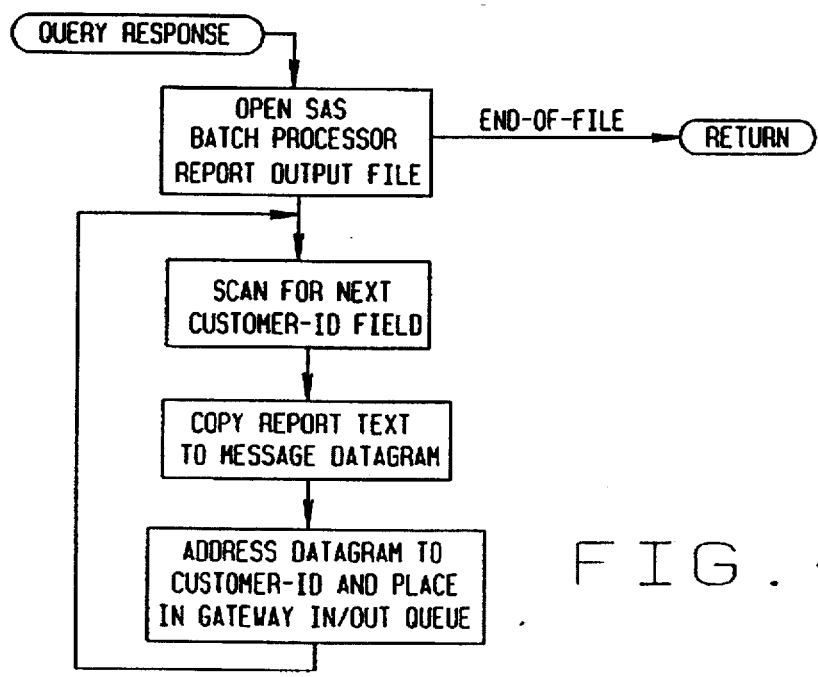
FIG. 42 is a flow chart for a stored program module for the central computer which accesses the central data base and generates a report for transmission to a user on command.
Figure 43:
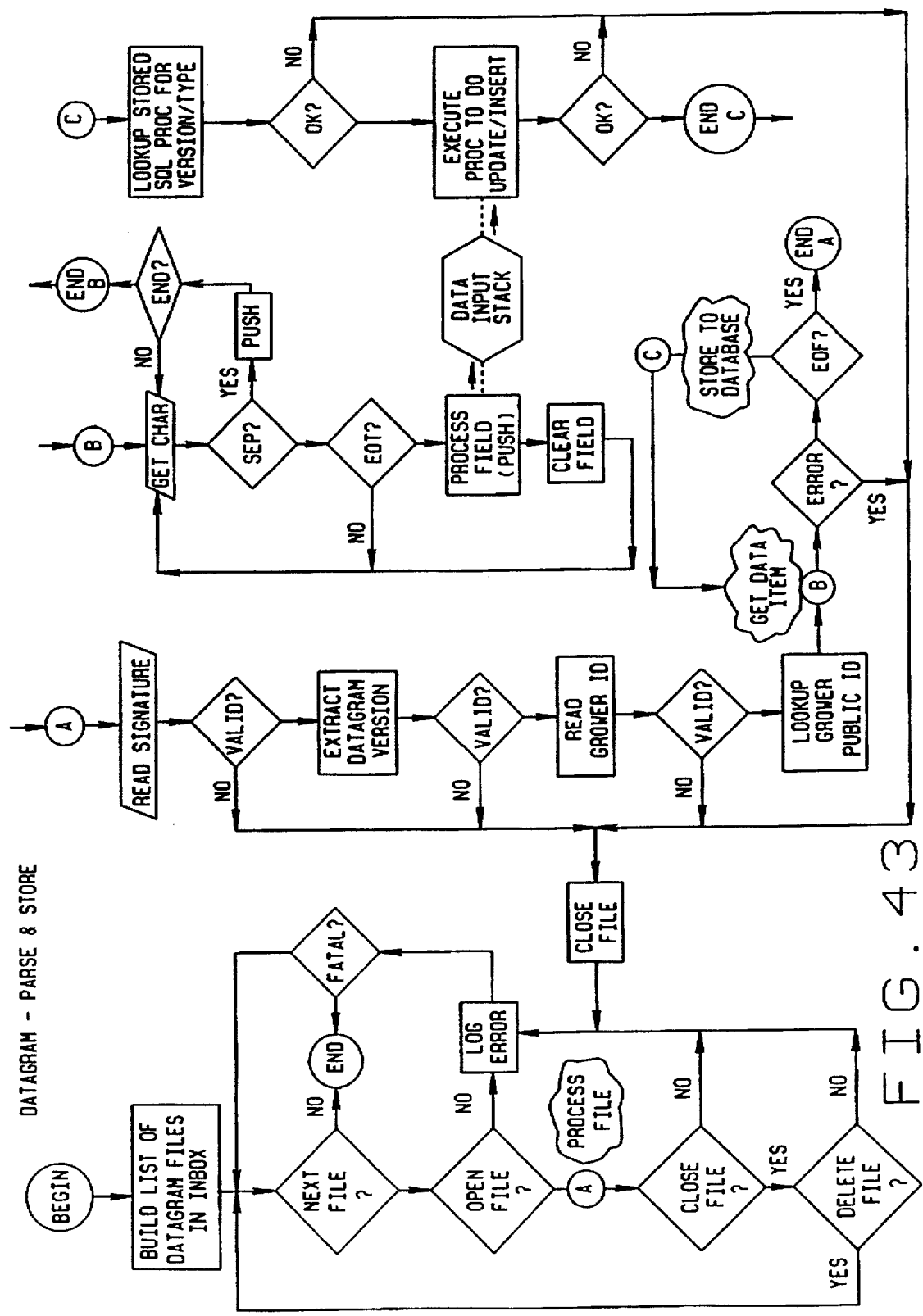
FIG. 43 is a flow chart for a stored program module for the central computer which parses and stores datagrams into the central computer as transmitted from the user.
Figure 44:
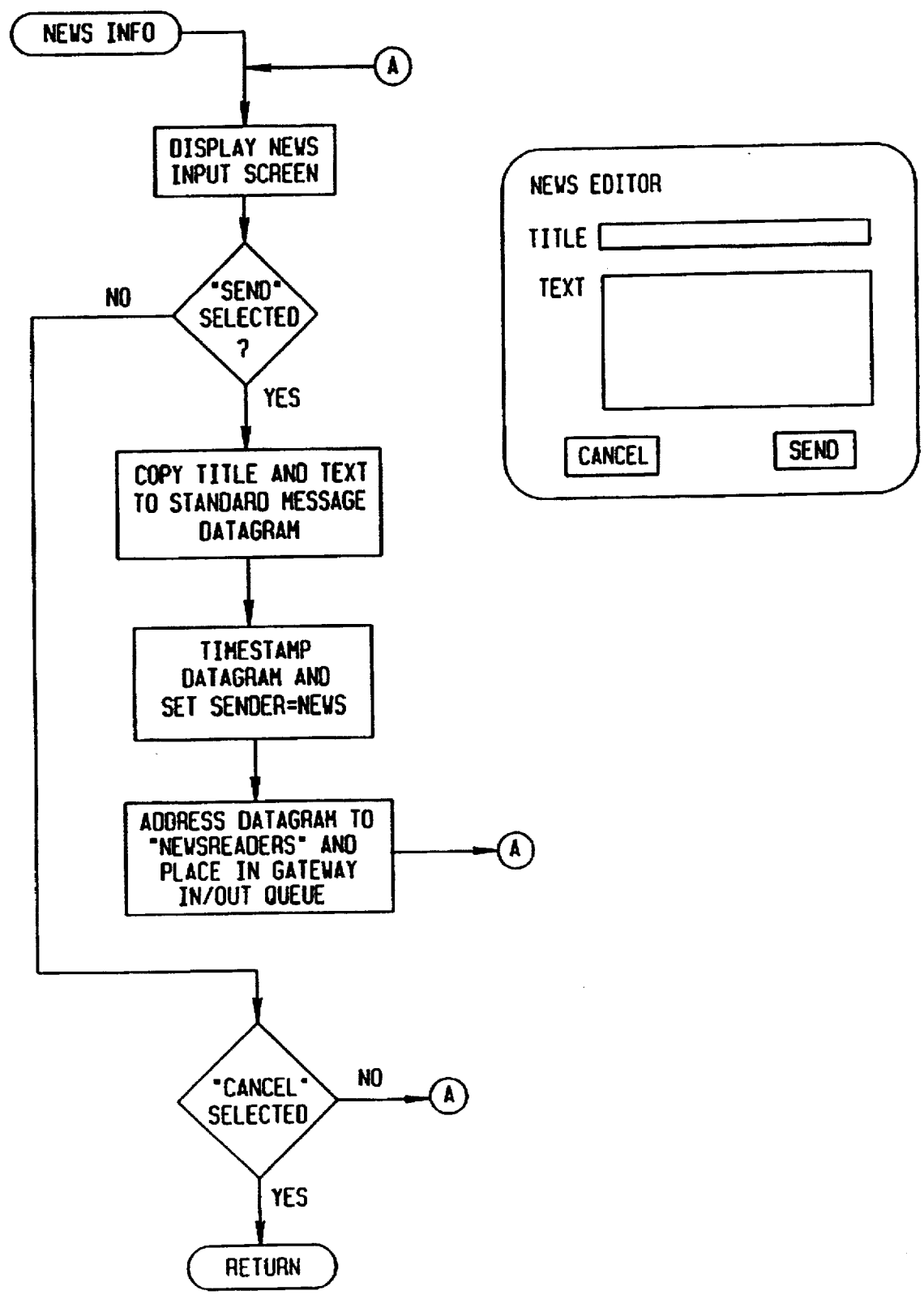
FIG. 44 is a flow chart for a stored program module in the central computer which facilitates operator entry into the central computer of selected information for transmission to users.

The central computer software 204 includes the analysis and reporting program module flow charted in FIG. 37 for handling inquiries from a user and transmitting reports back to him. The preparation of specific analyses based upon customer inquiry is achieved through the central computer software flow charted in FIG. 41. Responding to inquiries is achieved through the software program module flow charted in FIG. 42. The parsing and storing of data from datagrams is achieved through the software program module flow charted in FIG. 43. Additional, offline news or other information may be entered into the system at the central computer through the software program module flow charted in FIG. 44. Privacy of the data contained in the central data base is achieved through the methodology flow charted in FIG. 45.

There are various changes and modifications which may be made to the invention as would be apparent to those skilled in the art. For example, while the present disclosure describes the invention in a farming application where individual farmers are raising crops on their own fields, plantations, orchards, groves, and vineyards, the present invention is readily adaptable and usable for many other "growing" arrangements whether for food or other reasons such as seed crops, ornamentals, etc. These include, but are not limited to, raising cattle in feed lots where the crops are instead herds of cattle and the fields are instead pens; poultry raising operations where chickens are the "crops" and hen houses are the "fields", or similarly for swine or dairy; contract growing arrangements where a major user of "grown" foodstuffs has contracted for the full output of one or more "farms"; and other such situations where it is desired to monitor the growing, raising, breeding or other production of a living organism. However, these changes or modifications are included in the teaching of the disclosure.

What is claimed is:

1. A handheld, geographical data collection device, said device comprising a computer with a graphic user interface to facilitate data entry by a user, a stored program having means for selectively displaying a format of nested forms for user entry of collected data, means for displaying at least one of a plurality of maps on said interface, and a GPS and a dGPS receiver coupled to said computer to provide real time GPS position data to said computer for display on said map and entry as data.

2. The device of claim 1 wherein said stored program includes means for user selection of an overlay for display on said interface, said overlay being specific to a particular class of data and having a particular associated set of menus dedicated to the class of data being collected.

3. The device of claim 2 wherein said stored program provides a plurality of overlays for user selection.

4. The device of claim 3 wherein said stored program has means for a user to display more than one overlay, said overlays being transparent, and wherein a user has access to only an uppermost overlay's associated set of menus.

5. The device of claim 4 wherein said stored program has means for display of said overlays over one of said maps.

6. The device of claim 5 wherein said stored program has means for said user to select an arbitrary portion of a map for display on said interface.

7. The device of claim 6 wherein said stored program has means for determining a plurality of map elements for display in that portion arbitrarily selected by determining the vectors of each map element contained in said map and choosing for display only those whose vectors intersect or lie within said selected arbitrary portion.

8. The device of claim 7 wherein said stored program has means for a user to designate a desired destination, and means for progressively indicating advance towards said desired location.

9. A handheld portable computer for gathering substantially all material data related to the agricultural operation of a farm through an entire growing season, said portable computer having a graphic user interface to facilitate the entry of said data into said computer, a memory for storing said data, a GPS and a dGPS receiver coupled to said computer to provide real time GPS position data to said computer for display on said interface, and a stored program to provide the organized visual display of said data in a variety of formats.

10. The portable computer of claim 9 further comprising means for synchronizing the data stored in said portable computer with the data stored in a second computer with a small number of fixed commands.

11. The portable computer of claim 10 further comprising means for synchronizing the data stored in said portable computer with the data stored in a second computer upon connection therebetween with said electronic connection means.

12. The portable computer of claim 11 wherein said stored program includes means for displaying a plurality of nested shell displays on a screen, at least some of said displays including a plurality of data storage lines and a scrollable list from which an appropriate data entry may be selected for entry and display in one of said data storage lines.

13. The portable computer of claim 12 further comprising means for populating said scrollable lists solely with entries which are properly selectable in response to the data already stored in said portable computer.

14. The portable computer of claim 13 further comprising means for connection to a second data base, said second data base having means for storing a significantly greater amount of data than may be stored in said portable computer memory.

15. The mobile computer of claim 14 further comprising means for selectively accessing said second data base on operator command to thereby provide additional explanatory data related to any data contained in said stored program.

16. The portable computer of claim 15 wherein said second data base comprises a data card and said connection means comprises a data card reader and slot for receiving said data card.

17. The portable computer of claim 16 wherein a substantial portion of said data may be entered in said portable computer by physically touching said data entry as it is displayed on said screen to thereby provide simplified data entry for an operator.

18. The portable computer of claim 17 wherein said portable computer comprises a handheld computer, and said screen comprises a touch screen sized to cover substantially the entirety of its largest side.

19. The portable computer of claim 18 wherein said synchronizing means includes means for comparing the data entries in said two sets of data and replacing an older entry with a newer entry in the event of a mismatch in data entries.

20. The portable computer of claim 9 wherein said stored program includes means for displaying a plurality of nested shell displays on a screen, at least some of said displays including a plurality of data storage lines and a scrollable list from which an appropriate data entry may be selected for entry and display in one of said data storage lines.

21. The portable computer of claim 20 wherein said stored program includes means for displaying one of a plurality of maps on said interface, and means for displaying on said displayed map the indicated position of said portable computer corresponding to said GPS position data.

22. The portable computer of claim 21 wherein said stored program includes means for automatically entering GPS position data as the user enters other data to thereby associate said other data with a position.

23. The portable computer of claim 22 wherein said stored program includes means for a user to designate for display a desired position, and means for indicating a change in relative distance between a present location and said desired position.

24. The portable computer of claim 23 wherein said stored program includes means for user selection of an overlay for display on said interface, said overlay being specific to a particular class of data and having a particular associated set of menus dedicated to the class of data being collected.

25. The portable computer of claim 24 wherein said stored program has means for a user to display more than one overlay, said overlays being transparent, and wherein a user has access to only an uppermost overlay's associated set of menus.

26. The portable computer of claim 25 wherein said stored program has means for said user to select an arbitrary random portion of a map for display on said interface.

27. The portable computer of claim 26 wherein said stored program has means for determining a plurality of map elements for display in that portion randomly selected by determining the vectors of each map element contained in said map and choosing for display only those whose vectors intersect or lie within said selected arbitrary portion.

* * * * *